US008619757B2

(12) United States Patent
Shaheen et al.

(10) Patent No.: US 8,619,757 B2
(45) Date of Patent: Dec. 31, 2013

(54) METHOD AND APPARATUS FOR DELIVERY OF DATA-BASED/VOICE SERVICES OVER PICONETS AND WIRELESS LANS (WLANS) COUPLED TO 3GPP DEVICES INCLUDING PROTOCOL ARCHITECTURE AND INFORMATION ELEMENTS RELATING TO SHORT MESSAGE SERVICES (SMS) OVER WLANS

(75) Inventors: Kamel M. Shaheen, King of Prussia, PA (US); Prabhakar R. Chitrapu, Blue Bell, PA (US); Brian Gregory Kiernan, Downingtown, PA (US); Debashish Purkayastha, Lansdale, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1484 days.

(21) Appl. No.: 10/837,124

(22) Filed: Apr. 30, 2004

(65) Prior Publication Data

US 2005/0002407 A1    Jan. 6, 2005

Related U.S. Application Data

(60) Provisional application No. 60/466,911, filed on May 1, 2003, provisional application No. 60/469,670, filed on May 12, 2003, provisional application No. 60/478,075, filed on Jun. 12, 2003, provisional application No. 60/491,054, filed on Jul. 30, 2003, provisional application No. 60/498,171, filed on Aug. 27, 2003.

(51) Int. Cl.
*H04L 12/66* (2006.01)
*H04W 4/00* (2009.01)

(52) U.S. Cl.
USPC .......................................... 370/352; 455/466

(58) Field of Classification Search
USPC ............... 709/227, 230; 370/328, 401, 352; 455/426.1, 466, 408, 433, 412, 414; 707/10
See application file for complete search history.

(56) References Cited

U.S. PATENT DOCUMENTS 6,304,556 B1 * 10/2001 Haas .............................. 370/254
6,611,516 B1 *  8/2003 Pirkola et al. ................. 370/352

(Continued)

FOREIGN PATENT DOCUMENTS

EP         1 257 141 A1    11/2002
RU      2000-113222         4/2002

(Continued)

OTHER PUBLICATIONS

ETSI TC-SMG, Digital cellular telecommunication system (Phase 2+);Point-to-Point (PP) Short Message Service (SMS) support on mobile radio interface(GSM 04.11), Mar. 1996, Version 5.1.0, p. 9, 33-36.*

(Continued)

*Primary Examiner* — Duc Nguyen
*Assistant Examiner* — Sonia Gay
(74) *Attorney, Agent, or Firm* — Volpe and Koenig, P.C.

(57) ABSTRACT

Method and apparatus delivering voice/data services within a piconet operating over a limited range or over a WLAN communicating with 3GPP devices by reformatting data into IP format before delivering to the WLAN. The service is short message service (SMS). Upon receipt of an SMS message, relevant routing information is retrieved. A PDGW address for the SMS message is identified and is sent to the PDGW address which identifies the WLAN user equipment (UE) for receiving the SMS and reformats the SMS message into IP format (text or encapsulation) for delivery to the UE. A protocol architecture is provided for SMS delivery over WLANs, in particular, for UMTS/CDMA based SMS over WLAN through two alternative mechanisms, i.e., SMS tunneling and SMS proxy, for protocols for the delivery of SMS across the WLAN. The invention enhances standard 802.11 in the context of UMTS and CDMA 2000; as well as other scenarios.

33 Claims, 40 Drawing Sheets

(56) References Cited

U.S. PATENT DOCUMENTS

| | | | |
|---|---|---|---|
| 6,658,011 | B1 | 12/2003 | Sevanto et al. |
| 6,735,441 | B1* | 5/2004 | Turgeon et al. ............... 455/433 |
| 7,010,300 | B1* | 3/2006 | Jones et al. .................. 455/439 |
| 2001/0034767 | A1 | 10/2001 | Aho |
| 2002/0077132 | A1* | 6/2002 | Mizell et al. .................. 455/466 |
| 2002/0085516 | A1 | 7/2002 | Bridgelall |
| 2002/0136173 | A1* | 9/2002 | Monroe et al. ................ 370/328 |
| 2002/0191575 | A1 | 12/2002 | Kalavade et al. |
| 2002/0194183 | A1* | 12/2002 | Yoakum et al. ................ 707/10 |
| 2003/0016639 | A1 | 1/2003 | Kransmo et al. |
| 2003/0026245 | A1 | 2/2003 | Ejzak |
| 2003/0050047 | A1* | 3/2003 | Ala-Luukko ................ 455/412 |
| 2003/0050051 | A1* | 3/2003 | Vilander ...................... 455/414 |
| 2003/0133421 | A1* | 7/2003 | Sundar et al. ................. 370/328 |
| 2003/0233457 | A1* | 12/2003 | Basilier et al. ............... 709/227 |
| 2004/0066756 | A1 | 4/2004 | Ahmavaara et al. |
| 2004/0106430 | A1 | 6/2004 | Schwarz et al. |
| 2004/0199649 | A1* | 10/2004 | Tarnanen et al. ............ 709/230 |
| 2004/0203737 | A1* | 10/2004 | Myhre et al. ............... 455/426.1 |
| 2005/0181759 | A1* | 8/2005 | Hundscheidt et al. ........ 455/408 |

FOREIGN PATENT DOCUMENTS

| | | |
|---|---|---|
| RU | 2005-102487 | 7/2005 |
| RU | 2004-138808 | 8/2005 |
| RU | 2004-124050 | 1/2006 |
| RU | 2005-125597 | 1/2006 |

OTHER PUBLICATIONS

Shiao-Li Tsai et al "VSGN: A Gateway Approach to Interconnect UMTS/WLAN Networks". Personal, Indoor and Mobile Radio Communications, 2002. vol. 1, Sep. 15, 2002, pp. 275-279.
Salkintzis et al "WLAN-GPRS Integration for Next-Generation Mobile Data Networks". IEEE Wireless Communications, vol. 9, No. 5, Oct. 2002, pp. 112-123.
Vriendt De J et al. "Mobile Network Evolution: A Revolution on the Move" IEEE Communications Magazine, IEEE Service Center, New York, NY, US vol. 40, No. 4, Apr. 2002, pp. 104-111.
3GPP: "3$^{rd}$ Generation Partnership Project; Technical Specification Group Services and System Aspects; 3GPP system to Wireless Local Area Network (WLAN) Internetworking; System Description (Release 6)" Draft 3GPP TS 23.234 V1.8.0, Apr. 2003.
"Digital cellular telecommunications system (Phase 2+); Universal Mobile Telecommunications System (UMTS); IP Multimedia Subsystem (IMS); Stage 2 (3GPP TS 23.228 V5.8.0 Release 5); ETSI TS 123 228" ETSI Standards, European Telecommunications Standards Institute, Sophia-Antipo, FR, vol. 3-SA2, No. V580, Mar. 2003.
Peersman G et al. "The Global System for Mobile Communications Short Message Service" IEEE Personal Communications Society, US, vol. 7, No. 3, Jun. 2000, pp. 15-23.
Haartsen J. "Bluetooth—The Universal Radio Interface for AD HOC, Wireless Connectivity" Ericsson Review (Incl. on), Ericsson, Stockholm, SE, No. 3, 1998, pp. 110-117.
Digital Cellular Telecommunications System (Phase 2+); Mobile Radio Interface Layer 3 Specification; Radio Resource Control Protocol (3GPP TS 04.18) Version 8.18.0 Release 1999); ETSI TS 101 503 V8.18.0 (Feb. 2003).
Digital Cellular Telecommunications System (Phase 2+); Universal Mobile Telecommunications System (UMTS); Point-to-Point (PP) Short Message Service (SMS) Support on Mobile Radio Interface (3GPP TS 24.011 version 5.1.0 Release 5); ETSI TS 124 011 V5.1.0 (Dec. 2002).
Digital Cellular Telecommunications System (Phase 2+); Universal Mobile Telecommunications System (UMTS); Technical Realization of Short Message Service (SMS) (3GPP TS 23.040 version 4.7.0 Release 4); ETSI TS 123 040 V4.7.0 (Jun. 2002).
Digital Cellular Telecommunications System (Phase 2+); Mobile-Services Switching Centre—Base Station System (MSC-BSS) Interface Layer 3 Specification (3GPP TS 0.808 version 8.13.0 Release 1999), ETSI TS 100 590 V8.13.0 (Jul. 2002).
Digital Cellular Telecommunications System (Phase 2+); Mobile Radio Interface Layer 3 Specification (3GPP TS 04.08 version 7.19.1 Release 1998), ETSI TS 100 940 V7.19.1 (Apr. 2003).
Universal Mobile Telecommunications System (UMTS); Radio Resource Control (RRC) Protocol Specification (3GPP TS 25.331 version 4.9.0 Release 4); ETSI TS 125 331 V4.9.0 (Mar. 2003).
Digital Cellular Telecommunications System (Phase 2+); Universal Mobile Telecommunications System (UMTS); Mobile Application Part (MAP) Specification (3GPP TS 29.002 version 5.9.0 Release 5); ETSI TS 129 002, V5.9.0 (Mar. 2004).
3$^{rd}$ Generation Partnership Project; Technical Specification Group Services and System Aspects; 3GPP System to Wireless Local Area Network (WLAN) Interworking; System Description (Release 6), 3GPP TS 23.234, V6.0.0 (Mar. 2004).
Information Technology—Telecommunications and Information Exchange Between Systems—Local and Metropolitan Area Networks—Specific Requirements—Part 11: Wireless LAN Medium Access Control (MAC) and Physical Layer (PHY) Specifications, ANSI/IEEE Std 802.11, 1999 Edition (R2003).
Salkintzis et al "WLAN-GPRS Integration for Next-Generation Mobile Data Networks". IEEE Wireless Communications, vol. 9, No. 5, Oct. 2002 pp. 112-123.
Vriendt De J et al. "Mobile Network Evolution: A Revolution on the Move" IEEE Communications Magazine, IEEE Service Center, New York, NY, US vol. 40, No. 4, Apr. 2002 pp. 104-111.
"Digital cellular telecommunications system (Phase 2+); Universal Mobile Telecommunications System (UMTS); IP Multimedia Subsystem (IMS); Stage 2 (3GPP TS 23.228 V5.8.0 Release 5); ETSI TS 123 228" ETSI Standards, European Telecommunications Standards Institute, Sophia-Antipo, FR, vol. 3-SA2, No. V580, Mar. 2003.
3GPP: "3$^{rd}$ Generation Partnership Project; Technical Specification Group Services and System Aspects; 3GPP system to Wireless Local Area Netowrk (WLAN) Internetworking; System Description (Release 6)" Draft 3GPP TS 23.234 V1.8.0, Apr. 2003.

* cited by examiner

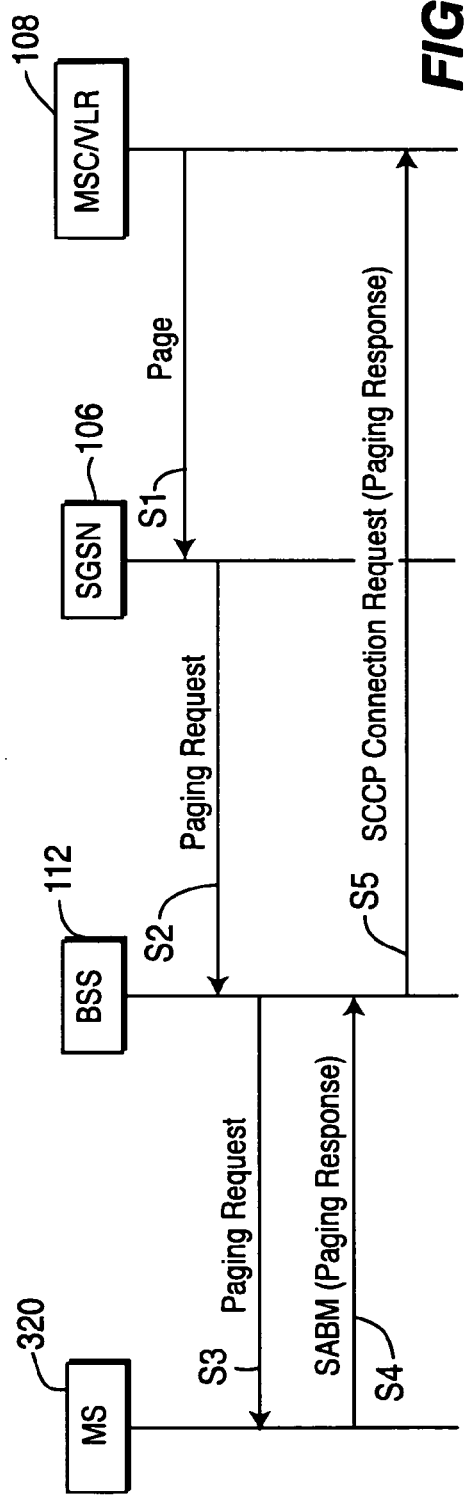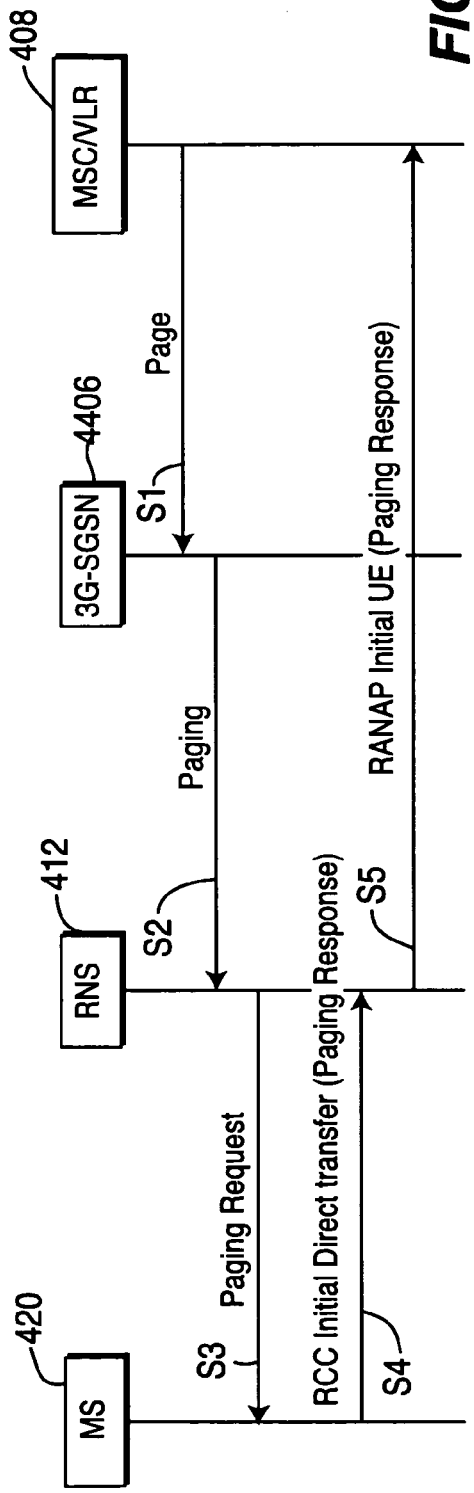

- USER CHOOSES BETWEEN TEXT OR VOICE MESSAGING.
- SELECTS THE GROUP FROM HIS CONTACT LIST.
- PUSHES THE BUTTON FOR PTT OR TEXT MESSAGE

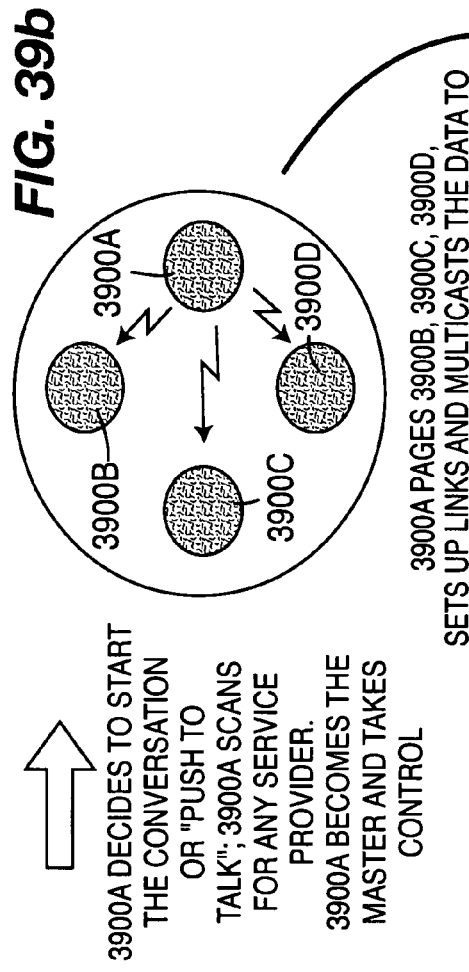

FIG. 39a

3900A THRU 3900D ARE ON AND IN LISTENING MODE

PERIMETER OF AREA SERVICED

FIG. 39b

3900A DECIDES TO START THE CONVERSATION OR "PUSH TO TALK"; 3900A SCANS FOR ANY SERVICE PROVIDER. 3900A BECOMES THE MASTER AND TAKES CONTROL

3900A PAGES 3900B, 3900C, 3900D, SETS UP LINKS AND MULTICASTS THE DATA TO 3900B, 3900C, 3900D; 3900A STILL THE MASTER, HAS THE TOKEN

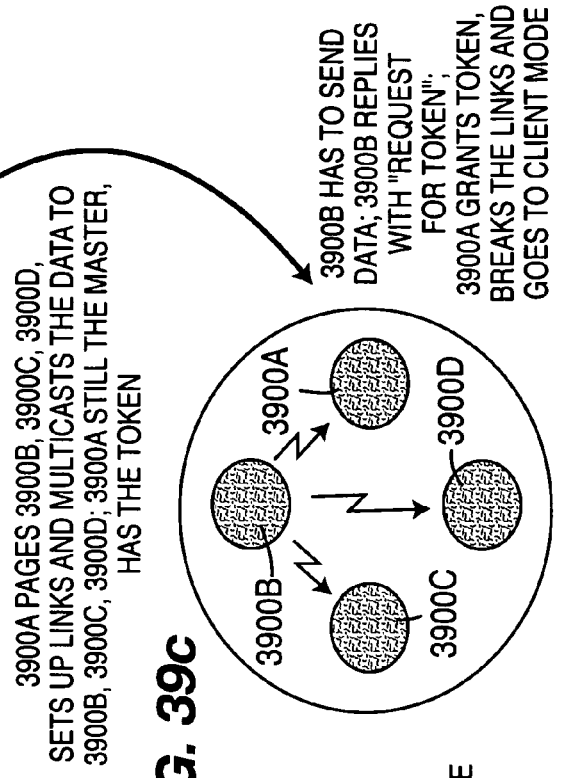

FIG. 39c

3900C DECIDES TO SEND MESSAGE OR "PUSH TO TALK"; REQUESTS TOKEN, BECOMES THE MASTER AND TAKES CONTROL

3900B HAS TO SEND DATA; 3900B REPLIES WITH "REQUEST FOR TOKEN"; 3900A GRANTS TOKEN, BREAKS THE LINKS AND GOES TO CLIENT MODE

3900B SWITCHES FROM CLIENT TO SERVER MODE; PAGES 3900A, 3900C, 3900D, SETS UP LINKS AND MULTICASTS THE DATA TO 3900A, 3900C, 3900D; 3900B is THE MASTER, HAS THE TOKEN

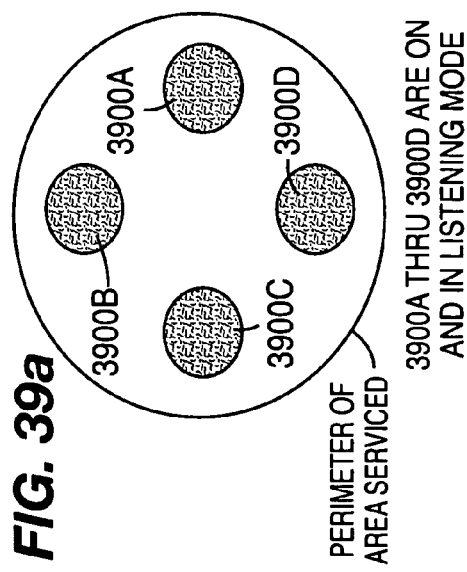

FIG. 39d

3900C GETS TOKEN AND BECOMES MASTER

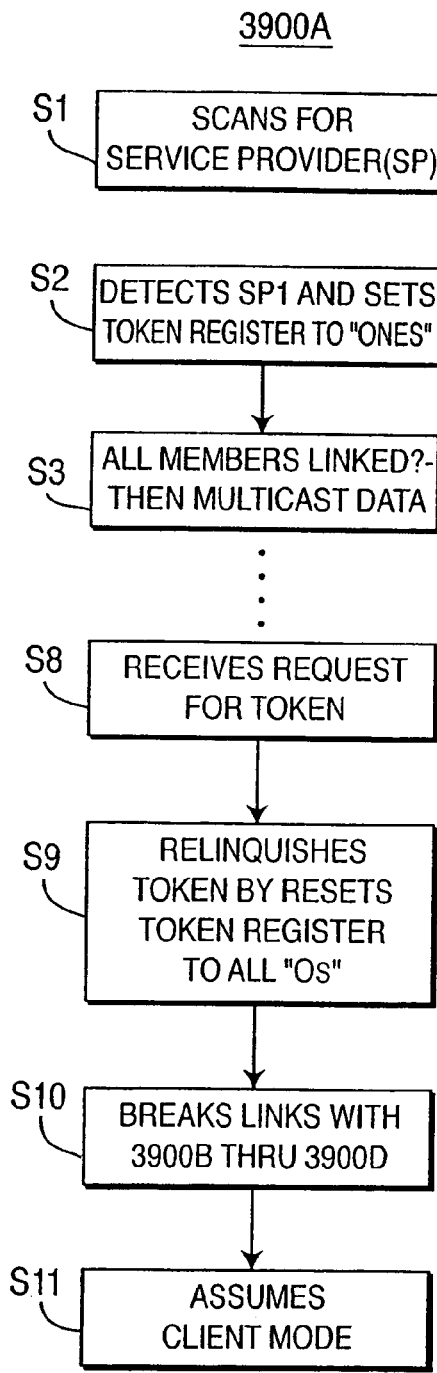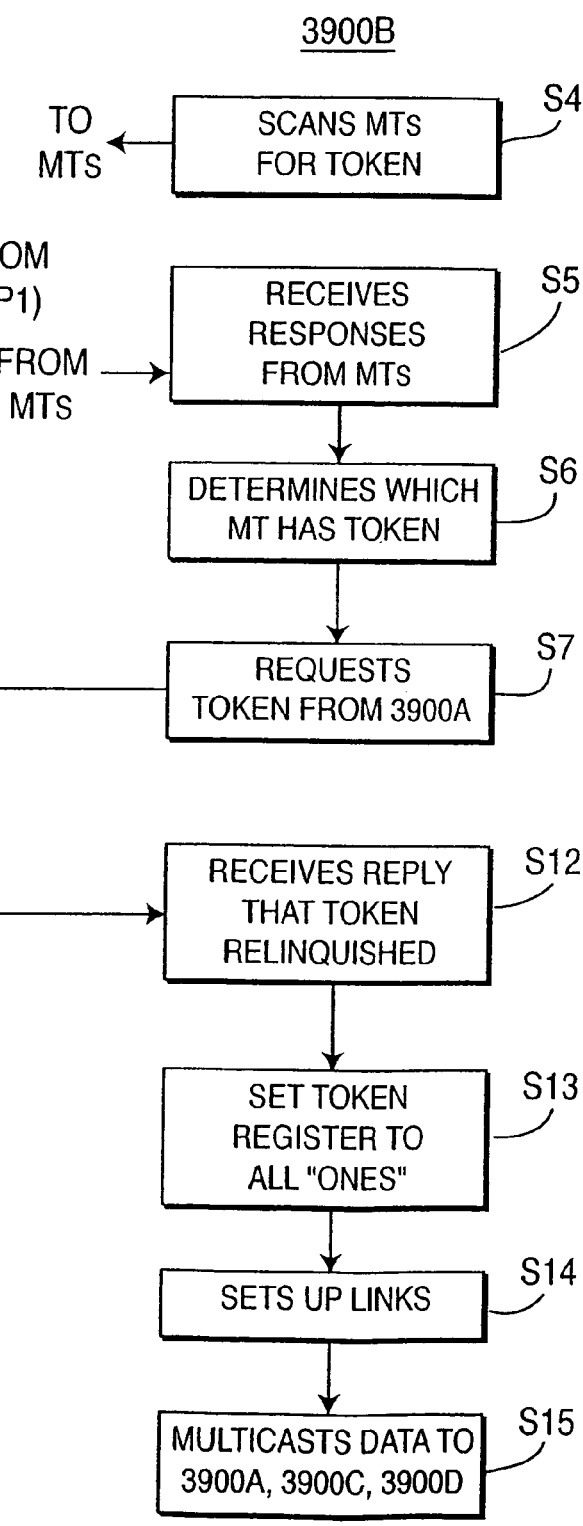
FIG. 40a
FIG. 40b

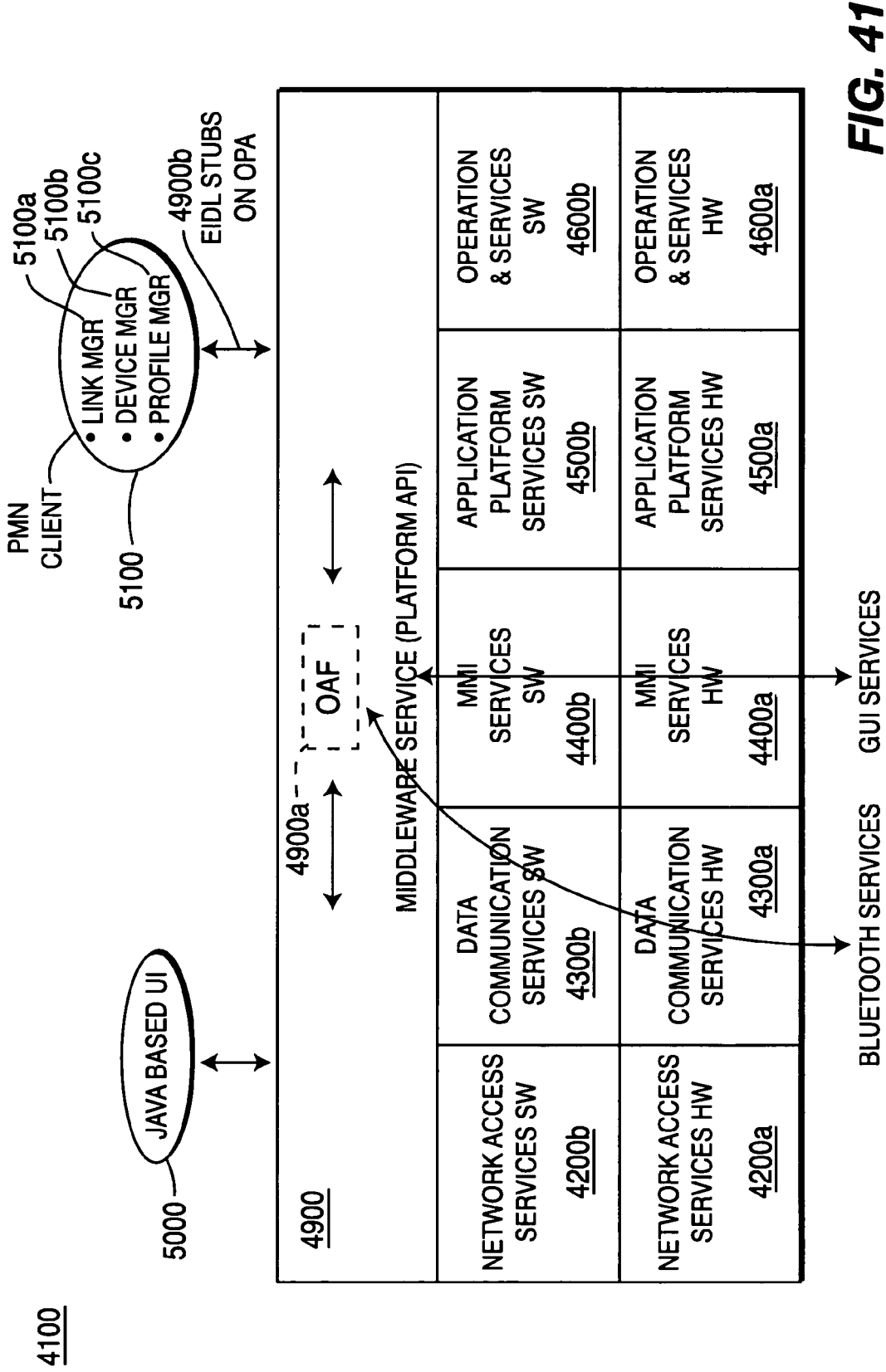

METHOD AND APPARATUS FOR DELIVERY OF DATA-BASED/VOICE SERVICES OVER PICONETS AND WIRELESS LANS (WLANS) COUPLED TO 3GPP DEVICES INCLUDING PROTOCOL ARCHITECTURE AND INFORMATION ELEMENTS RELATING TO SHORT MESSAGE SERVICES (SMS) OVER WLANS

CROSS REFERENCE TO RELATED APPLICATION(S)

This application claims priority from U.S. Provisional Application Nos. 60/466,911 filed May 1, 2003; 60/469,670 filed May 12, 2003; 60/478,075 filed Jun. 12, 2003; 60/491,054 filed Jul. 30, 2003 and 60/498,171 filed Aug. 27, 2003 which are incorporated by reference as if fully set forth.

FIELD OF INVENTION

The present invention relates generally to the delivery of data-based services over wireless local area networks (WLANs). More particularly the present invention relates to methods and devices for delivering packet-switched, circuit-switched, IMS paging, SMS, and/or other services over WLANs that are coupled to one or more 3GPP devices and further to protocol architecture for a universal mobile telecommunications system (UMTS) and code division multiple access 2000 (CDMA 2000) SMS support over WLANs and further to provide personal text and voice messaging such as IMS and PTT technology restricted to a small group of users operating in a small geographic location without support of a network.

BACKGROUND

Although the meanings of the following acronyms are well understood by skilled artisans, the following list is deemed to assist in a better understanding of the invention:
  3GPP Third Generation Partnership Project
  AAA Authentication, Authorization, and Accounting
  CCF Charging Control Function
  CM Call Management
  CS Cause
  CSCF Call State Control Function
  DA Destination Address
  DCS Data Coding Scheme (3GPP TS 23.040)
  DI Dialogue Identifier TCAP
  EIR Equipment Identity Register
  GGSN Gateway GPRS Support Node
  GMSC Gateway MSC
  GMSCA GMSC Address
  GPRS General Packet Radio System
  GSM Global System for Mobile Communication
  HLR Home Location Register
  IMS Internet Multimedia Subsystem
  IMSI International Mobile Subscriber Identity
  IWMSC Interworking MSC for SMS
  MAL MSIsdn-Alert (3GPP TS 23.040)
  MGCF Media Gateway Control Function
  MGW Media Gateway
  MMS More Messages to Send (3GPP TS 23.040)
  MR Message Reference (3GPP TS 23.040)
  MS Mobile Station
  MSC/VLR Mobile Services Switching Center/Visitor Location Register
  MSCA MSC Address
  MSI Mobile Waiting Set Indication (3GPP TS 23.040)
  MSIsdn Mobile Station ISDN number
  MSM More Short Messages (3GPP TS 29.002[15])
  MSRN Mobile Station Roaming Number
  MT Mobile Terminal
  MTI Message Type Indicator (3GPP TS 24.011[13])
  MWD Messages Waiting Data
  MWS Message Waiting Set (3GPP TS 23.040)
  NAS Non Access Stratum
  OA Originating Address
  OC Operation Code (3GPP TS 29.002 [15])
  OCS Online Charging System
  PCF Policy Control Function
  PCI Protocol Control Information
  PDG/PDGW Packet Data Gateway
  PDI Protocol Discriminator
  PDN Packet Data Network
  PDU Protocol Data Unit
  PRI Priority (3GPP TS 23.040)
  RAN Radio Access Network
  RCT Reception Time (3GPP TS 23.040)
  REA Recipient Address (3GPP TS 23.040)
  RL Relay function (3GPP TS 24.011[13])
  RP Reply Path (3GPP TS 23.040)
  R-SGW Roaming SGW
  SC Service Center
  SC Service Centre (3GPP TS 23.040)
  SCA Service Centre Address (3GPP TS 23.040)
  SCTS Service Centre Time Stamp (3GPP TS 23.040)
  SGSN Serving GPRS Support Node
  SGW Signaling Gateway
  SIP Session Initiation Protocol
  SM Short Message (3GPP TS 23.040)
  SM-AL Short Message Application Layer (3GPP TS 23.040)
  SME Short Message Entity (3GPP TS 23.040)
  SMI Short Message Identifier (3GPP TS 23.040)
  SM-LL Short Message Link Layer
  SM-RL Short Message Relay Layer (3GPP TS 23.040, 24.011[13])
  SMS Short Messaging Service
  SMS-GMSC Short Message Service Gateway MSC (3GPP TS 23.040)
  SMS-IWMSC Short Message Service Interworking MSC (3GPP TS 23.040)
  SoR Status of Report (3GPP TS 23.040)
  SM-TL Short Message Transfer Layer (3GPP TS 23.040)
  SRI Status Report Indication (3GPP TS 23.040)
  SRR Status Report Request (3GPP TS 23.040)
  TCAP Transaction Capabilities Application Part
  TE Terminal Equipment
  TID Transaction Identifier
  T-SGW Transport SGW
  TPDU Transfer Protocol Data Unit
  UD User Data
  UDL User Data Length (3GPP TS 23.040)
  UE User Equipment
  UMTS Universal Mobile Telecommunications System
  UTRAN UMTS Terrestrial Radio Access Network
  VP Validity Period (3GPP TS 23.040)
  VPF Validity Period Format (3GPP TS 23.040)
  WAG Wireless Access GatewayWLAN Wireless Local Area Network At the present time, the wireless industry is rapidly moving from voice to data services, from a verbal to a visual universe of applications. Users are demanding new features, such as the ability to send and receive emails, surf the World Wide Web (WWW), and send images, all from their wireless handheld terminals. The focus is on developing services, including advanced forms of messaging, mobile entertainment, and location-based applications that are available whenever and wherever they are needed.

One currently popular data service is known as "short message service", hereinafter referred to as SMS. SMS has enjoyed ever-increasing popularity in many areas of the world, and this popularity is only expected to grow.

Short message services (SMS) are supported over existing wireless communication systems, including 2G GSM systems (i.e., circuit switch (CS) technology) and 2.5G GPRS systems (i.e., packet switch (PS) technology). The support of SMS is also provided over the most recent technologies (i.e., 3G UMTS and CDMA2000). However, the introduction of WLAN interworking with UMTS/CDMA2000 (or 3GPP/ 3GPP2 systems) has created a new environment that is not defined in terms of standard procedures and protocol architecture. Currently, there is no support for SMS over Interworked-WLAN systems. The overall architecture and procedures for UMTS/CDMA2000 based SMS are currently in the early development stage, and there are no standards or defined provisions for this purpose at this time. There is need for new protocol architecture for SMS over WLANs, in particular for a protocol for SMS services over WLAN interworked with UMTS/CDMA2000 systems.

The increased demand for mobile data communications raises some key interoperability challenges. Existing wireless networks have evolved during a time when voice, (not data), communications were of paramount importance. Early cellular network infrastructures included a radio access network coupled to a plurality of mobile switching centers (MSCs) which, in turn, were coupled to the Public Switched Telephone Network (PSTN). These devices operated in the circuit-switched domain, so as to implement voice communications. Unfortunately, the circuit-switched domain is highly inefficient when used to convey data communications, which led to the development of various alternate network topologies.

In GSM and GPRS architectures, the radio access network is coupled to one or more serving GPRS switching nodes (SGSNs) which, in turn, are coupled to one or more gateway GPRS switching nodes (GGSNs). The GGSNs are each coupled to an IP (Internet Protocol) network, which is either public or private. In this manner, the SGSNs and GGSNs implement packet-based switching to provide for efficient transfer of data between the radio access network and the IP network. Such data can include, for example, subscriber-originating short messages, subscriber-terminating short messages, IMS paging data, or other types of packet data.

If a mobile subscriber wishes to access the Internet (or a private Intranet) from a wireless handheld terminal, it is possible to do so via the radio access network, using a data communications pathway that includes one or more SGSNs, GGSNs, and an IP network. However, for many system applications, it would be desirable to access the IP network via another path, such as a wireless local area network (WLAN), to avoid adverse impacts on the ability of the radio access network to carry conventional voice communications.

WLAN technology is enjoying increased usage in homes, offices, and indoor public areas. Meanwhile, mobile service providers are exploring opportunities to extend their service portfolios by providing WLAN "hot-spot" access. By way of illustration, travelers waiting in airport lounges can access the Internet over a laptop computer that is equipped with a WLAN card. This enables end users to access their home office from virtually any location without any noticeable change in network performance. To support such services in commercial, enterprise and home networking environments, WLAN research and development is proceeding at a brisk pace. Rapid deployments of IEEE 802.11b, 802.11a and 802.11g are in progress, with a large number of companies involved in the design and manufacture of components based on the IEEE 802.11 Standards. These deployments are expected to increase as consumer interest increases.

Even though a WLAN provides a complementary service to GSM and other radio access network operators, interoperability standards have yet to be developed. As a result, subscribers do not have seamless coverage of all data services when switching between a radio access network and a WLAN. For example, in the context of a 3GPP-equipped network, subscribers are not able to receive SMS when they are accessing a WLAN. The ability to properly deliver other types of packet-switched or circuit-switched data, including IMS paging data, may also be compromised when a WLAN is utilized in conjunction with 3GPP equipment.

FIG. 1 sets forth a related art architecture for circuit and packet switching in the context of a GPRS and GSM network. An SM-SC 100 (short message service center) is coupled to an SMS-GMSC/SMS-IWMSC 102 (short message service-gateway message switching center/interworking message service center for SMS). SMS-GMSC/SMS-IWMSC 102 is equipped to operate using at least three different types of interfaces, set forth below.

A "C" interface operates between an HLR 104 (home location register) and SMS-GMSC/SMS-IWMSC 102. Each call originating outside of the GSM (such as an MS terminating a call sent from the PSTN) has to go through a gateway to obtain the routing information required to complete the call. A protocol known as MAP/C is used over the "C" interface for this purpose. Also, the MSC optionally forwards billing information to HLR 104 after call clearing.

A "Gd" interface, operating between SMS-GMSC/SMS-IWMSC 102 and SGSN 106, uses the MAP/G protocol to transfer subscriber information during a location update procedure.

An "E" interface operating between SMS-GMSC/SMS-IWMSC 102 and MSC/VLR 108 (mobile service switching center/visitor location register) interconnects two MSCs, and is used to exchange data related to handover between an anchor MSC and a relaying MSC using the MAP/E protocol.

A "D" interface is provided between MSC/VLR 108 and HLR 104. This interface uses the MAP/D protocol to exchange information related to the location of the MS and/or the management of the subscriber. A "Gs" interface is used between MSC/VLR 108 and SGSN 106. The "Gs" interface interconnects two VLRs of different MSCs, using the MAP/G protocol to transfer subscriber information during a location update procedure. An "Iu" interface is employed between MSC/VLR 108 and a UTRAN 110 (UMTS terrestrial radio access network). Messages exchanged over the "Iu" interface are relayed transparently through a BSS (base station system). Finally, an "A" interface operates between MSC/VLR 108 and BSS 112. The "A" interface manages the allocation of suitable radio resources to the MSs, and also implements functions related to mobility and security management.

Terminal equipment, such as TE 114 and TE 116, may be coupled to mobile terminals, such as MT 118 and MT 120, respectively. Illustratively, communications between the TEs 114, 116 and the MTs 118, 120 takes place over an "R" interface. In turn, MT 118 communicates with UTRAN 110 over a "Uu" interface, and MT 120 communicates with BSS 112 over a "Um" interface. "Uu" refers to an over-the-air interface for exchanging information between a UMTS-equipped MT and a UMTS-equipped radio access network. Similarly, "Um" refers to an over-the-air interface between an MS and a BSS. The "Um" and "Uu" interfaces both use link access protocol-Dm channel (LAPDm), a modified version of the ISDN link access protocol-D channel (LAPD), for signaling.

UTRAN 110 is coupled to SGSN 106 using an "Iu" interface which, as previously mentioned, acts as a transparent relay for conveying messages between MSC/VLR 108 and an MS via BSS 112. A "Gb" interface is employed between BSS 112 and SGSN 106. The "Gb" interface is ultimately used to interconnect two VLRs of different MSCs, using the MAP/G protocol to transfer subscriber information during location update procedures, in this case via the BSS which has established communication with the MS. Subscriber information is also transferred during location update procedures using "Gs", "Gr", "Gn", "Gi", and "Gc" interfaces. The "Gs" interface links MSC/VLR 108 with SGSN 106; the "Gr" interface connects SGSN 106 with HLR 104; the "Gc" interface links HLR 104 with a GGSN 122; the "Gn" interface links SGSN 106 with GGSN 122; and the "Gi" interface links GGSN 122 with a PDN 124 (packet data network) coupled to TE 126.

SGSN 106 is coupled to an equipment identity register (EIR) 128 over a "Gf" interface. Basically, EIR 128 is a database which stores data related to mobile equipment. Whereas subscriber data is handled by HLR 104 and MSC/VLR 108, the EIR 128 stores relevant mobile equipment related data that may be employed, for example, to track down stolen mobile equipment, or to monitor malfunctioning mobile equipment. SGSN 106 is also coupled to charging gateway function (CGF) 130 over a "Ga" interface; and CGF 130, in turn, is coupled to a billing system 132. SGSN 106 may illustratively be coupled to an additional SGSNs, such as SGSN 134 through a "Gn" interface described previously. The SGSN is coupled to GGSN 122 by interface Gn and to GGSN 136 by interface GP. A CAMEL GSM-SCF (Customized Application for Mobile network Enhanced Logic, GSM Service Control Function) 138 is coupled to SGSN 106 by a "Ge" interface.

With respect to handling the Short Message Service (SMS), the overall requirements of the various elements of FIG. 1 (MSC/VLR 108, SMS-GMSC/SMS-IWMSC 102, and SGSN 106) provide message routing and intermediate buffering as set forth below.

(A) Requirements for Mobile-Terminating Short Messages (i) Functionality of SMS-GMSC of SMS-GMSC/SMS-IWMSC 108

When receiving a short message TPDU (transfer protocol data unit) from the SM-SC 100, the SMS-GMSC of SMS-GMSC/SMS-IWMSC 102 receives the short message TPDU, and inspects the TPDU parameters. If the TPDU parameters are incorrect, the SMS-GMSC returns the appropriate error information to the SM-SC 100 in the form of a failure report. If errors are not found in the parameters, HLR 104 is interrogated and retrieves routing information or possible error information. In the case of error information, HLR 104 returns a failure report to the SC.

If no errors are indicated by HLR 104, then the short message TPDU is transferred to the MSC 108 or SGSN 106 using the routing information obtained from HLR 104. In cases where two addresses (SGSN and MSC) are received from the HLR 104, the SMS-GMSC may choose via which nodes (SGSN or MSC) the SMS is sent. SMS delivery via the SGSN is normally more radio resource efficient than SMS delivery via the MSC.

If one address (SGSN or MSC) is received from HLR 104, at the time the report associated with the short message is received from the MSC 108 or SGSN 106, the SMS/GMSC performs the following operational sequence:

(a) If the report indicates successful delivery/the HLR 104 is notified of successful delivery via the MSC 108 or the SGSN 106, which causes the HLR 104 to alert any service centers whose addresses are stored in the messages waiting data (MWD) for the MS; and the successful report is created and sent to the SC 100.

(b) If the report is a failure report indicating "absent subscriber" via the MSC 108 or the SGSN 106, then the HLR 104 is requested to insert the address of the originating SC into the MWD (if implemented) with the indication of absent subscriber; the HLR 104 is informed of the reason for the MS being absent via the MSC 108 or the SGSN (if this information is available); where necessary, a link is established with the addressed SC; and the negative report is created and sent to the SC which includes the reason for the MS being absent so that the SC may adjust any retry algorithm appropriately.

(c) If the report is a failure, a message is sent indicating "MS memory capacity exceeded" via the MSC or the SGSN by requesting the HLR 104 to insert the address of the originating SC into the MWD (if implemented) with the message "MS Memory Capacity Exceeded" via the MSC or the SGSN; establishing, where necessary, a link with the addressed SC; and creating and sending the report to the SC.

(d) If two addresses (SGSN and MSC) are received from the HLR 104, then upon receiving the first report associated with the short message from the MSC or SGSN, the SMS/GMSC 102 performs the following operational sequence. If the first report indicates successful delivery, the HLR 104 is notified of the successful delivery via the MSC or the SGSN, which causes the HLR to alert any service centers whose addresses are stored in the MWD for the MS; and the successful report is created and sent to the SC.

(e) If the first report is a failure report indicating any of a/an: unidentified subscriber, unsupported facility, absent subscriber with indication GPRS or IMSI Detach, system failure, unexpected data value, data missing, or GPRS connection suspended; then the short message TPDU is transferred to the second path using the routing information obtained from HLR 104.

(f) If the second report indicates successful delivery the HLR 104 is notified of the successful delivery of the second transfer via the MSC or SGSN, which causes the HLR 104 to alert any service centers whose addresses are stored in the MWD for the MS; the HLR 104 is notified of the unsuccessful delivery at first transfer only with cause "absent subscriber"; the HLR 104 is notified of the reason for the MS being absent via the MSC or the SGSN (if this information is available); when necessary, a link is established with the addressed SC; and the successful report is created and sent to the SC.

(g) If the second report is a failure report the HLR 104 requests to insert the address of the originating SC into the MWD (if implemented) only if at least one of the first or second report failed due to "MS Memory Capacity Exceeded" or "Absent Subscriber"; the HLR 104 is notified only with the causes "Absent Subscriber", "Memory Capacity Exceeded" via the MSC or the SGSN, or both; the HLR 104 is notified of the reason for the MS being absent via the MSC, SGSN or both (if this information is available); where necessary, a link is established with the addressed SC; and the negative report is created and sent to the SC with errors from the first and second path.

(ii) Functionality of MSC of MSC/VLR 108

When receiving a short message TPDU from SMS-GMSC/SMS-IWMSC 102, ("Forward Short Message"), the MSC performs the following operations: 1) receive the short message TPDU; and 2) retrieve information from the VLR (location area address and, when appropriate, error information).

If errors are indicated by the VLR; the MSC returns the appropriate error information to the SMS-GMSC in a failure report. If no errors are indicated by the VLR, the MSC transfers the short message to the MS.

When receiving a confirmation that the message is received by the MS, the MSC relays the delivery confirmation to the SMS-GMSC in a delivery report. When receiving a failure report of the short message transfer to the MS, the MSC returns the appropriate error information to the SMS-GMSC in a failure report. When receiving a notification from the MS that it has memory available to receive one or more short messages, the MSC relays the notification to the VLR.

If errors are indicated by the VLR, returning the appropriate error information to the MS in a failure report.

When there is an ongoing MT-SMS transfer to the MS, or other busy condition for the MT-SMS, the MSC has the option to store the TPDU in a queue for a short time (which must be shorter than the supervision timer defined in 3GPP TS 29.002 [15]). The maximum time that a message may be queued is related to the permitted delay for the MSC to respond to the SMS-GMSC. When the MS becomes available for MT-SMS transfer, the stored TPDUs are delivered to the MS on a first-in first-out basis. If a message is not successfully transferred to the MS within the permitted time, the MSC returns an appropriate error to the SMS-GMSC.

(iii) Functionality of SGSN 106

When receiving a short message TPDU from SMS-GMSC/SMS-IWMSC 102 ("Forward Short Message"), SGSN 106: receives the short message TPDU and, if errors are detected, the SGSN 106 returns the appropriate error information to the SMS-GMSC in a failure report.

If no errors are detected by the SGSN 106, the SGSN 106 transfers the short message to the MS.

When receiving a confirmation that the message is received by the MS, the SGSN 106 relays the delivery confirmation to the SMS-GMSC in a delivery report. When receiving a failure report of the short message transfer to the MS, the SGSN 106 returns the appropriate error information to the SMS-GMSC in a failure report. When receiving a notification from the MS that it has memory available to receive one or more short messages, if errors are detected by the SGSN 106, it returns the appropriate error information to the MS in a failure report. If no errors are detected by SGSN 106 it notifies the HLR 104 of memory available in the MS via the SGSN.

When the MS becomes reachable again it notifies the HLR of MS being reachable via the SGSN.

When there is an ongoing MT-SMS transfer to the MS, or other busy condition for MT-SMS, the SGSN has the option to store the TPDU in a queue for a short time (which must be shorter than the supervision timer defined in 3GPP TS 29.002 [15]). The maximum time that a message may be queued is related to the permitted delay for the SGSN to respond to the SMS-GMSC. When the MS becomes available for MT-SMS transfer, the stored TPDUs are delivered to the MS on a first-in first-out basis. If a message is not successfully transferred to the MS within the permitted time, the SGSN returns an appropriate error to the SMS-GMSC.

(B) Requirements for Mobile-Originating Short Messages (i) Functionality of MSC of MSC/VLR 108

When receiving a short message TPDU from the MS, the MSC receives the short message TPDU; retrieves information from the VLR, as well as the MSISDN of the MS and, when appropriate, error information. The retrieval of information from the VLR is followed by the VLR investigating the mobile station not reachable flag (MNRF) to be used in the alerting procedure. If errors are indicated by the VLR, the MSC returns the appropriate error information to the MS in a failure report. If no errors are indicated by the VLR, the MSC inspects the RP-DA parameter.

If parameters are incorrect, the MSC returns the appropriate error information to the MS in a failure report. If no parameter errors are found, the MSC transfers the short message TPDU to the SMS-IWMSC of SMS-GMSC/SMS-IWMSC 102. Note that the functionality of the SMS-IWMSC may be implemented by the MSC.

When receiving the report of the short message from the SMS/IWMSC, the MSC is responsible for relaying the report to the MS.

(ii) Functionality of SMS-IWMSC of SMS-GMSC/SMS-IWMSC 102

When receiving a short message TPDU from the MSC or SGSN, the SMS-IWMSC receives the short message TPDU; establishes where necessary, a link with the addressed SC; and transfers the short message TPDU to the SC if the address is valid.

If a report associated with the short message is not received from the SC before a timer expires, or if the SC address is invalid, the SMS-IWMSC relays the report to the MSC or SGSN. If a report is associated with the short message is not received from the SC before a timer expires, or if the SC address is invalid, the SMS-IWMSC returns the appropriate error information to the MSC or SGSN in a failure report. The value of the timer is dependent on the protocol between the SC and the SMS-IWMSC.

(iii) Functionality of SGSN 106

When receiving a short message TPDU from the MS, SGSN 106 receives the short message TPDU and inspects the RP-DA parameter. If parameters are incorrect the SGSN transfers the short message TPDU to the SMS-IWMSC. When receiving the report of the short message from the SMS-IWMSC, the SGSN 106 relays the report the MS.

(C) SMS-IWMSC Functionality Related To Alerting

When receiving an alert from the HLR, the SMS-IWMSC of SMS-GMSC/SMS-IWMSC 102 inspects the switching center (SC) address; generates an RP-Alert-SC; and transfers the RP-Alert-SC to the SC. If the SC address is not valid, then no further action is taken.

(D) Fundamental Procedures Within SMS

SMS encompasses three fundamental procedures:

1) Short message mobile terminated (SM-MT). This procedure includes transferring a short message or status report from the SC to the MS; and returning a report to the SC, containing the result of the message transfer attempt.
2) Short message mobile originated (SM-MO). This procedure includes transferring a short message from the MS to the SC; and returning a report to the MS, containing the result of the message transfer attempt.
3) Transfer of an Alert. This procedure includes the operational sequences necessary for an HLR or a VLR to initiate a transfer of an Alert to a specific SC, informing the SC that the MS has recovered operation.

Standard 3GPP TS 29.002 [15] defines operations required for the provision of the Short Message Service (SMS). The operations defined in clause 10 set forth the requirements that the SMS imposes upon network functionality. Annex C indicates the flow of primitives and parameters during the short message transfer between the SC and the MS. Both the mobile terminated (MT) and the mobile originated (MO) cases are covered.

Refer now to FIG. 2, which is a data structure diagram setting forth an illustrative related art SMS delivery mechanism over a GPRS and GSM-equipped network. The entities involved in SMS delivery include Short Message—Service Center (SM-SC) 100, SMS-GMSC/SMS-IWMSC 102, HLR 204, MSC/SGSN 206, VLR 208, and MS 220. SM-SC 100, SMS-GMSC/SMS-IWMSC 102, and HLR 204 (FIG. 2) are identical to the corresponding entities shown in FIG. 1, whereas the SGSN portion of MSC/SGSN 206 (FIG. 2) is analogous to SGSN 106 of FIG. 1, HLR 204 (FIG. 2) is analogous to HLR 104 of FIG. 1, and VLR 208 (FIG. 2) is analogous to the VLR portion of MSC/VLR 108 (FIG. 1).

Although FIG. 2 shows SM-SC 100 connected to a single MSC/SGSN 206 and illustratively involves a single public land mobile network (PLMN), as a practical matter, SM-SC 100 may be connected to several PLMNs and also to several MSC/SGSN's. SM-SC 100 is addressed from mobile equipment, such as TE 114 or MT 118 (FIG. 1) by an E.164 number. This number uniquely identifies SM-SC 100 to a particular PLMN.

Pursuant to the data flow diagram of FIG. 2, the short message delivery process begins when an SMS message is conveyed from SM-SC 100 to SMS-GMSC/SMS-IWMSC 102 (S1). In response to receipt of the SMS, SMS-GMSC/SMS-IWMSC 102 requests retrieval of routing information from HLR 104 (S2), and optionally sends an acknowledgement or not acknowledged message (ACK/NAK) back to SM-SC 100 (S3). HLR 104 responds by sending an MSC/SGSN address to SMS-GMSC/SMS-IWMSC 102 (S4). In the case of an error, SMS-GMSC/SMS-IWMSC 102 sends an error message back to SM-SC 100 (S5).

Now that SMS-GMSC/SMS-IWMSC 102 knows the address of the appropriate MSC/SGSN 206 as identified by HLR 104, the SMS-GMSC/SMS-IWMSC 102 sends the SMS to that MSC/SGSN 206 (S6). MSC/SGSN 206 attempts to locate the appropriate destination MS 220 for the SMS with help from VLR 208 (S7), and then forwards the SMS message to that MS 220 (S8). MS 220 then sends an acknowledgment or not acknowledged message (ACK/NAK) back to MSC/SGSN 206 (S9). MSC/SGSN 206 sends the ACK/NAK message to SMS-GMSC/SMS-IWMSC 102 (S10) which, in turn, relays the ACK/NAK message back to SM-SC 100 (S11). In the case of an error, an error message is sent from MSC/SGSN 206 to SMS-GMSC/SMS-IWMSC 102 (S12), and thence, from SMS-GMSC/SMS-IWMSC 102 to SM-SC 100 (S13).

FIG. 3 is a data structure diagram setting forth an illustrative prior art CS (GSM) paging procedure over a GPRS and GSM-equipped network using the A/Gb protocol. The entities involved in A/Gb-mode CS paging include MS 320, base station system (BSS) 112, SGSN 106, and MSC/VLR 108. BSS 112, SGSN 106, and MSC/VLR 108 (FIG. 3) are identical to the corresponding entities shown in FIG. 1, whereas MS 320 (FIG. 3) may correspond to TE 116 and MT 120 of FIG. 1. The paging procedure commences when MSC/VLR 108 sends a page to SGSN 106 (S1). The page may include some or all of the following parameters sent by the MSC: IMSI, VLR TMSI, Channel Needed, Priority, and/or Location Information. Channel Needed indicates to the MS the type of CS channel that must be requested in the response. VLR TMSI and Channel Needed are optional parameters. Priority is the circuit-switched paging priority parameter.

SGSN 106 responds to the page by sending a paging request to BSS 112 (S2). The paging request is a BSS-GPRS protocol (BSSGP) request to the BSS serving the MS that includes some or all of the following parameters: IMSI, temporary logical link identifier (TLLI), VLR temporary mobile subscriber identity (TMSI), Area, Channel Needed, and/or quality of service (QoS). The Area parameter is derived from either the MS's MM context in SGSN 106 or, if no such information is available, from the Location Information received from MSC/VLR 108. Area indicates a single cell for a READY state MS, or a routing area for a STANDBY state MS. VLR TMSI and Channel Needed are included if received from the MSC. If Channel Needed was not received from the MSC, then a default Channel Needed parameter indicating circuit-based paging is included by SGSN 106. QoS indicates the priority of this Paging Request relative to other Paging Request messages buffered in BSS 112. If the location area where the MS was last known to be located has an associated null routing area, then the SGSN 106 sends an additional BSSGP Paging Request message to each BSS serving the null routing area.

BSS 112 translates the incoming BSSGP Paging Request message into one Radio Paging Request message per cell. If a dedicated radio resource is assigned to the MS in a cell, then BSS 112 transmits one Paging Request (VLR TMSI or IMSI, Channel Needed) message on this radio resource (S3), without stopping possible outgoing data transfers for the MS. Otherwise, BSS 112 pages the MS with one paging request (VLR TMSI or IMSI, Channel Needed) message on the appropriate paging channel in each addressed cell.

Responsive to BSS 112 forwarding the paging request to MS 320, MS 320 sends a set asynchronous balanced mode (SABM) message to BSS 112 (S4). BSS 112 responds to the SABM message by sending a signaling connection control part (SCCP) connection request to MSC/VLR 108 (S5). In cases where MS 320 is both IMSI and GPRS-attached in a PLMN that operates in mode I, the MSC/VLR executes paging for circuit-switched services via SGSN 106. Upon receipt of a Paging Request message for a circuit switched service, MS 320 may elect to respond to this request and, pursuant to such an election, the MS will follow standard, well-known CS procedures for paging response (random access, immediate assignment) as specified in GSM 04.08[13]. When received at BSS 112, the Paging Response message is sent to the MSC, which then stops the paging response timer.

Refer now to FIG. 4, a data structure diagram of a prior art CS (GSM) paging procedure over a GPRS and GSM-equipped network using the "Iu" protocol is shown. The entities involved in Iu-mode CS paging include MS 420, RNS 412, 3G-SGSN 406, and MSC/VLR 408. The paging procedure commences when MSC/VLR 408 sends a page to 3G-SGSN 406 (S1). The page may include some or all of the following parameters sent by the MSC/VLR: IMSI, VLR TMSI, Channel Needed, Priority, and/or Location Information. If VLR TMSI is not included, the IMSI is used instead of the TMSI as a paging address at the radio interface. If Location Information is not included, 3G-SGSN 406 pages MS 420 in all cells served by MSC/VLR 408 and 3G-SGSN 406, unless 3G-SGSN has reliable information about the location of MS 420.

3G-SGSN 406 responds to the page by sending a radio access network application part (RANAP) paging message to each radio network subsystem (RNS) 412 (S2). The RANAP paging message includes some or all of the following parameters: IMSI, TMSI, Area, and core network (CN) Domain Indicator. RNS 412 requires the IMSI parameter in order to calculate the MS 420 paging group, and to identify the paged MS 420. The TMSI parameter is included if it is received from MSC/VLR 408. The Area parameter indicates the area in which MS 420 is paged, and it is derived either from the MS's MM context in 3G-SGSN 406 or, if no such information is available, from the Location Information received from MSC/VLR 408. CN Domain Indicator indicates which domain (CS or PS) initiated the paging message and, in the present scenario, it must be set to "CS" by 3G-SGSN 406.

Upon receipt of a Paging Request message for a circuit-switched (CS) service (S3), MS 420 responds to this request and returns a paging response (S4) in the form of a radio resource control (RRC) Initial Direct Transfer message (refer to GSM 04.18 and 3GPP 25.331 for more details). The CN Domain Indicator is set to "CS" in the Initial Direct Transfer message. When received at RNS 412, the Paging Response message is sent in an RANAP Initial UE message to MSC/VLR 408 (S5), which then stops the paging response timer.

FIGS. 5 and 6 are data structure diagrams setting forth illustrative prior art GPRS network-initiated service request procedures. The entities involved in the procedures of FIGS. 5 and 6 include MS 520, SGSN 506, HLR 504, and GGSN 522. In addition, the procedure of FIG. 6 employs a radio network controller (RNC) 612.

Referring first to the procedure of FIG. 5, a packet data protocol, protocol data unit (PDP PDU) is received at GGSN 522 (S1). GGSN 522 sends routing information for GPRS to HLR 504 (S2). HLR 504 sends an acknowledgment message back to GGSN 522. GGSN 522 then sends a PDU notification request to SGSN 506 (S3). SGSN 506 responds to the PDU notification request by sending a PDU notification response back to GGSN 522 (S3A). SGSN 506 then requests packet data protocol (PDP) context activation from MS 520 (S4). MS 520 and GGSN 522 then engage in a PDP context activation procedure (S5).

With respect to the procedure of FIG. 6, when SGSN 506 (in this case, a 3G-SGSN) receives a downlink packet (Request PDP Context Activation, MT SMS, User Data) for an MS in packet mobility management—IDLE (PMM-IDLE) state (S1), SGSN 506 sends a paging request (S2A) to the MS520 using RNC 612 (S2). The paging request triggers the service request procedure in MS 520 (S3). The overall service request procedure operates as follows. First, SGSN 506 receives a downlink PDP PDU for MS 520 when the MS is in PMM-IDLE state. Next, SGSN 506 sends a paging message to RNC 612. RNC 612 pages MS 520 by sending a paging message to the MS. MS 520 establishes an RRC connection into the RNC 612 if none exists for CS traffic (S3, S3A).

The service request procedure continues when MS 520 sends a Service Request message (S4) to SGSN 506. A Service Request message includes one or more of the following parameters: P-TMSI, routing area identification (RAI), cipher key sequence number (CKSN), and Service Type. The Service Type parameter specifies the paging response (PR). The Service Request is carried over a radio link in an RRC Direct Transfer message and over the Iu interface in the RANAP Initial MS message. At this point, SGSN 506 may perform an authentication procedure. SGSN 506 is able to ascertain whether the downlink packet requires radio access bearer (RAB) establishment (i.e., downlink PDU) or does not (i.e., Request PDP Context Activation or MT SMS). SGSN 506 then performs the security mode procedure (S5).

If resources for the PDP contexts are reestablished, SGSN 506 sends an RAB Assignment Request (S6A) to RNC 612. The RAB Assignment Request includes one or more of the following parameters: (RAB ID(s), tunnel endpoint identifiers (TEIDs), QoS Profile(s), and SGSN IP Address(es)). RNC 612 sends a Radio Bearer Setup message (S6B), including one or more RAB ID(s), to MS 520. MS 520 responds to the Radio Bearer Setup message by returning a Radio Bearer Setup Complete message to RNC 612 (S6C). RNC 612 sends an RAB Assignment Response message to SGSN 506 (S6D) in order to indicate that GPRS tunneling protocol (GTP) tunnels are established on the Iu interface, and also to indicate that radio access bearers are established between RNC 612 and MS 520. The RAB Assignment response includes one or more of the following parameters: (RAB ID(s), TEID(s), and RNC IP Address(es)).

If RNC 612 returns a RAB Assignment Response message with a cause indicating that the requested QoS profile(s) cannot be provided (for example, the maximum requested bit rate is not available), then SGSN 506 may send a new RAB Assignment Request message specifying a different QoS profile or profiles. The number of re-attempts, if any, as well as the manner in which the new QoS profile(s) are determined, are implementation dependent. For each RAB reestablished with a modified QoS profile, SGSN 506 reinitiates a PDP Context Modification procedure to inform MS 520 and GGSN 522 of the new negotiated QoS profile for the corresponding PDP context (S7). SGSN 506 then transmits the downlink packet (S8).

Although FIGS. 1-6, teach the ability to deliver SMS and IMS paging over a cellular network there is a lack of systems and methods for delivering data-based services, such as SMS and IMS paging, over a WLAN.

SUMMARY

The present invention is characterized by method and apparatus for delivering data-based services over a WLAN coupled to one or more 3GPP devices by encapsulating data in IP format before delivery to the WLAN. In a first embodiment of the invention (direct SMS delivery with optional WAG), the data-based service is SMS and particularly UMTS/CDMA based SMS. Upon receipt of an SMS message, routing information pertaining to the message is retrieved. A PDGW address for the SMS message is identified. The SMS message is then sent to this identified PDGW address. The PDGW identifies the WLAN UE to which the SMS is to be delivered, and reformats the SMS message into IP format (text or encapsulation) so that the message is ready for delivery to the identified WLAN UE.

A second embodiment of the invention may be referred to as "direct SMS delivery with mandatory WAG". Upon receipt of an SMS message, routing information pertaining to the message is retrieved. A WAG address for the SMS message is identified. The SMS message is then sent to this identified WAG address. The WAG identifies the WLAN User Equipment for which the SMS message is to be delivered, and the WAG reformats the SMS message into IP format (text or encapsulation) so that the message is ready for delivery to the identified WLAN UE.

A third embodiment of the invention is known as "notification-based SMS delivery with optional WAG". Upon receipt of an SMS message at an SMS-GMSC/SMS-IWMSC, routing information pertaining to the message is retrieved. A PDG address for the SMS message is identified. The SMS message is then sent to this identified PDG address. The PDG identifies the WLAN User Equipment to which the SMS message is to be delivered, and notifies the User Equipment of the existence of an incoming SMS message. The PDG reformats the SMS message into IP format (text or encapsulation) so that the message is ready for delivery. The PDG then sends an SMS message notification to the WLAN. Upon receipt of the SMS message notification, the WLAN sends an acknowledgment message (ACK) to the PDG. The PDG responds to the acknowledgment message by sending the SMS message to the WLAN. The WLAN then transmits the SMS message to the previously identified User Equipment. Upon receipt of the SMS message, the User Equipment sends an SMS receipt message to the WLAN.

When the WLAN receives the SMS receipt message from the User Equipment, the WLAN generates a delivery report and sends the delivery report to the PDG. The PDG examines the delivery report to ascertain whether or not the SMS message was successfully delivered to the User Equipment. If so, the PDG sends an acknowledgment message (ACK) to the SMS-GMSC/SMS-IWMSC and, if not, the PDG sends a no-acknowledgment message (NAK) to the SMS-GMSC/SMS-IWMSC. Upon receipt of the ACK or NAK message, the SMS-GMSC/SMS-IWMSC generates a delivery report and sends the delivery report to the SM-SC.

A fourth embodiment of the invention is referred to as "notification-based SMS delivery with mandatory WAG". Upon receipt of an SMS message at an SMS-GMSC/SMS-IWMSC, routing information pertaining to the message is retrieved. A WAG address for the SMS message is identified. The SMS message is then sent to this identified WAG address. The WAG identifies the WLAN User Equipment for which the SMS message is to be delivered, and notifies the User Equipment of the existence of an incoming SMS message. The WAG reformats the SMS message into IP format (text or encapsulation) so that the message is ready for delivery. The WAG then sends an SMS message notification to the WLAN. Upon receipt of the SMS message notification, the WLAN sends an acknowledgment message (ACK) to the WAG. The WAG responds to the acknowledgment message by sending the SMS message to the WLAN. The WLAN then transmits the SMS message to the previously identified User Equipment. Upon receipt of the SMS message, the User Equipment sends an SMS receipt message to the WLAN. When the WLAN receives the SMS receipt message from the User Equipment, the WLAN generates a delivery report and sends the delivery report to the WAG. The WAG relays the delivery report to the SMS-GMSC/SMS-IWMSC, and the SMS-GMSC/SMS—sends the delivery report to the SM-SC.

A fifth embodiment of the invention is termed "WLAN-originated SMS delivery with optional WAG". A WLAN receives an incoming encapsulated SMS message from User Equipment (UE) and forwards the encapsulated SMS message to a PDG. The SMS message is encapsulated in IP format. The PDG decapsulates and reformats the SMS message from IP format into a standard SMS format. The standard format SMS message is then sent to an SMS-IWMSC. The SMS-IWMSC examines the SMS message and forwards the message to an SM-SC. In response to receipt of the SMS message, the SM-SC sends a delivery report to the SMS-IWMSC. The SMS-IWMSC sends the delivery report to the PDG, and the PDG relays the delivery report to the WLAN. Finally, the WLAN sends the delivery report back to the User Equipment which previously sent the encapsulated SMS message to the WLAN.

A sixth embodiment of the invention is termed "WLAN-originated SMS delivery with mandatory WAG". A WLAN receives an incoming encapsulated SMS message from User Equipment (UE) and forwards the encapsulated SMS message to a WAG. The SMS message is encapsulated in IP format. The WAG decapsulates and reformats the SMS message from IP format into a standard SMS format. The standard format SMS message is then sent to an SMS-IWMSC. The SMS-IWMSC examines the SMS message and forwards the message to an SM-SC. In response to receipt of the SMS message, the SM-SC sends a delivery report to the SMS-IWMSC. The SMS-IWMSC sends the delivery report to the WAG, and the WAG relays the delivery report to the WLAN. Finally, the WLAN sends the delivery report back to the User Equipment which previously sent the encapsulated SMS message to the WLAN.

A seventh embodiment of the invention provides for the notification of CS (circuit-switched) calls over a WLAN. A WLAN is coupled to User Equipment and also to a PDGW. Communications between WLAN, User Equipment, and PDGW are over standard IP-based links. Upon receipt of an incoming CS call, an MSC retrieves mobile routing information and sends this routing information to an HLR. In response to this routing information, the HLR sends a PDGW address back to the MSC. The MSC then sends a Page message to the PDGW address returned by the HLR. The Page message may, but need not, include a Mobile IP address. Upon receipt of the Page message, the PDGW locates the WLAN/UE and notifies the WLAN by sending the WLAN a Page Notification message. The WLAN alerts the User Equipment as to the existence of an incoming CS call. If the call is to be accepted at the User Equipment, the User Equipment sends an acceptance message back to the WLAN. In turn, the WLAN sends an acknowledgment (ACK) message to the PDGW. The PDGW responds to the ACK message by sending a Page Response message back to the MSC. The MSC stops the paging response timer and proceeds with delivery of the CS call over a GSM radio interface.

An eighth embodiment of the invention provides for the notification of GPRS/3G-based services over a WLAN. A WLAN is coupled to User Equipment and also to a PDGW. Communications between WLAN, User Equipment, and PDGW are over standard IP-based links. Upon receipt of an incoming PDP PDU, a GGSN retrieves mobile routing information and sends this routing information to an HLR. In response to this routing information, the HLR sends a PDGW address back to the GGSN. The GGSN then sends a PDU Notification message to the PDGW address returned by the HLR. The PDU Notification message may, but need not, include a Mobile IP address. Upon receipt of the PDU Notification message, the PDGW locates the WLAN/UE and notifies the WLAN by sending the WLAN a PDU Notification message. The WLAN alerts the User Equipment as to the existence of incoming data packets from a GPRS/3G data-based service. If the service is to be accepted at the User Equipment, the User Equipment sends an acceptance message back to the WLAN. In turn, the WLAN sends an ACK message to the PDGW. The PDGW responds to the ACK message by sending a PDU Notification Response message back to the GGSN. Optionally, the GGSN then repeats all or a portion of the aforementioned procedure over a GPRS/3G network.

A ninth embodiment of the invention provides for the notification of IMS-based services over a WLAN. A WLAN is coupled to User Equipment and also to a PDGW. Communications between WLAN, User Equipment, and PDGW are over standard IP-based links. Upon receipt of an incoming SIP call, a CSCF retrieves mobile routing information and sends this routing information to an HLR. In response to this routing information, the HLR sends a PDGW address back to the CSCF. The CSCF then sends an SIP Notify message to the PDGW address returned by the HLR. The SIP Notify message may, but need not, include a Mobile IP address. Upon receipt of the SIP Notify message, the PDGW locates the WLAN/UE and notifies the WLAN by sending the WLAN an SIP Notify message. The WLAN alerts the User Equipment as to the existence of an incoming SIP call. If the SIP call is to be accepted at the User Equipment, the User Equipment sends an acceptance message back to the WLAN. In turn, the WLAN sends an ACK message to the PDGW. The PDGW responds to the ACK message by sending an acknowledgment message back to the CSCF. Optionally, the CSCF then repeats all or a portion of the aforementioned procedure over a 3G network.

A tenth embodiment of the invention provides for the termination of IMS-based services over a WLAN. A WLAN is coupled to a UE and also to a PDGW. Communications between WLAN, UE, and PDGW are over standard IP-based links. Upon receipt of an incoming SIP call, a CSCF retrieves mobile routing information and sends this routing information to an HLR. In response to this routing information, the HLR sends a PDGW address back to the CSCF. The CSCF then sends a SIP Invite message to the PDGW address returned by the HLR. Upon receipt of the SIP Invite message, the PDGW locates the WLAN/UE and notifies the WLAN by sending the WLAN a SIP Invite message. The WLAN alerts the UE as to the existence of an incoming SIP call. If the SIP call is to be accepted at the UE, the UE sends an acceptance message back to the WLAN. In turn, the WLAN sends a SIP 200 OK message to the PDGW. The PDGW responds to the SIP 200 OK message by sending a SIP 200 OK message back to the CSCF. Optionally, the CSCF then sends the SIP 200 OK message over a 3G network.

Eleventh and twelfth embodiments provide two distinct alternative mechanisms, i.e., SMS tunneling and SMS proxy, for protocols for the delivery of SMS across the WLAN. As described, the invention is applicable to enhance the I.E.E.E. standard 802.11 in the context of UMTS and CDMA 2000; nevertheless, the invention is applicable in other scenarios as well.

A thirteenth embodiment of the present invention comprises providing text and voice messaging to a few mobile terminals operating in a small geographic location utilizing an adhoc network principal having a simple call control protocol at the application level and which provides very minimal impact on existing systems and hardware since no infrastructure support is needed and while taking advantage of existing technology and requiring only a software-based solution for fast and easy implementation. Existing technology may, for example, be based on Bluetooth (BT) radio and a platform which supports UMTS and preferably meets 3G requirements and supports dual-mode GSM/GPRS and WCDMA in accordance with 3GPP standards.

BRIEF DESCRIPTION OF THE DRAWING(S)

The invention will now be described referring to the following figures wherein like elements are designated by like alphanumeric designations and wherein:

FIG. 1 sets forth a prior art architectural diagram for implementing circuit and packet switching in the context of a GPRS and GSM network.

FIG. 3 is a data structure diagram setting forth a prior art CS (GSM) paging procedure over a GPRS and GSM-equipped network using the A/Gb protocol.

FIG. 4 is a data structure diagram setting forth a prior art CS (GSM) paging procedure over a GPRS and GSM-equipped network using the "Iu" protocol.

Figure 37B:
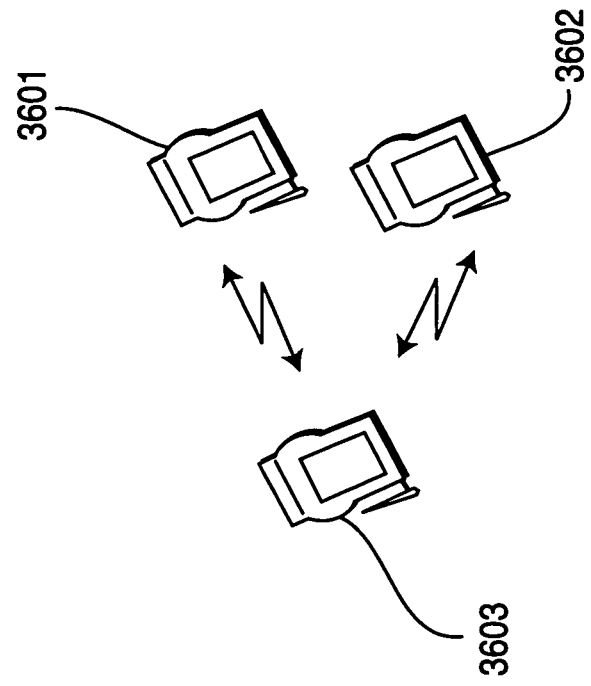
Figure 37A:
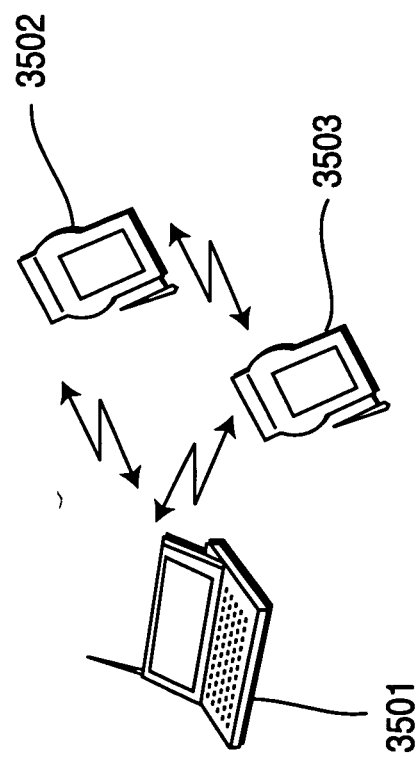

FIGS. 37*a* and 37*b* show examples of a piconet, FIG. 37*a* showing a peer to peer communications mode and FIG. 37*b* showing a hierarchical communications mode.

Figure 38:
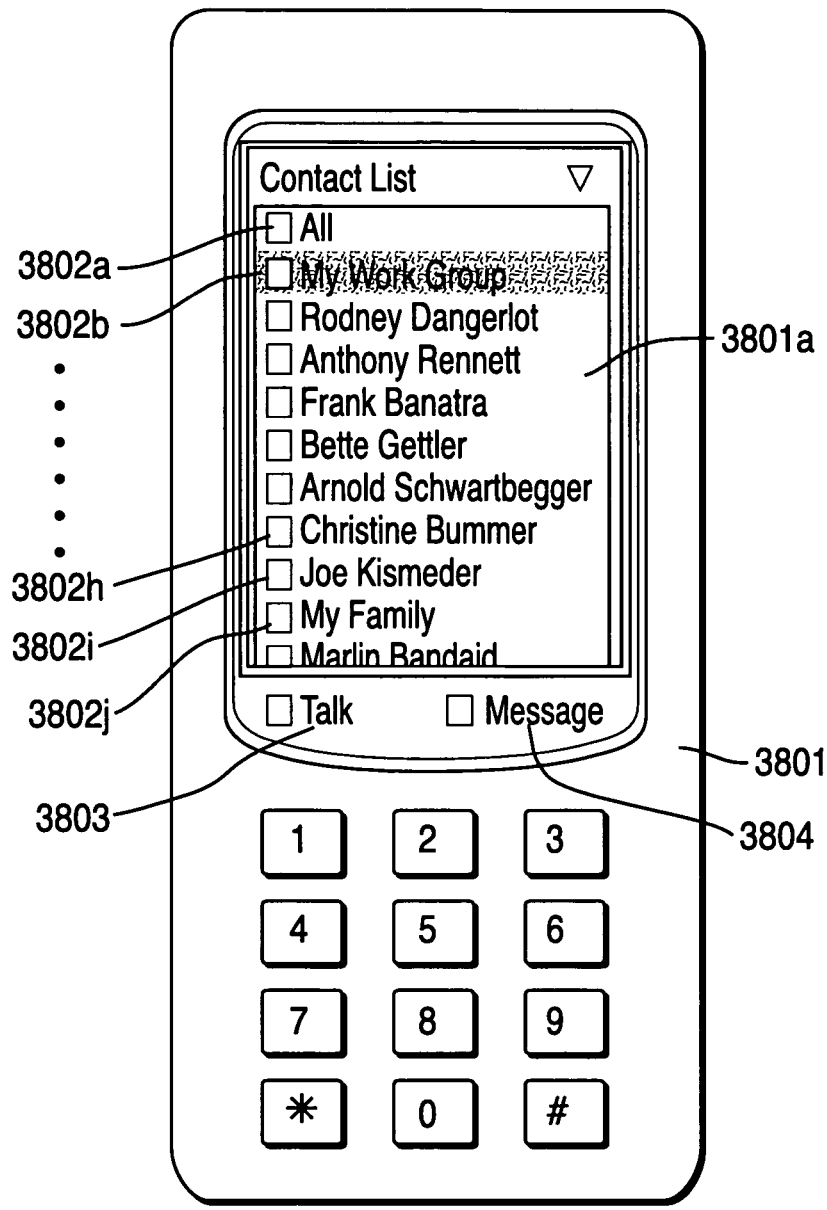

FIG. 38 shows a detailed view of a remote terminal useful in describing a push to talk (PTT) capability.

FIGS. 39*a*-39*d* show developmental views useful in explaining the hierarchical mode of communication.

FIGS. 40*a* and 40*b* are flow diagrams showing further details of the protocol overview of FIGS. 39*a*-39*d*.

FIG. 41 is a simplified diagram of a platform in which is integrated software architecture providing the method and protocol for voice and text instant messaging for a small group of users operating in a small geographic location.

DETAILED DESCRIPTION OF THE PREFERRED EMBODIMENT(S)

Figure 7:
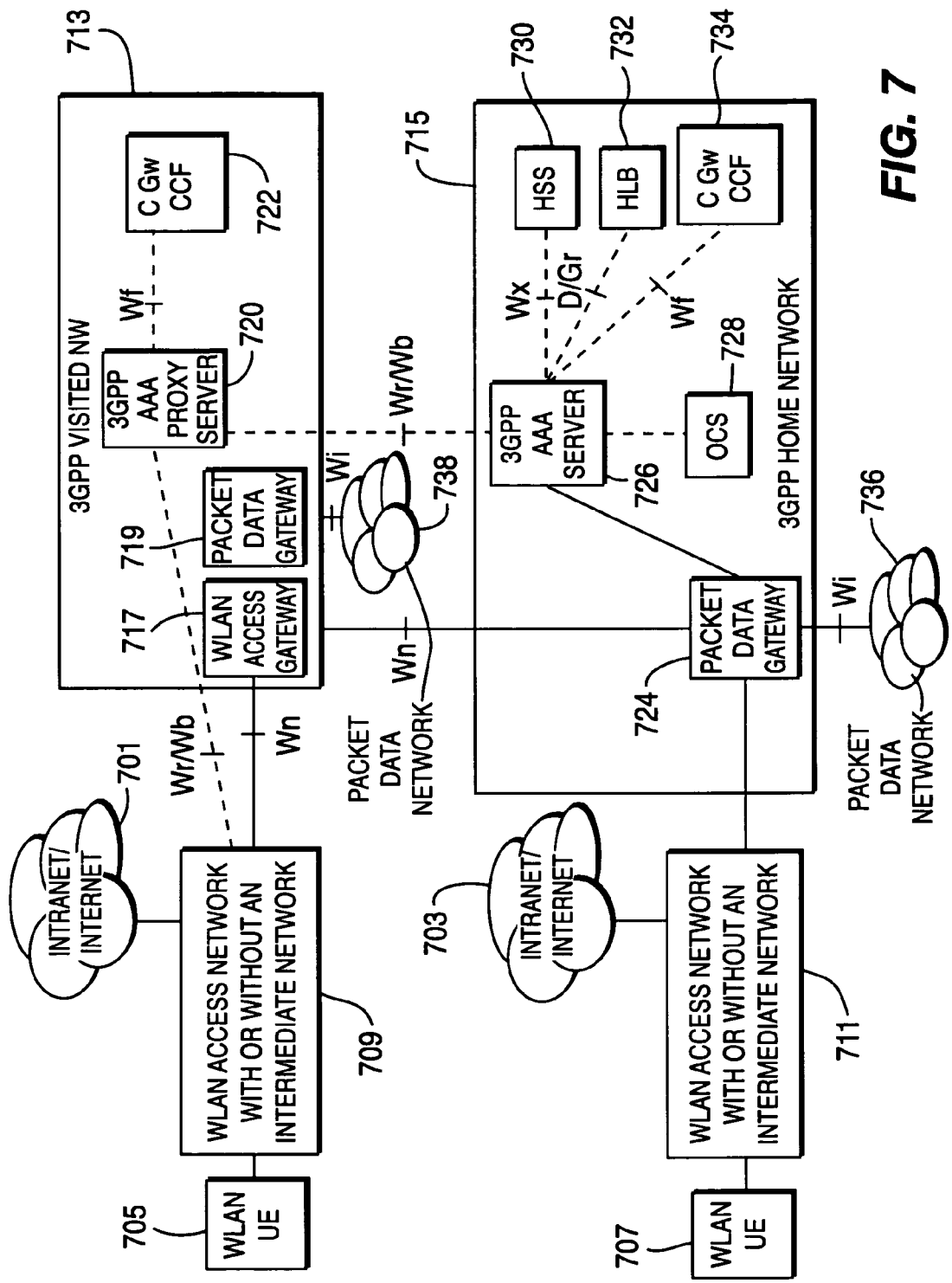
FIG. 7 is a hardware block diagram showing a novel WLAN-3GPP interworking architecture that utilizes an optional WLAN Access Gateway.

FIG. 7 is a simplified block diagram showing an illustrative WLAN-3GPP interworking architecture that utilizes an optional WLAN access gateway. A first WLAN UE 705 is coupled to a first WLAN access network 709. First WLAN access network 709 may or may not include one or more intermediate networks. In turn, first WLAN access network 709 is coupled to the Internet and/or an Intranet, denoted as Intranet/Internet 701. Similarly, a second WLAN UE 707 is coupled to a second WLAN access network 711. Second WLAN access network 711 may or may not include one or more intermediate networks. In turn, second WLAN access network 711 is coupled to the Internet and/or an Intranet, denoted as Intranet/Internet 703.

First WLAN access network 709 accesses a 3GPP visited network 713 via a WLAN access gateway 717, and/or optionally via a 3GPP AAA proxy server 720. Communications between first WLAN access network 709 and WLAN access gateway 717 uses a Wn interface, denoting the tunneling of data through intermediate networks. The link between first WLAN access network 709 and optional 3GPP AAA proxy server 720 uses a Wr/Wb interface, wherein Wr signifies wireless LAN authentication (information flow to 3GPP), and Wb refers to wireless LAN charging functions. First WLAN access gateway 717 is also coupled to a PDGW 719 which, in turn, accesses a PDN 738 over a Wi interface, denoting access to a packet data network. Optional 3GPP AAA proxy server 720 is coupled to an optional Control Gateway—Call Control Function, shown as C-Gw CCF 722, over a Wf interface denoting a charging gateway function.

Figure 1:
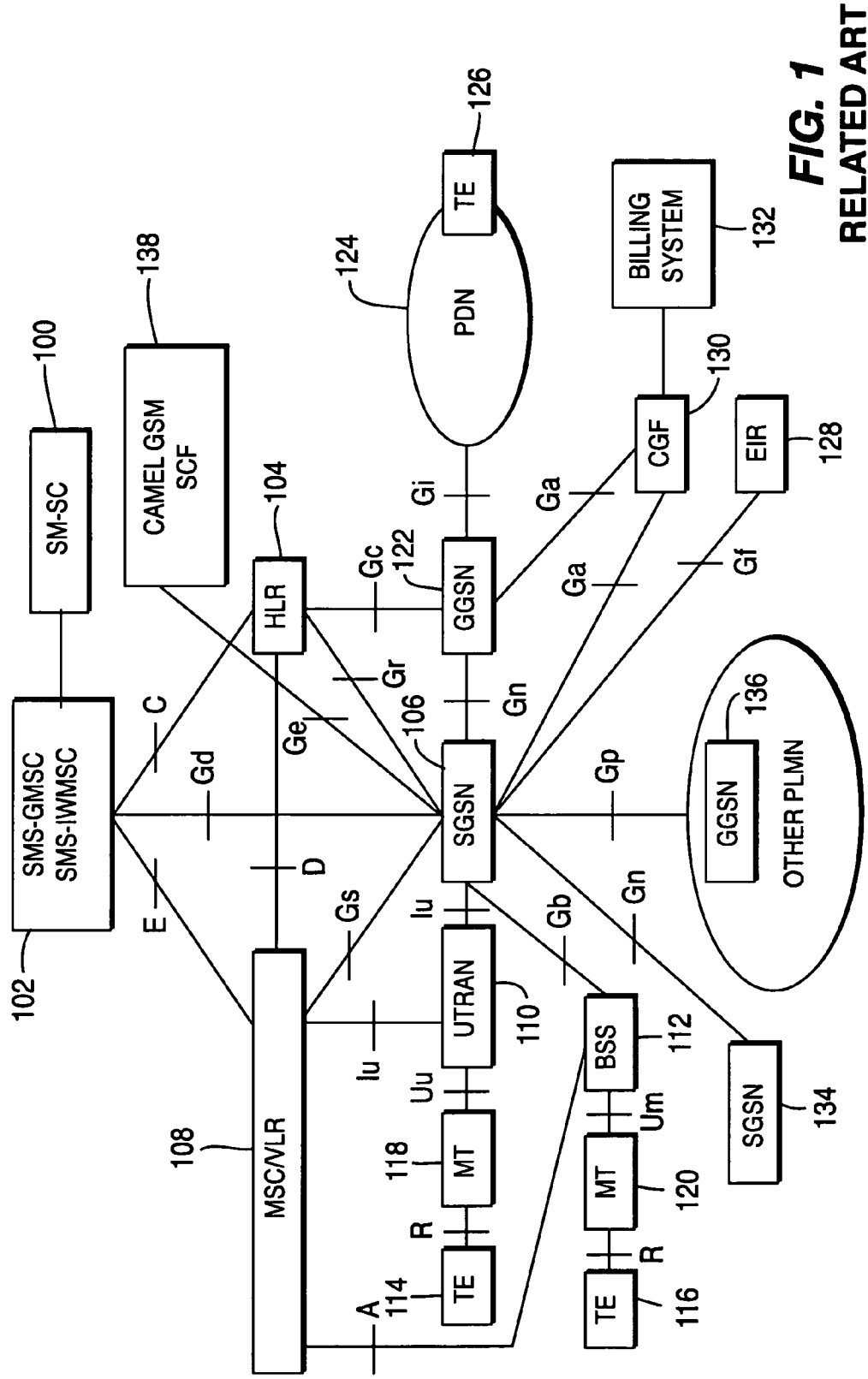
Figure 2:
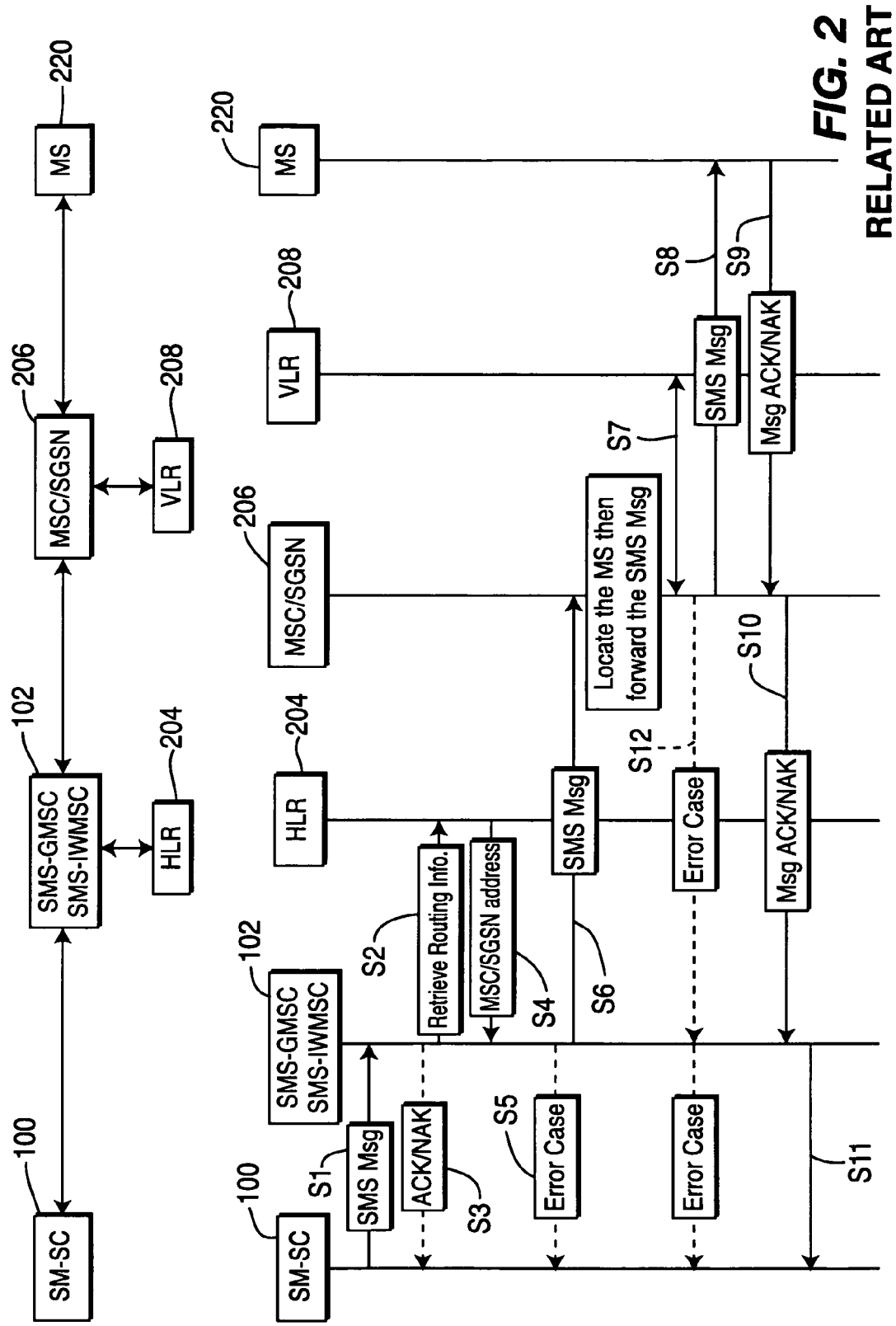
FIG. 2 is a data structure diagram setting forth a prior art SMS delivery mechanism over a GPRS and GSM-equipped network
Figure 5:
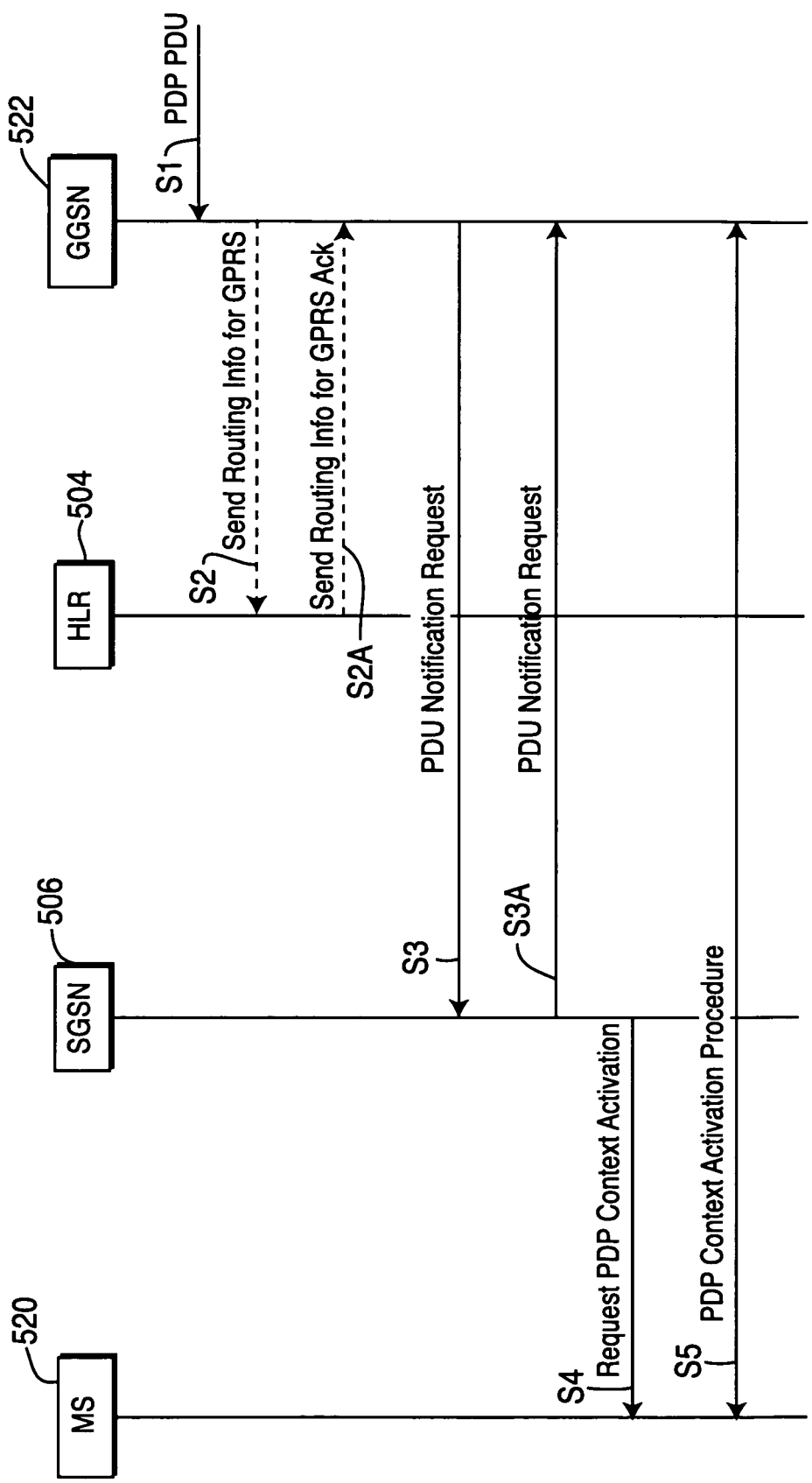
FIGS. 5 and 6 are data structure diagrams setting forth a prior art GPRS network-initiated service request procedures.
Figure 6:
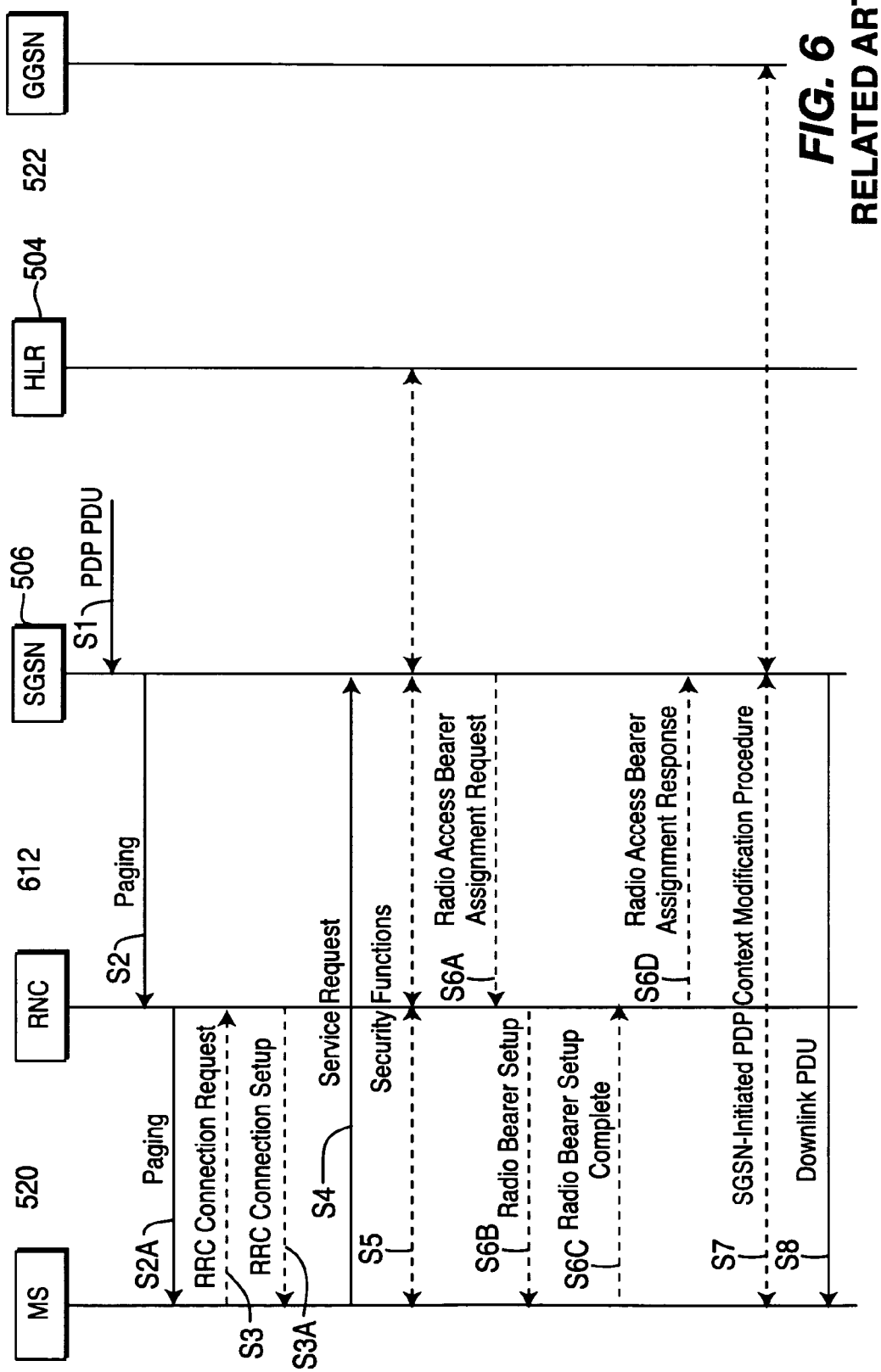

Second WLAN access network 711 accesses PDGW 724 of 3GPP home network 715. PDGW 724 is linked to WLAN access gateway 717 of 3GPP visited network 713 over a Wn interface which, as described herein before, signifies the tunneling of data through intermediate networks. PDGW 724 is linked to PDN 736 over the above-described Wi interface, wherein PDN 736 could, but need not, denote the same network as PDN 738. PDGW 724 is linked to a 3GPP AAA proxy server 726 over a Wm interface. In turn, 3GPP AAA proxy server 726 is linked to 3GPP AAA proxy server 720 of 3GPP visited network 713 over a Wr/Wb interface described above. 3GPP AAA proxy server 726 is also linked to online certificate status (OCS) 728, home subscriber server (HSS) 730, HLR 732, and C Gw CCF 734. The link between OCS 728 and 3GPP AAA proxy server 726 operates over a Wo interface which implements online charging, whereas the link between HLR 732 and 3GPP AAA proxy server 726 uses a D'/Gr' interface (previously described in conjunction with FIG. 1), and the link between HSS 730 and 3GPP AAA proxy server 726 utilizes a Wx interface for implementing authentication procedures.

Figure 8:
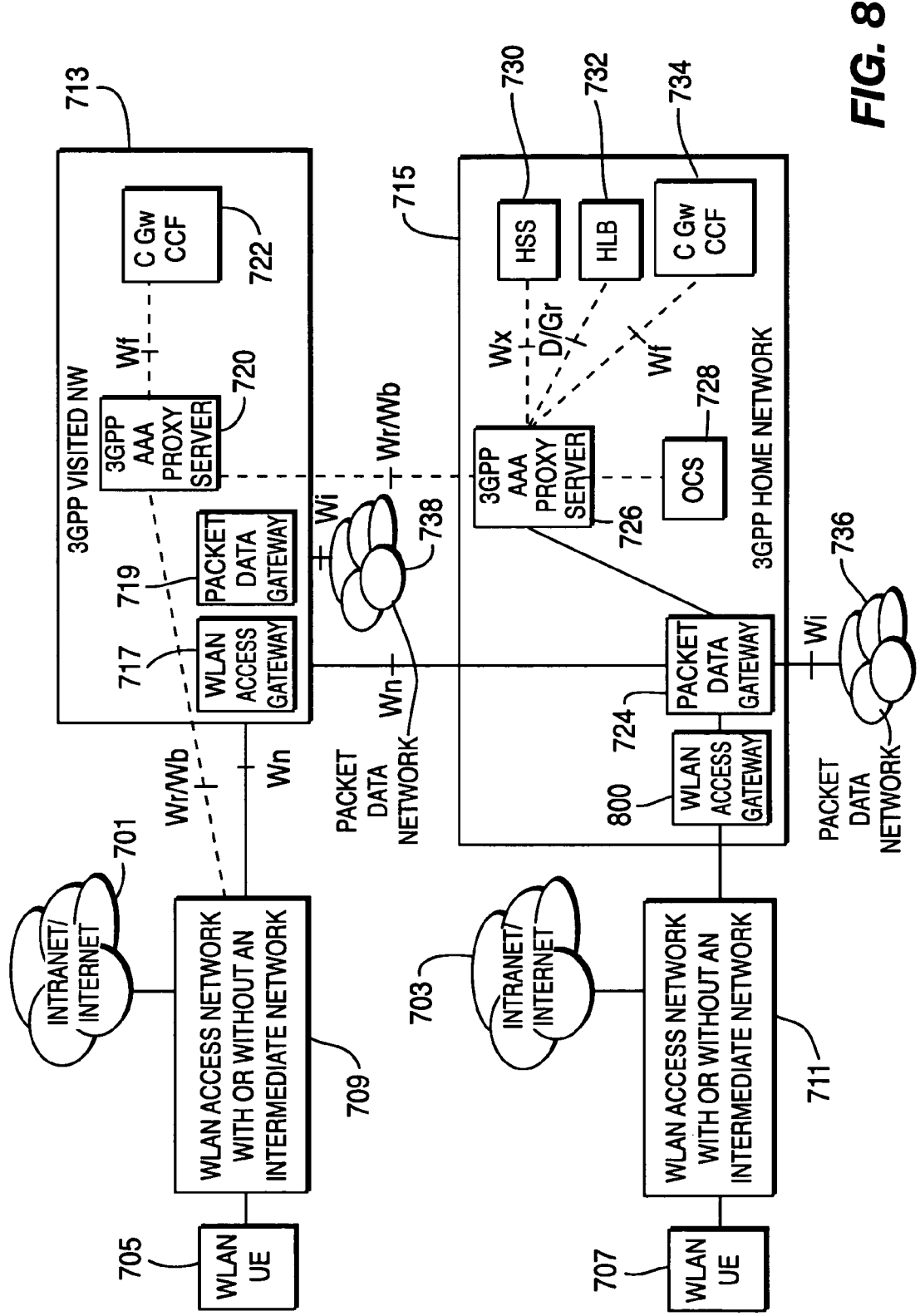
FIG. 8 is a hardware block diagram showing a WLAN-3GPP interworking architecture that utilizes a mandatory WLAN Access Gateway.

FIG. 8 is a schematic block diagram showing a WLAN-3GPP interworking architecture that utilizes a mandatory WLAN access gateway. FIG. 8 is substantially identical to FIG. 7, except for the addition of a WLAN access gateway 800 in the configuration of FIG. 8. Second WLAN access network 711 accesses mandatory WLAN access gateway 800 of a 3GPP home network 715. Mandatory WLAN access gateway 800 is linked to PDGW 724 which, in turn, is linked to WLAN access gateway 717 of 3GPP visited network 713 over a Wn interface which, as described above, signifies the tunneling of data through intermediate networks.

Figure 9:
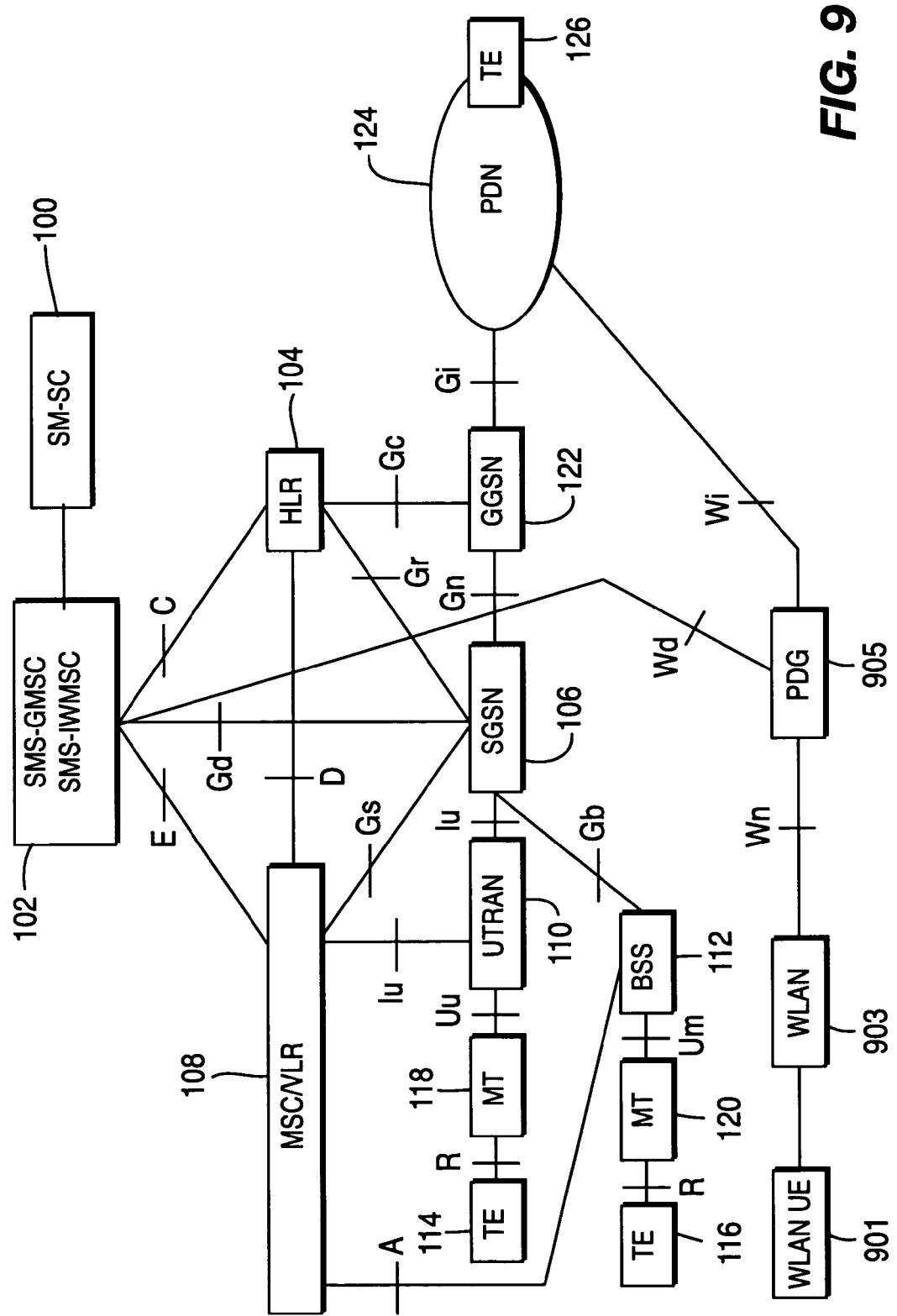
FIG. 9 is a hardware block diagram showing an architecture that provides home-based SMS message delivery over a WLAN using an optional WAG.

FIG. 9 which sets forth a novel architectural approach for delivering SMS messages to WLAN users and is specifically directed to cases where home-based SMS delivery is provided, and use of a WAG (WLAN access gateway) at a 3GPP home network is optional. An SM-SC 100 is coupled to an SMS-GMSC/SMS-IWMSC 102 (short message service gateway message switching system/interworking message service center for SMS). SMS-GMSC/SMS-IWMSC 102 is equipped to operate using at least three different types of interfaces. A "C" interface operates between HLR 104 and SMS-GMSC/SMS-IWMSC 102. Each call originating outside of GSM (such as an MS terminating a call from the PSTN) goes through a gateway to obtain the routing information required to complete the call. A protocol known as MAP/C is used over the "C" interface for this purpose. Also, the MSC may optionally forward billing information to HLR 104 after call clearing. A "Gd" interface operates between SMS-GMSC/SMS-IWMSC 102 and an SGSN 106. Interface Gd uses the MAP/G protocol to transfer subscriber information during a location update procedure. An "E" interface operates between SMS-GMSC/SMS-IWMSC 102 and an MSC/VLR 108. The "E" interface interconnects two MSCs, and is used to exchange data related to handover between an anchor MSC and a relaying MSC using the MAP/E protocol.

A "D" interface operates between MSC/VLR 108 and HLR 104. This interface uses the MAP/D protocol to exchange information related to the location of the MS and/or the management of the subscriber. A "Gs" interface is used between MSC/VLR 108 and SGSN 106. The "Gs" interface interconnects two VLRs of different MSCs, using the MAP/G protocol to transfer subscriber information during a location update procedure. An "Iu" interface is employed between MSC/VLR 108 and a UMTS terrestrial radio access network (UTRAN) 110. Messages exchanged over the "Iu" interface are relayed transparently through a base station system (BSS) such as BSS 112. An "A" interface operates between MSC/VLR 108 and BSS 112. The "A" interface manages the allocation of suitable radio resources to the MS's, and also implements functions related to mobility and security management.

Terminal equipment, such as TE 114 and TE 116, may be coupled to mobile terminals, such as MT 118 and MT 120, respectively. Illustratively, communications between the TEs 114, 116 and the MTs 118, 120 takes place over an "R" interface. In turn, MT 118 communicates with UTRAN 110 over a "Uu" interface, and MT 120 communicates with BSS 112 over a "Um" interface. "Uu" refers to an over-the-air interface for exchanging information between a UMTS-equipped MT and a UMTS-equipped radio access network. Similarly, "Um" refers to an over-the-air interface between an MT and a BSS. The "Um" and "Uu" interfaces both use LAPDm, a modified version of the ISDN LAPD, for signaling.

UTRAN 110 is coupled to SGSN 106 using an "Iu" interface which, as previously mentioned, acts as a transparent relay for conveying messages between MSC/VLR 108 and an MS via BSS 112. A "Gb" interface is employed between BSS 112 and SGSN 106. The "Gb" interface interconnects two VLRs of different MSC's, using the MAP/G protocol to transfer subscriber information during location update procedures, in this case via the BSS 112 which has established communication with the MS. Subscriber information is also transferred during location update procedures using "Gs", "Gr", "Gn", "Gi", and "Gc" interfaces. The "Gs" interface links MSC/VLR 108 with SGSN 106; the "Gr" interface connects SGSN 106 with HLR 104; the "Gc" interface links HLR 104 with a (gateway GPRS support node) GGSN 122; the "Gn" interface links SGSN 106 with GGSN 122; and the "Gi" interface links GGSN 122 with PDN 124 coupled to TE 126.

SMS-GMSC/SMS-IWMSC 102 is coupled to a PDGW 905 over a "Wd" connection. PDGW 905 also communicates with PDN 124 over a "Wi" connection, and with a WLAN 903 over a "Wn" connection. WLAN 903 is coupled to one or more user devices, designated as WLAN UE 901.

Figure 10:
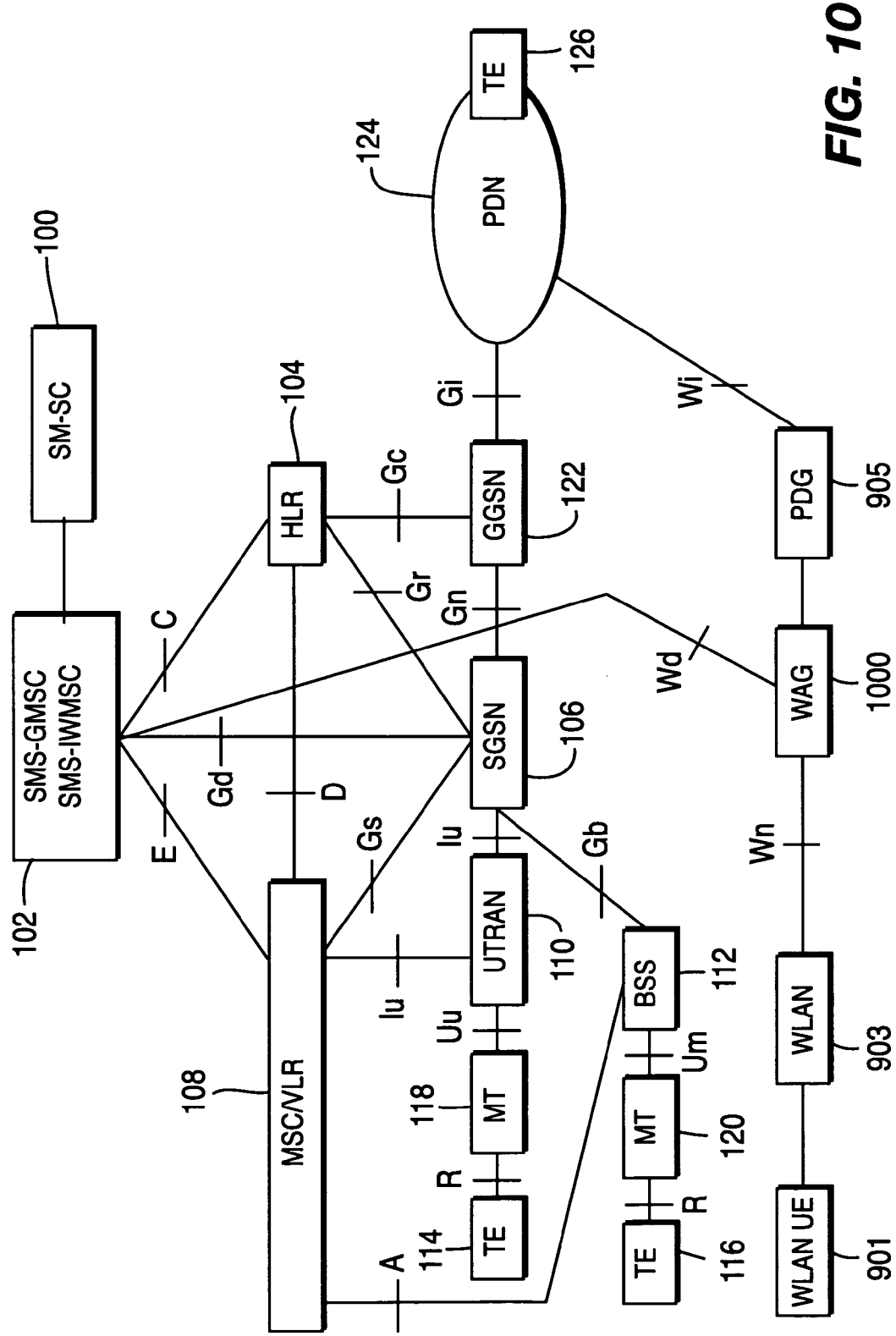
FIG. 10 is a hardware block diagram showing an architecture that provides SMS message delivery over a WLAN using a mandatory WAG in the context of GPRS/GSM.

Refer now to FIG. 10 which sets forth a novel architectural approach for the termination of SMS messages using a direct delivery mechanism and a mandatory WAG 1000 in an interworking WLAN and GPRS/GSM system. FIG. 10 is substantially identical to FIG. 9, with the exception that an additional element, WAG 1000, has been added to the configuration of FIG. 10. SMS-GMSC/SMS-IWMSC is coupled to a WAG 1000 over a "Wd" connection. WAG 1000 also communicates with a PDGW 905, and with WLAN 903 over a "Wn" connection. WLAN 903 is coupled to one or more user devices, designated as WLAN UE 901. PDGW 905 communicates with PDN 124 over a "Wi" connection.

Figure 11:
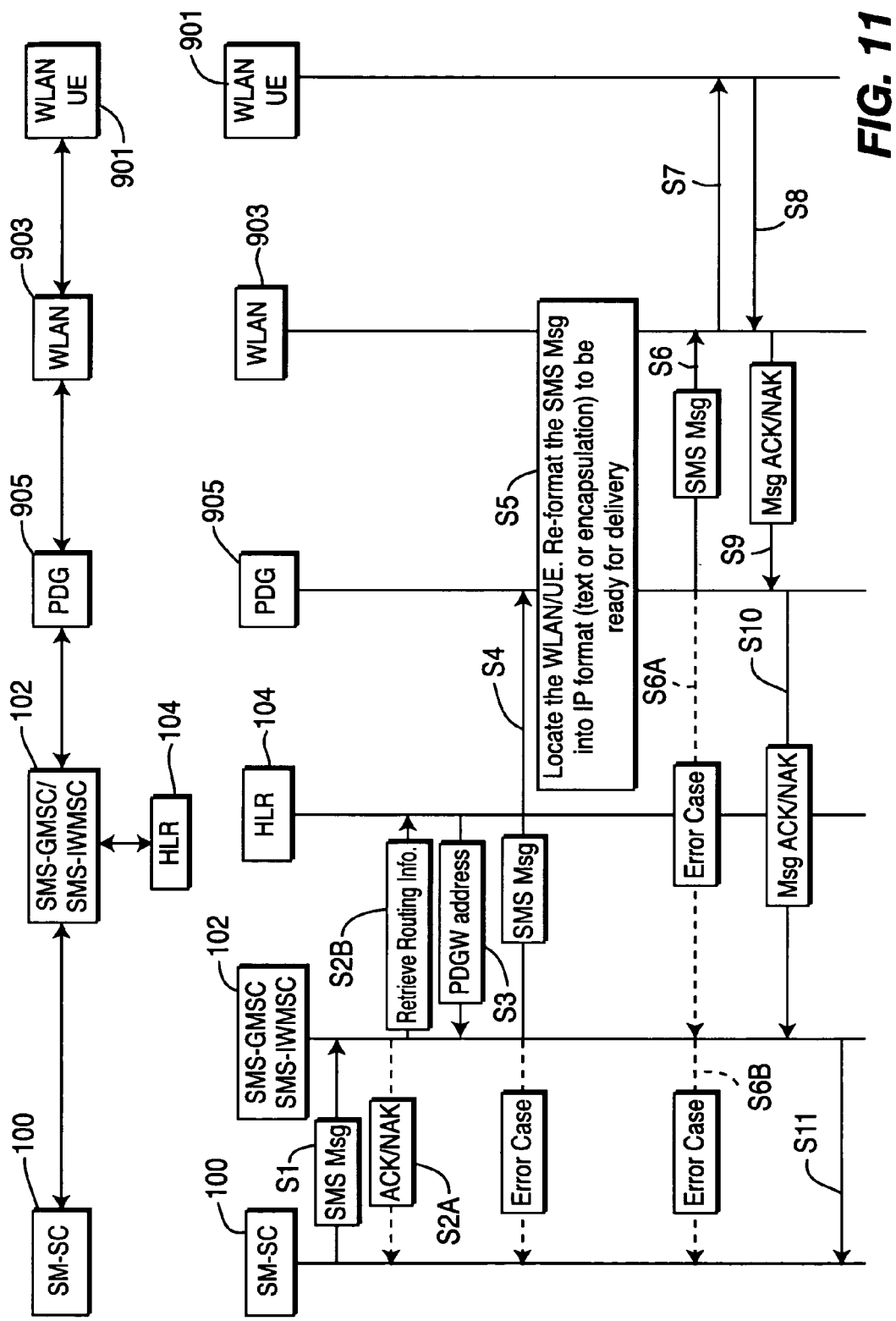
FIG. 11 is a data flow diagram setting forth a procedure for WLAN SMS message termination using direct delivery in conjunction with an optional WAG.

FIG. 11 sets forth a novel technique for delivering data-based services over a WLAN coupled to one or more 3GPP devices by encapsulating data into IP format before delivering the data to the WLAN. The data-based service is SMS. SM-SC 100 delivers an SMS message (S1) to SMS-GMSC/SMS-IWMSC 102, which sends an ACK/NAK (S2A), and routing information pertaining to the message is retrieved and sent to HLR 104 (S2B). A PDGW address for the SMS message is identified at HLR 104 (S3). The SMS message is sent to PDGW 905, which corresponds to the identified PDGW address (S4). PDGW 905 identifies the WLAN UE 901 for which the SMS is to be delivered, and reformats the SMS message into IP format (via text or encapsulation) (S5) and sends the SMS message to WLAN 903 (S6). WLAN 903 sends the SMS message to the identified WLAN UE 901 (S7). In the case of an error, PDGW 905 sends an error message to SM-SC 100 via the HLR 104 (S6A) and the SMS-GMSC/SMS-IWMSC 102 (S6B).

Upon receipt of the SMS message (or a portion thereof) at the identified WLAN UE 901, an ACK/NAK message is sent from the WLAN UE 901 to the WLAN 903 (S8), and the ACK/NAK message is then relayed from the WLAN UE 903 to the PDG 905 (S9), from the PDG 905 to the SMS-GMSC/SMS-IWMSC 102 (S10), and thence from the SMS-GMSC/SMS-IWMSC 102 to the SM-SC 100 (S11).

Figure 12:
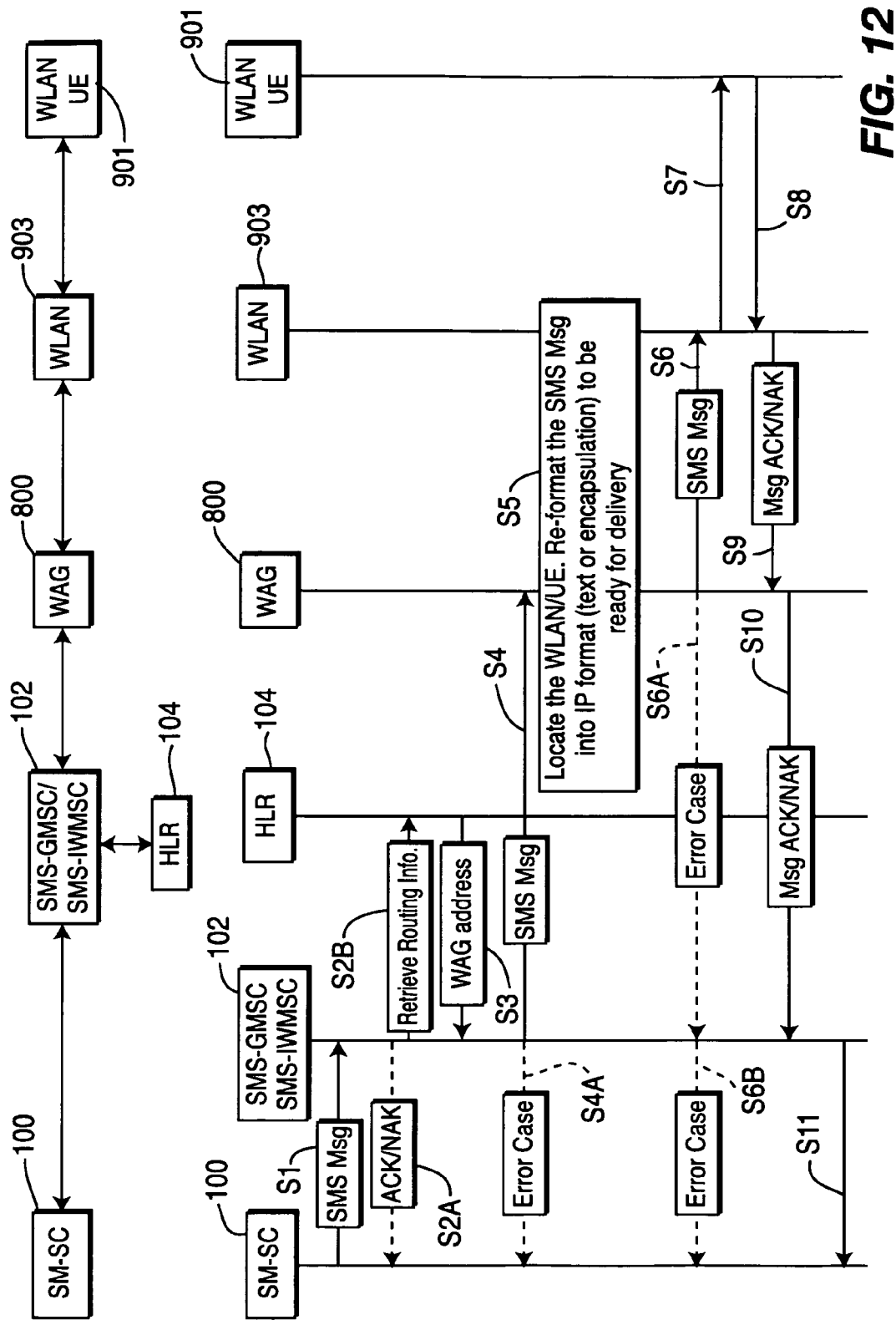
FIG. 12 is a data flow diagram setting forth a procedure for WLAN SMS message termination using direct delivery in conjunction with a mandatory WAG.

FIG. 12 is a data flow diagram setting forth a procedure for WLAN SMS message termination using a mechanism known as direct delivery employing a mandatory WAG. SM-SC100 sends an SMS message to SMS-GMSC/SMS-IWMSC 102 (S1), which sends an ACK/NAK (S2A) to SM-SC 100, and retrieves and sends routing information to HLR 104 (S2B). A WAG address for the SMS message is identified and sent to SMS-GMSC/SMS-IWMSC 102 (S3), which sends the SMS message to a WAG 800 at this identified WAG address (S4). In the event of an error in the address identified, an error message is sent to SM-SC 100 (S4A). WAG 800 identifies the targeted WLAN UE 901, reformats the SMS message into IP format (via text or encapsulation) (S5), and sends the message to WLAN 903 (S6). For the sake of brevity, it should be noted that steps S7 through S11 are substantially identical to steps S6A, to S11 of FIG. 11, with the exception that steps S9 and 10 of FIG. 12 involve relaying of the ACK/NAK message from the WLAN UE 903 through WAG 800, and not the PDG 905. WAG 800 of FIG. 8 may be identical to WAG 100 of FIG. 10. Also, in the case of an error, the WAG 800 sends an error message back to the SM-SC 100 via the HLR 104 and the SMS-GMSC/SMS-IWMSC 102, similar to steps S6A and S6B in FIG. 11.

Figure 13:
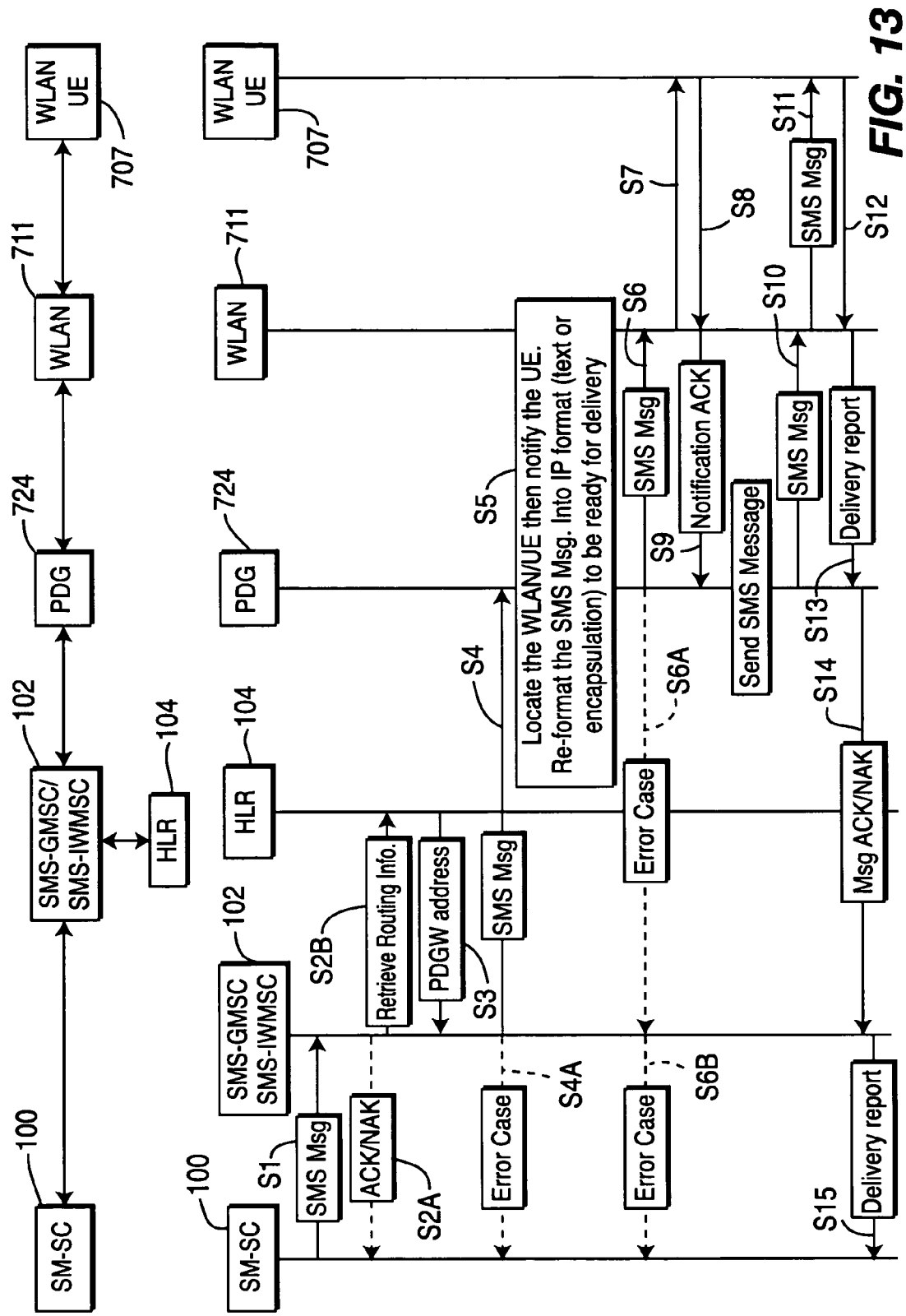
FIG. 13 is a data flow diagram setting forth a procedure for WLAN SMS message termination using notification-based delivery in conjunction with an optional WAG.

FIG. 13 is a data flow diagram setting forth a procedure for WLAN SMS message termination using a mechanism known as notification-based delivery in conjunction with an optional WAG. FIG. 13 is substantially identical to FIG. 12, with the following notable exceptions. WAG 800 of FIG. 12 is replaced with PDGW 724. WLAN 903 and WLAN UE 901 of FIG. 12 are also utilized in the configuration of FIG. 9, whereas WLAN 711 and UE 707 of FIG. 13 are also utilized in the configuration of FIG. 7. Moreover, the operational sequence set forth in FIG. 13 differs from the operational sequence of FIG. 12 in the following respects. At step S3 of FIG. 13 a PDGW address is sent instead of a WAG address. Step S5 of FIG. 13 performs the additional task of notifying UE 707 of an incoming SMS message. Steps S6 and S7 of FIG. 13 involve the sending of an SMS notification, the actual SMS message being sent during a subsequent step. Steps 6A and 6B are the same as steps S6A and S6B of FIGS. 11 and 12.

In FIG. 13, the SMS message notification is sent from the PDGW 724 to WLAN 711 (S6), and is then sent from WLAN 711 to UE 707 (S7). The actual SMS message is then sent from PDGW 724 to WLAN 711 (S10), and then from WLAN 711 to UE (S11), after receipt of the ACK message from UE 707 (S8 and S9). Upon receipt of the SMS message, WLAN UE 707 sends an SMS receipt message to WLAN 711 (S12). WLAN 711 generates a delivery report and sends the delivery report to PDGW 724 (S13). PDGW 724 examines the delivery report to ascertain whether or not the SMS message was successfully delivered to the WLAN UE 707. If so, PDGW 724 sends an ACK to the SMS-GMSC/SMS-IWMSC 102 and, if not, the PDG sends a no-acknowledgment message (NAK) to the SMS-GMSC/SMS-IWMSC 102 (S14). Upon receipt of the ACK message or NAK message, the SMS-GMSC/SMS-IWMSC 102 generates a delivery report and sends the delivery report to the SM-SC 100 (S15).

Figure 14:
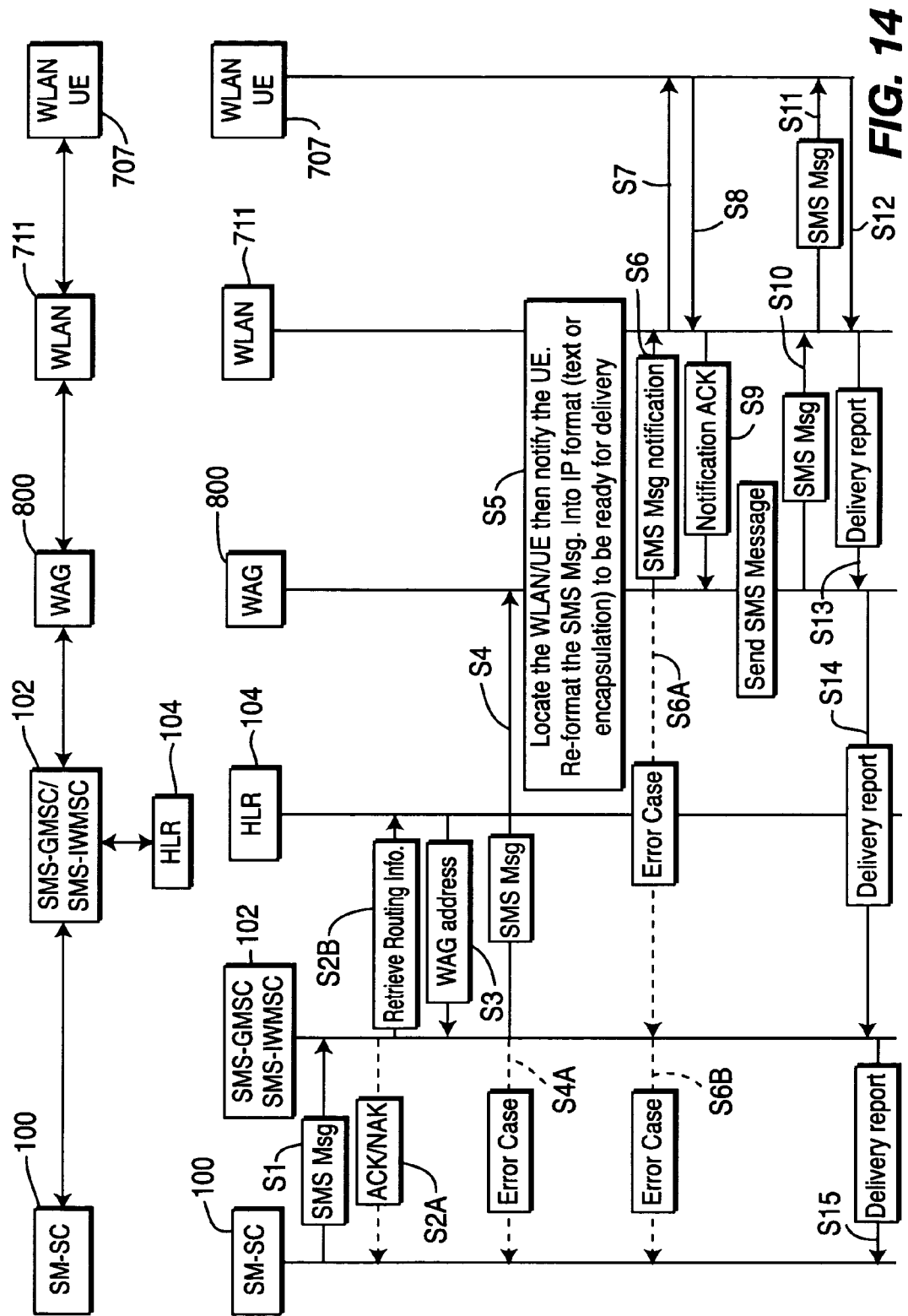
FIG. 14 is a data flow diagram setting forth a procedure for WLAN SMS message termination using notification-based delivery in conjunction with a mandatory WAG.

FIG. 14 is a data flow diagram setting forth a procedure for WLAN SMS message termination using a mechanism known as notification-based delivery in conjunction with a mandatory WAG. FIG. 14 is substantially identical to FIG. 13, with the notable exceptions that the PDGW 724 of FIG. 13 is replaced with WAG 800 in FIG. 14, the procedure of FIG. 14 is substantially the same as the procedure in FIG. 13 except that step S3 of FIG. 14 involves sending a WAG address to the SMS-GMSC/SMS-IWMSC 102 instead of a PDGW address.

Figure 15:
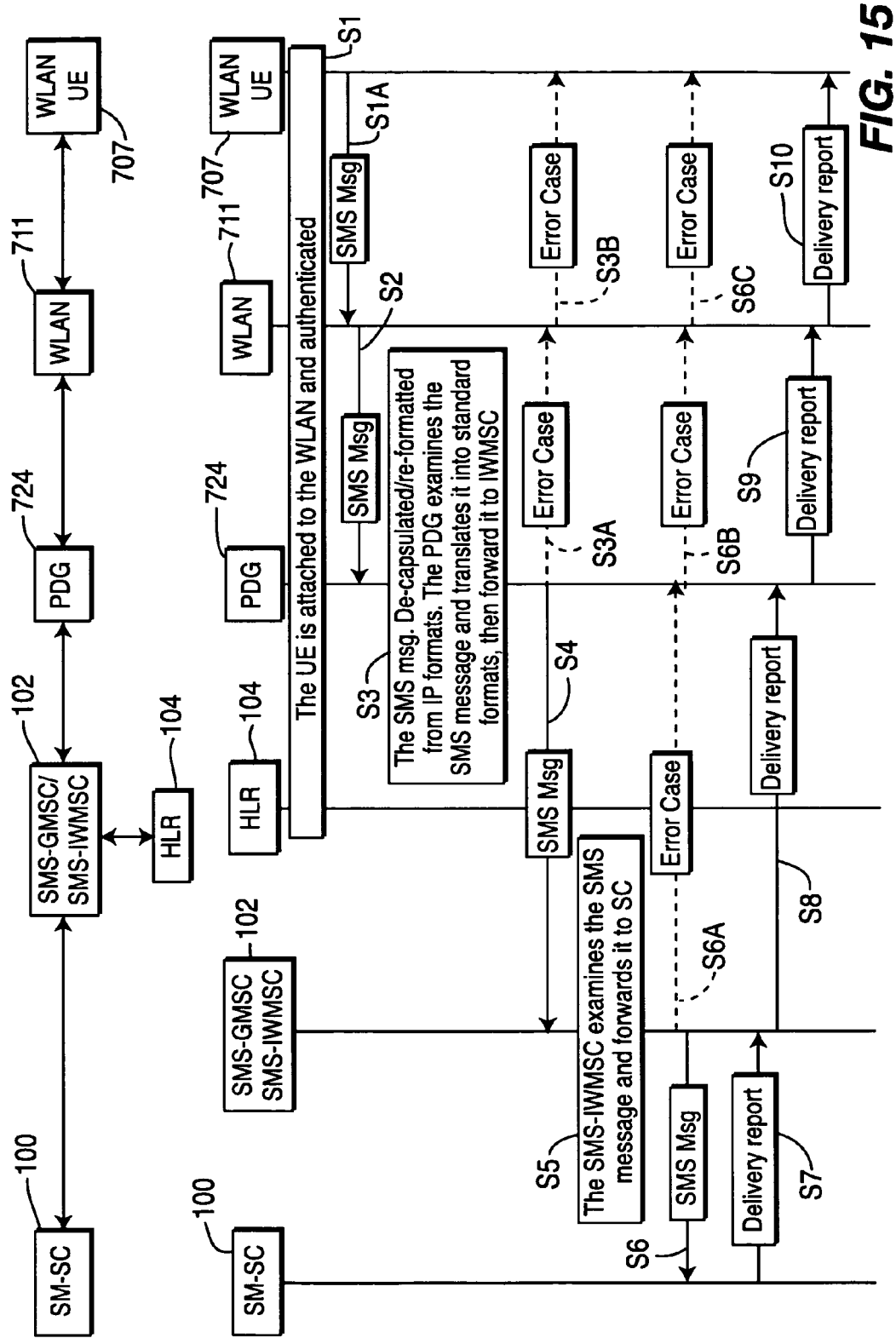
FIG. 15 is a data flow diagram setting forth a procedure for processing an incoming IP-encapsulated SMS message from a WLAN using an optional WAG.

FIG. 15 is a data flow diagram setting forth a procedure for processing an incoming IP-encapsulated SMS message from a WLAN 711 where use of a WAG is not necessary. UE 707 is attached to a WLAN 711 and is authenticated (S1). WLAN 711 receives an incoming encapsulated SMS message from UE 707 (S1A) and forwards the encapsulated SMS message to PDGW 724 (S2). The SMS message is encapsulated in IP format. PDGW 724 decapsulates and reformats the SMS message from IP format into a standard SMS format (S3). In the case of an error, an error message is sent from PDGW 724 to UE 707 (S3B) via the WLAN 711 (S3A). The standard format SMS message is then sent to an SMS-IWMSC 102 (S4). The SMS-IWMSC 102 examines the SMS message (S5) and forwards the message to an SM-SC 100 (S6). In the case of an error, an error message is sent from the SMS-GMSC/SMS-IWMSC 102 (S6A) to the UE 707 via PDGW 724 (S6B) and the WLAN 711 (S6C). In response to receipt of the SMS message, SM-SC 100 sends a delivery report (S7) to the SMS-IWMSC 102. The SMS-IWMSC 102 sends the delivery report (S8) to PDGW 724, and PDGW 724 relays the delivery report (S9) to the WLAN 711, which sends the delivery report (S10) to UE 707.

Figure 16:
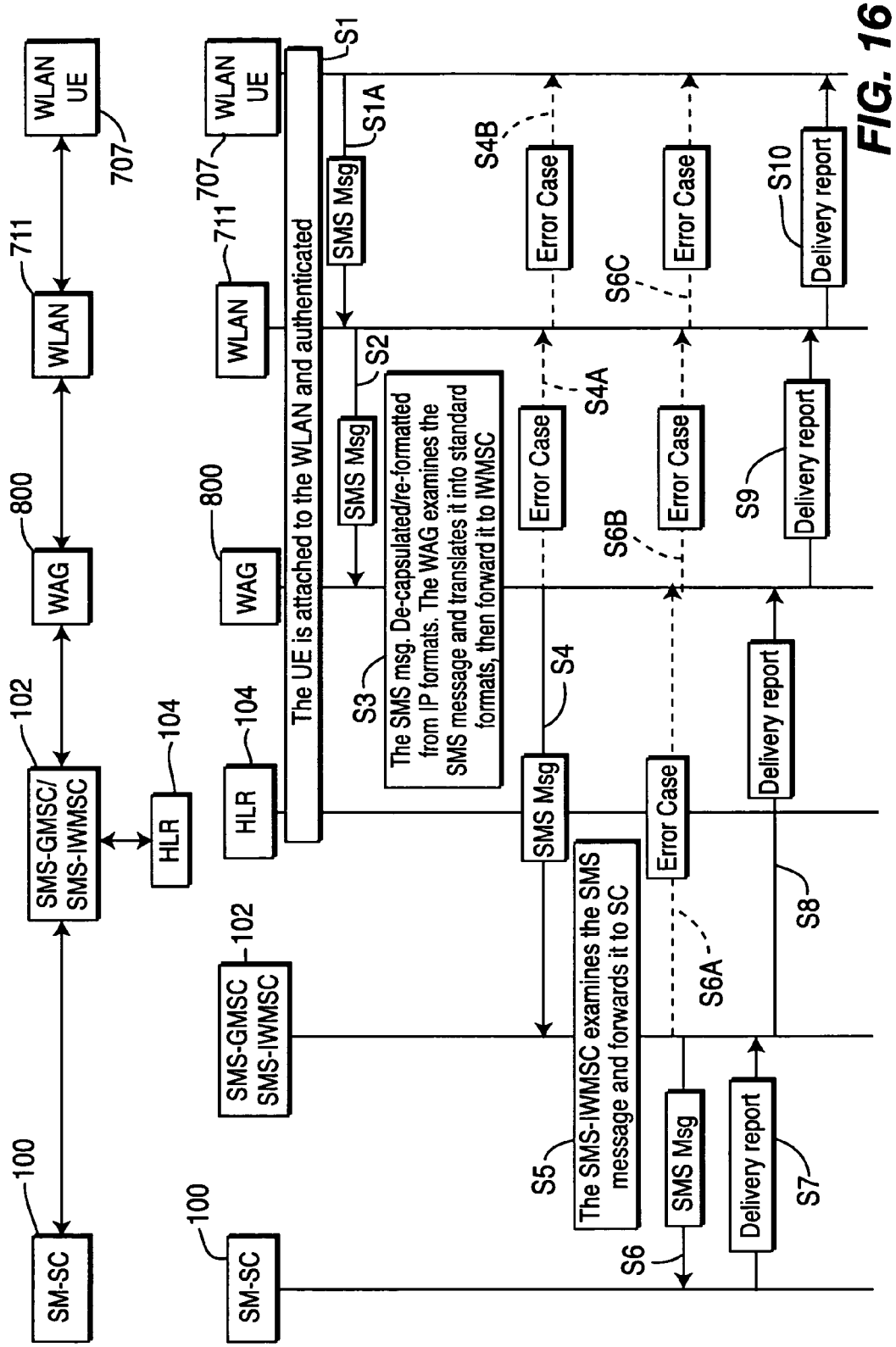
FIG. 16 is a data flow diagram setting forth a procedure for processing an incoming IP-encapsulated SMS message from a WLAN using a mandatory WAG.

FIG. 16 is a data flow diagram setting forth a procedure for processing an incoming IP-encapsulated SMS message from WLAN 711 using a mandatory WAG 800. FIG. 16 is substantially identical to FIG. 15, with the notable exception that the PDGW 724 of FIG. 15 is replaced by WAG 800. This difference affects steps S3, S4, S8, and S9. Step S3 of FIG. 16 involves the WAG 800 decapsulating and reformatting the SMS message from IP format into a standard SMS format. In step S4, the standard format SMS message is then sent from the WAG 800 to the SMS-IWMSC 102. The delivery report of step S8 is received by WAG 800 and not the PDGW 724 as shown in FIG. 15, and the delivery report of step S9 in FIG. 16 is sent by WAG 800, and not PDGW 724.

Figure 17:
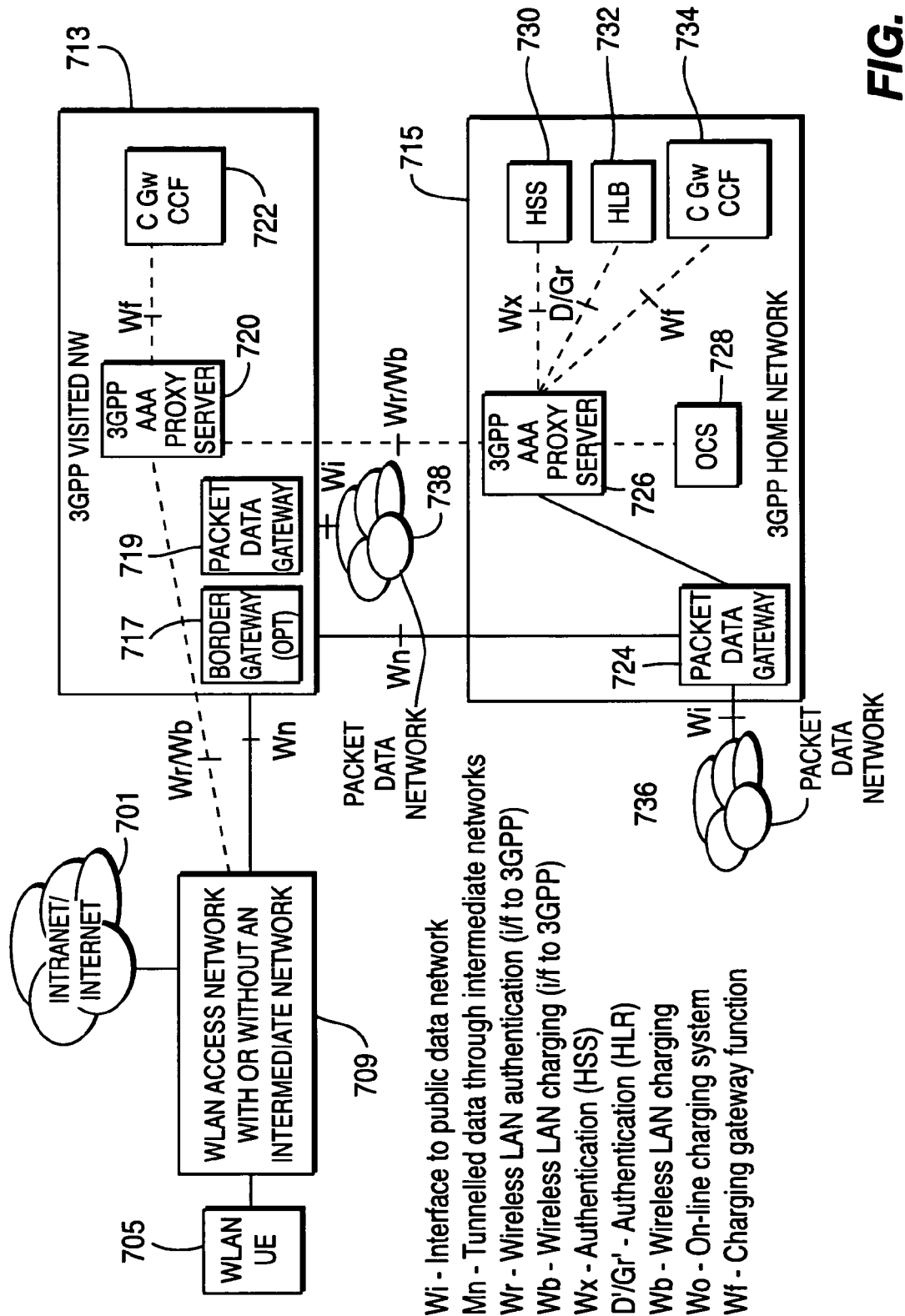
FIG. 17 is a hardware block diagram showing an architecture that uses a mandatory WAG to provide WLAN-3GPP interworking in the context of GPRS/GSM.

FIG. 17 is a block diagram showing an architecture that uses a mandatory WAG to provide WLAN-3GPP interworking in the context of GPRS/GSM. WLAN UE 705 communicates with a WLAN access network 709. WLAN access network 709 may or may not include one or more intermediate networks. In turn, WLAN access network 709 is coupled to the Internet and/or an Intranet, denoted as Intranet/Internet 701.

WLAN access network 709 accesses a 3GPP visited network 713 via an optional border gateway (BG) 718, and/or via an optional 3GPP AAA proxy server 720. Communications between WLAN access network 709 and BG 718 uses a Wn interface. The link between WLAN access network 709 and optional 3GPP AAA proxy server 720 uses a Wr/Wb interface. BG 718 is coupled to PDGW 719 which, in turn, accesses a PDN 738 over a Wi interface. Optional 3GPP AAA proxy server 720 is coupled to an optional C-Gw CCF 722, over a Wf interface denoting a charging gateway function.

BG 718 accesses PDGW 724 of 3GPP home network 715 over a Wn interface which, as described above, signifies the tunneling of data through intermediate networks. PDGW 724 is linked to PDN 736 over the above-described Wi interface. PDN 736 could, but need not, denote the same network as PDN 738. A 3GPP AAA proxy server 726 is linked to 3GPP AAA proxy server 720 of 3GPP visited network 713 over the Wr/Wb interface described above. 3GPP AAA proxy server 726 is also linked to OCS 728, HSS 730, HLR 732, and C Gw CCF 734. The link between OCS 728 and 3GPP AAA proxy server 726 operates over a Wo interface which implements online charging, whereas the link between HLR 732 and 3GPP AAA proxy server 726 uses a D'/Gr' interface, and the link between HSS 730 and 3GPP AAA proxy server 726 utilizes a Wx interface for implementing authentication procedures.

Figure 18:
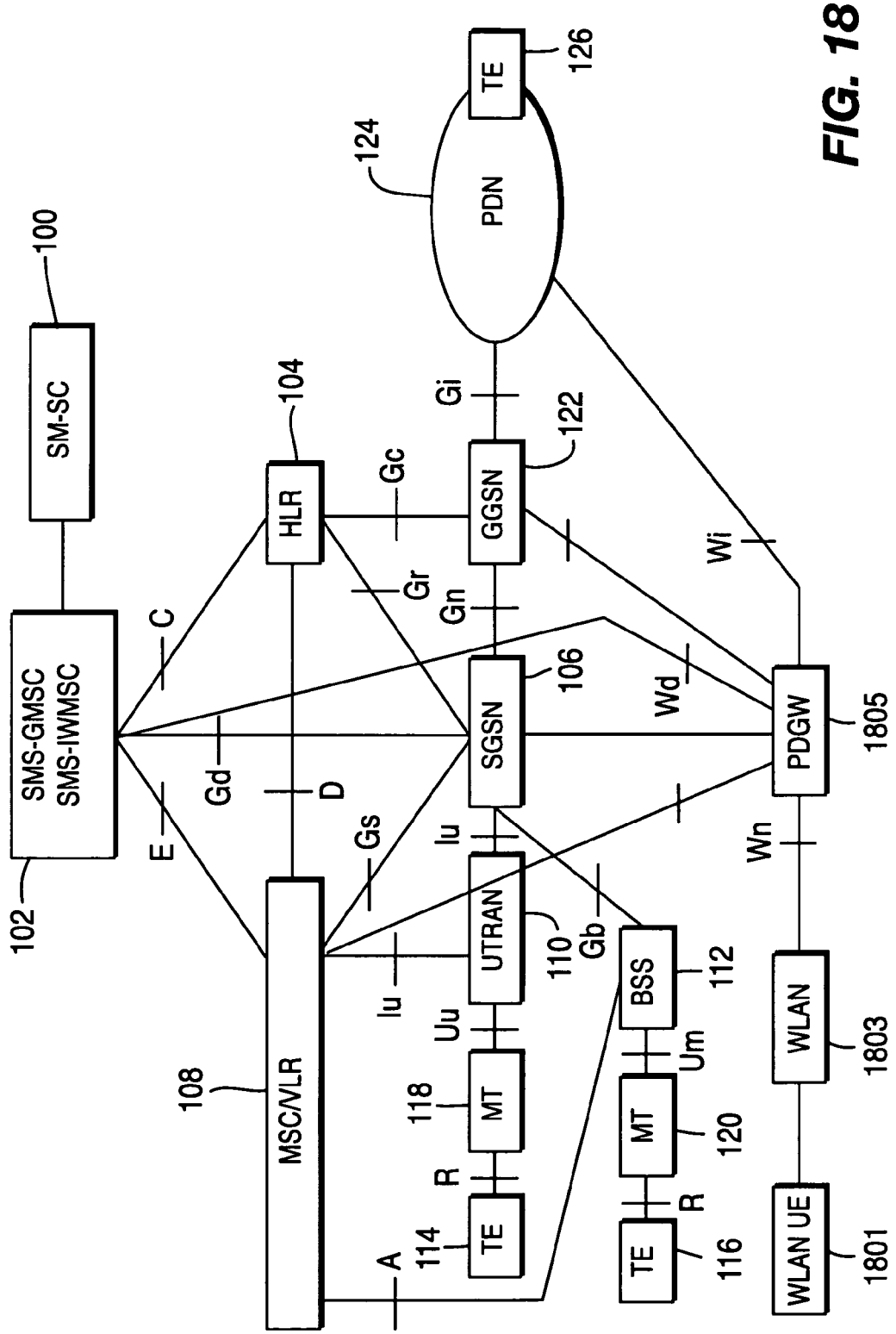
FIG. 18 is a hardware block diagram showing interfaces between the WLAN domain and the CS/PS domain.

FIG. 18 is a schematic diagram showing interfaces between WLAN domain 1803 and the circuit-switched/packet-switched (CS/PS) domain. The diagram of FIG. 18 is substantially identical to the diagram of FIG. 9 with the addition of interfaces being provided between PDGW 1805 (similar to PDGW 905 in FIG. 9) and MSC/VLR 108 and between PDGW 1805 and GGSN 122, as will be described more fully below. SM-SC 100 is coupled to an SMS-GMSC/SMS-IWMSC 102. SMS-GMSC/SMS-IWMSC 102 is equipped to operate using at least three different types of interfaces. A "C" interface operates between an HLR 104 (home location register) and SMS-GMSC/SMS-IWMSC 102. Each call originating outside of GSM (such as an MS terminating a call from the PSTN) has to go through a Gateway to obtain the routing information required to complete the call. MAP/C is used over the "C" interface for this purpose. Also, the MSC may optionally forward billing information to HLR 104 after call clearing. A "Gd" interface operates between SMS-GMSC/SMS-IWMSC 102 and an SGSN 106. This interface uses the MAP/G protocol to transfer subscriber information during a location update procedure. Finally, an "E" interface operates between SMS-GMSC/SMS-IWMSC 102 and an MSC/VLR 108 (mobile service switching center/visitor location register). The "E" interface interconnects two MSCs, and is used to exchange data related to handover between an anchor MSC and a relaying MSC using the MAP/E protocol.

A "D" interface operates between MSC/VLR 108 and HLR 104. This interface uses the MAP/D protocol to exchange information related to the location of the MS and/or the management of the subscriber. A "Gs" interface is used between MSC/VLR 108 and SGSN 106. The "Gs" interface interconnects two VLRs of different MSCs, using the MAP/G protocol to transfer subscriber information during a location update procedure. An "Iu" interface is employed between MSC/VLR 108 and a UTRAN 110 (UMTS terrestrial radio access network). Messages exchanged over the "Iu" interface are relayed transparently through a BSS 112. Finally, an "A" interface operates between MSC/VLR 108 and BSS 112. The "A" interface manages the allocation of suitable radio resources to the MS's, and also implements functions related to mobility and security management.

Terminal equipment, such as TE 114 and TE 116, are shown coupled to mobile terminals, such as MT 118 and MT 120, respectively. Communication between the TEs 114, 116 and the MTs 118, 120 takes place over an "R" interface. In turn, MT 118 communicates with UTRAN 110 over a "Uu" interface, and MT 120 communicates with BSS 112 over a "Um" interface. "Uu" is an over-the-air interface for exchanging information between a UMTS-equipped MT and a UMTS-equipped radio access network. "Um" is an over-the-air interface between an MS and a BSS. The "Um" and Uu" interfaces both use LAPDm, a modified version of the ISDN LAPD, for signaling.

UTRAN 110 is coupled to SGSN 106 using an "Iu" interface which, as previously mentioned, acts as a transparent relay for conveying messages between MSC/VLR 108 and an MS via BSS 112. A "Gb" interface is employed between BSS 112 and SGSN 106. The "Gb" interface is ultimately used to interconnect two VLRs of different MSC's, using the MAP/G protocol to transfer subscriber information during location update procedures, in this case via the BSS which has established communication with the MS. Subscriber information is also transferred during location update procedures using "Gs", "Gr", "Gn", "Gi", and "Gc" interfaces. The "Gs" interface links MSC/VLR 108 with SGSN 106; the "Gr" interface connects SGSN 106 with HLR 104; the "Gc" interface links HLR 104 with a GGSN 122 (gateway GPRS support node); the "Gn" interface links SGSN 106 with GGSN 122; and the "Gi" interface links GGSN 122 with a PDN 124 (packet data network) coupled to TE 126 (terminal equipment).

SMS-GMSC/SMS-IWMSC 102 is coupled to a PDGW 1805 over a "Wd" connection. PDGW 1805 communicates with PDN 124 over a "Wi" connection, and with WLAN 1803 over a "Wn" connection, and with a GGSN 122, and with MSC/VLR 108. WLAN 1803 is coupled to one or more UEs, such as WLAN UE 1801.

Figure 19:
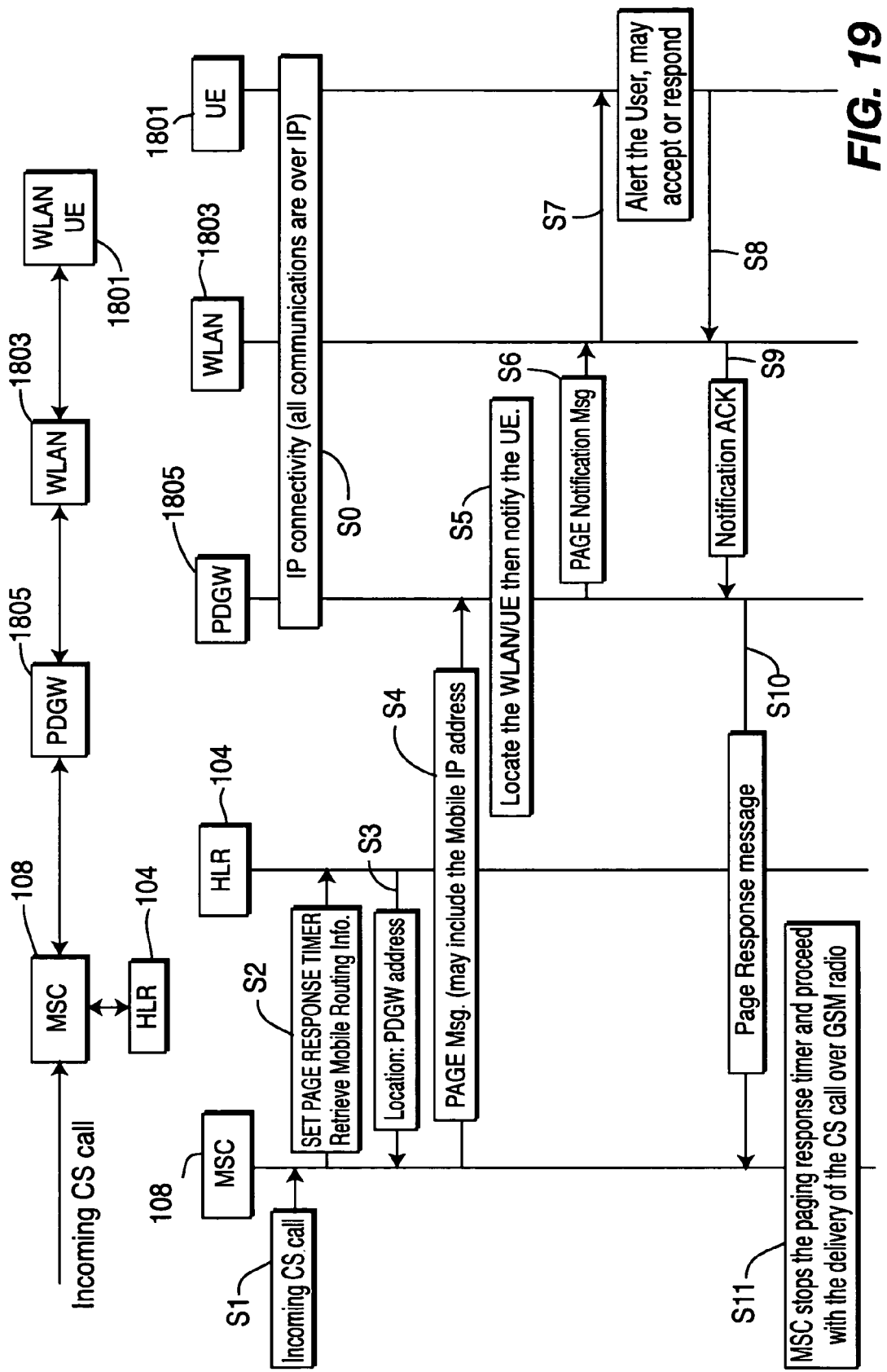
FIG. 19 is a data flow diagram setting forth a procedure for announcing CS calls to user equipment over a WLAN.

FIG. 19 is a data flow diagram setting forth a procedure for announcing circuit switched (CS) calls to UE 1801 over WLAN 1803. WLAN 1803 communicates with UE 1801 and PDGW 1805 over standard IP-based links (SO). Upon receipt of an incoming CS call (S1), MSC 108 retrieves mobile routing information, sends this routing information to HLR 104 and sets a paging response timer (S2). In response, HLR 104 sends a PDGW address to the MSC 108 (S3). MSC 108 sends a Page message to the PDGW 1805 (through the interface shown in FIG. 18) corresponding to the PDGW address returned by the HLR 104 (S4). The Page message may, but need not, include a Mobile IP address. Upon receipt of the Page message, PDGW 1805 locates UE 1801 (S5) and notifies WLAN 1803 via the Page Notification message (S6). The WLAN 1803 alerts UE 1801 as to the existence of an incoming CS call (S7). If the call is accepted, UE 1801 sends an acceptance message to WLAN 1803 (S8). WLAN 1803 sends an acknowledgment (ACK) message to PDGW 1805 (S9). PDGW 1805 responds to the ACK message by sending a Page Response message to MSC 108 (S10). MSC 108 stops the previously set paging response timer and proceeds with delivery of the CS call over a GSM radio interface (S11).

Figure 20:
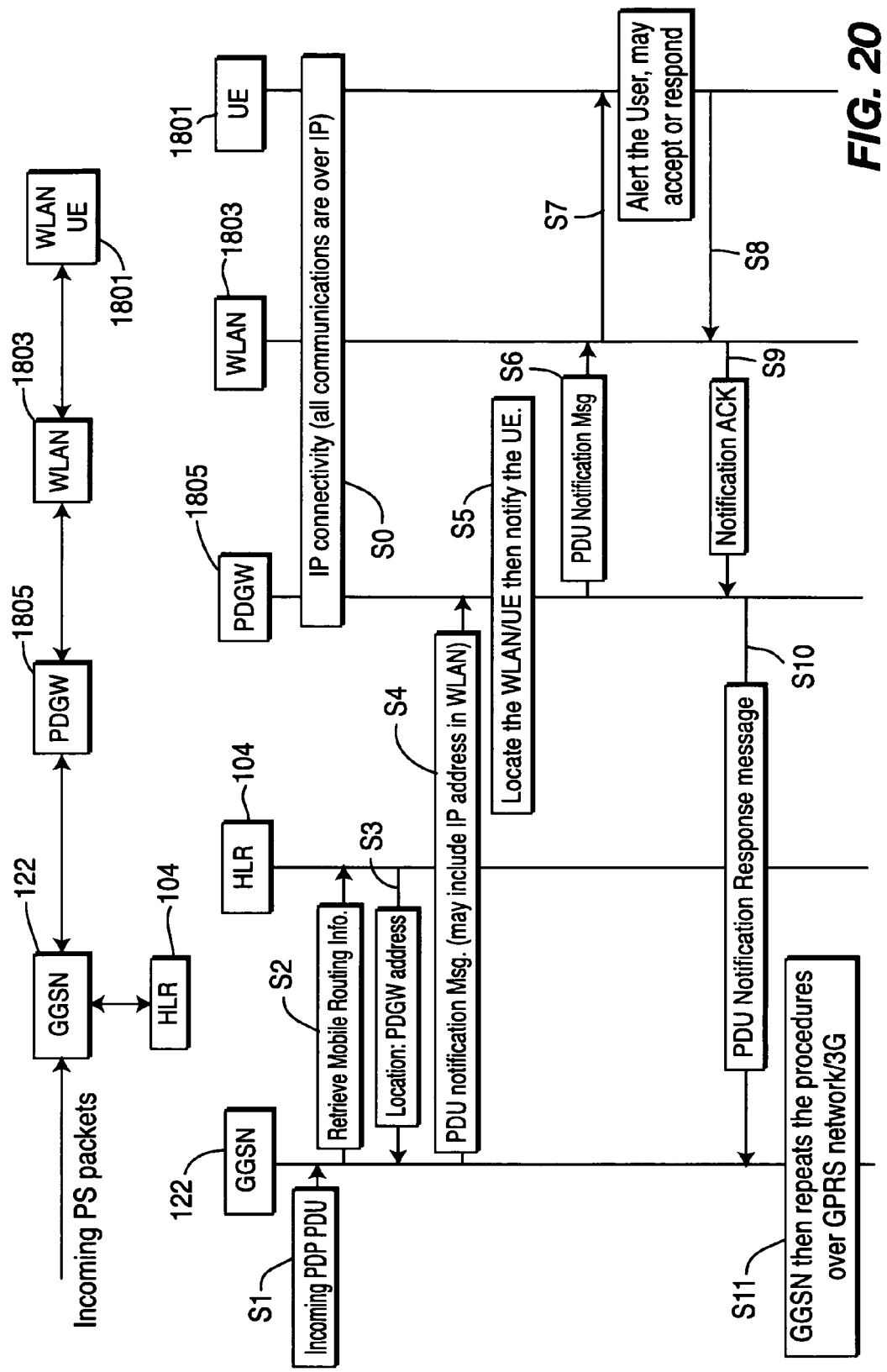
FIG. 20 is a data flow diagram setting forth a procedure for the notification of GPRS-3G-based services over a WLAN.

FIG. 20 is a data flow diagram setting forth a procedure for the notification of GPRS-3G-based services over WLAN 1803, which communicates with UE 1801 and PDGW 1805 over standard IP-based links. Upon receipt of an incoming PDP PDU (S1) from PDN 124 (see FIG. 18), GGSN 122 retrieves mobile routing information and sends this routing information to HLR 104 (S2). HLR 104 sends a PDGW address to GGSN 122 (S3). GGSN 122 sends a PDU Notification message to the PDGW 1805 at the PDGW address obtained from the HLR 104 (S4). The PDU Notification message may, but need not, include a Mobile IP address in the WLAN. PDGW 1805 locates WLAN 1803/UE 1801 (S5) and notifies WLAN 1803, sending a PDU Notification message (S6). WLAN 1803 alerts UE 1801 (S7) as to incoming data packets from a GPRS/3G data-based service. If the service is accepted, UE 1801 sends an acceptance message to WLAN 1803 (S8). WLAN 1803 sends an acknowledgment (ACK) message to the PDGW 1805 (S9). PDGW 1805 responds to the ACK message by sending a PDU Notification Response message to GGSN 122 (S10). GGSN 122 repeats all or a portion of the aforementioned procedure over a GPRS/3GPP network (S11).

Figure 21:
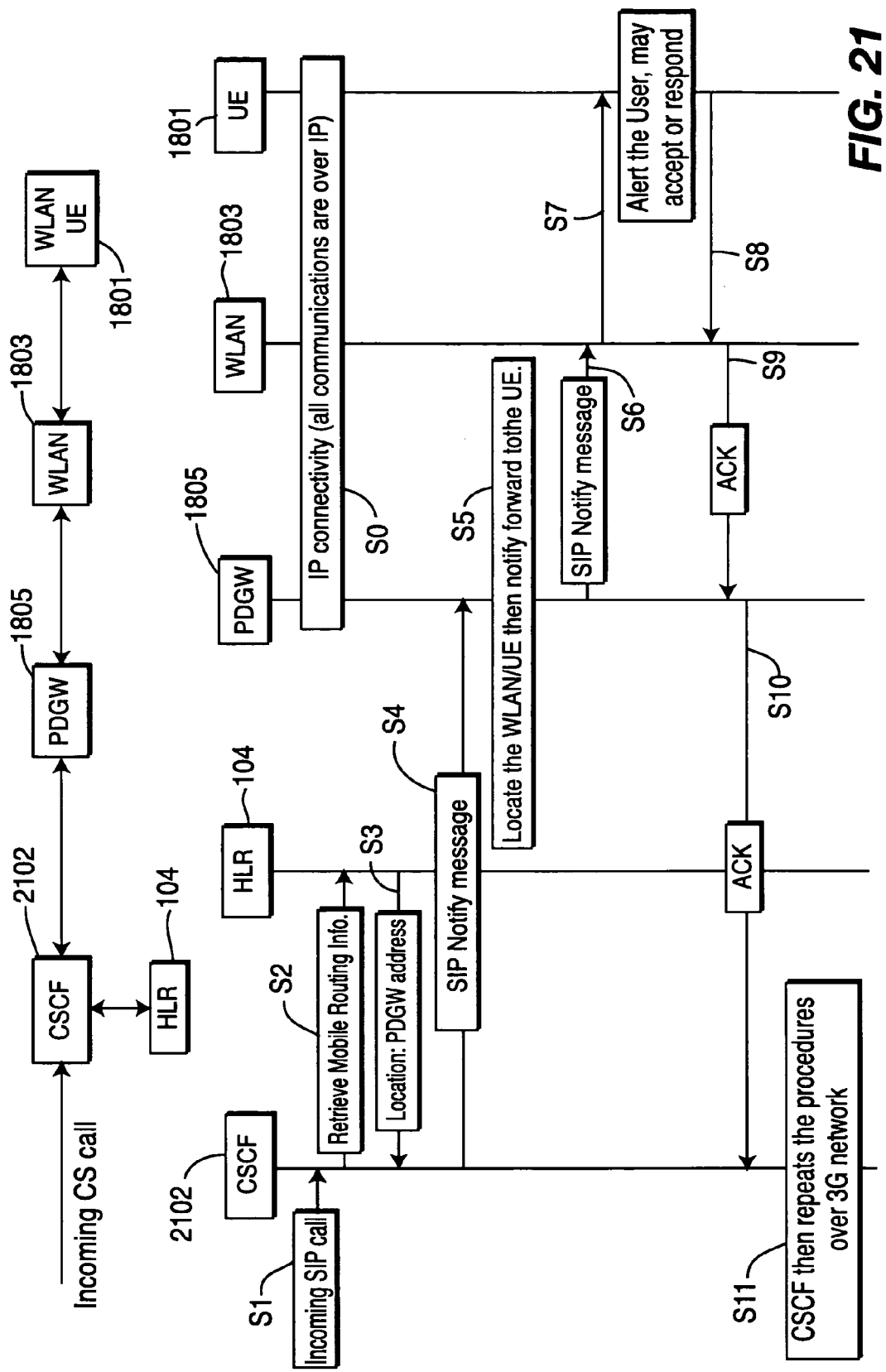
FIG. 21 is a data flow diagram setting forth a procedure for the notification of IMS-based services over a WLAN.

FIG. 21 is a data flow diagram setting forth a procedure for the notification of IMS-based services over WLAN 1803, which communicates with UE 1801 and PDGW 1805 over standard IP-based links. Upon receipt of an incoming SIP call (S1), CSCF 2102 retrieves mobile routing information and sends routing information to HLR 104 (S2). HLR 104 sends a PDGW address to CSCF 2102 (S3). CSCF 2102 sends an SIP Notify message to the PDGW 1805 at the PDGW address returned by the HLR 104 (S4). The SIP Notify message may, but need not, include a Mobile IP address. Upon receipt of the SIP Notify message, PDGW 1805 locates WLAN 1803/UE 1801 (S5) and sends WLAN 1803 an SIP Notify message (S6). WLAN 1803 alerts UE 1801 as to the existence of an incoming SIP message (S7). If the SIP call is accepted, UE 1801 sends an acceptance message to WLAN 1803 (S8). WLAN 1803 sends an acknowledgment (ACK) message to PDGW 1805 (S9). PDGW 1805 responds to the ACK message by sending an ACK message to the CSCF 2102 (S10). CSCF 2102 repeats all or a portion of the aforementioned procedure over a 3GPP network (S11).

Figure 22:
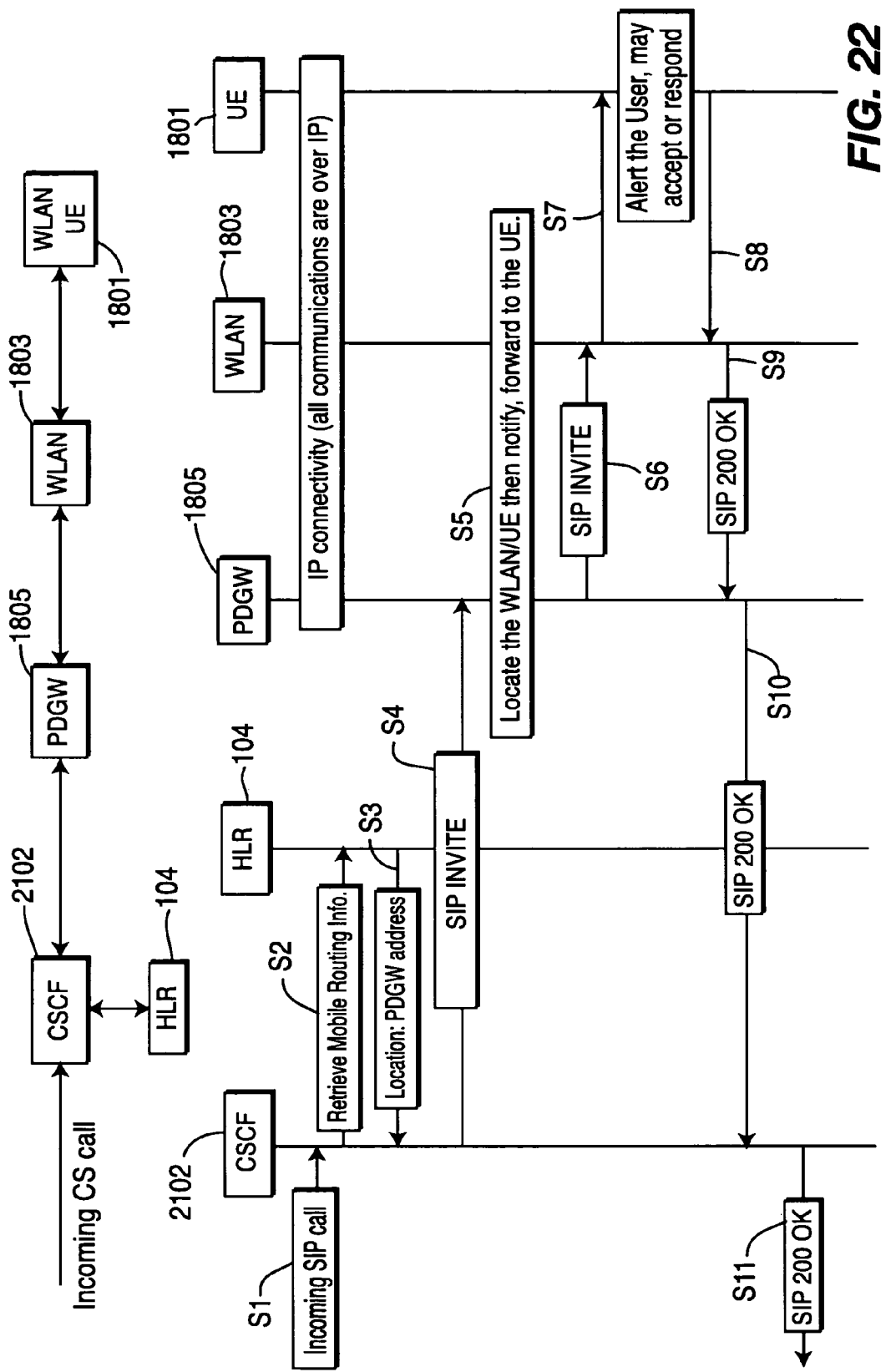
FIG. 22 is a data flow diagram setting forth a procedure for the termination of IMS-based services over a WLAN.

FIG. 22 is a data flow diagram setting forth a procedure for termination of IMS-based services over WLAN 1803, which communicates with UE 1801 and PDGW 1805 over standard IP-based links. Upon receipt of an incoming SIP call (S1), CSCF 2102 retrieves mobile routing information and sends the routing information to HLR 104 (S2). In response, HLR 104 sends a PDGW address to CSCF 2102 (S3). The CSCF 2102 then sends a SIP Invite message to a PGDW 1805 at the PDGW address returned by HLR 104 (S4). PDGW 1805 locates the WLAN 1803/UE 1801 (S5) and notifies WLAN 1803 by sending WLAN 1803 a SIP Invite message (S6). WLAN 1803 alerts UE 1801 as to the incoming SIP call (S7). If the SIP call is to be accepted, UE 1801 sends an acceptance message to WLAN 1803 (S8). WLAN 1803 sends an SIP 200 OK message to PDGW 1805 (S9), which responds to the SIP 200 OK message by sending an SIP 200 OK message to CSCF 2102 (S10). CSCF 2102 sends the SIP 200 OK message over a 3G network (S11).

The following description sets forth the eleventh and twelfth embodiments of the present invention for SMS Protocol Architecture for WLAN. FIGS. 23-36 show the protocols/interfaces employed in the implementation of the eleventh and twelfth embodiments. The protocol layers that are used to support SMS in the present invention include SM-AL (application layer), TL (transfer layer), RL (relay layer), and, LL (link layer) protocol layers. SS7 protocol is the transport mechanism between SMS-GMSC/IWMSC and PDG/WAG as in GPRS and GSM. The interface between PDG/WAG-WLAN is comprised of IP based-interface tunnels.

Two mechanisms proposed herein to carry the SMS across the WLAN according to the present invention include:

SMS Tunneling (eleventh embodiment):
wherein SMS PDU is extracted from SS7 message, then Encapsulated "AS IS" by WAG/PDG into an IP data frame and sent to the SMS Client in the WLAN for normal processing (extraction and actions).

SMS Proxy (twelfth embodiment):
wherein at the WAG/PDG, the SMS proxy extracted and processed SS7 message extracts the SMS data along with other usable elements (such as the SMS Originating Address, and Message Length). These information elements (IE) are then re-formatted (in a text or any other format) and then encapsulated in an IP frame and sent to the UE for display.

Figure 23:
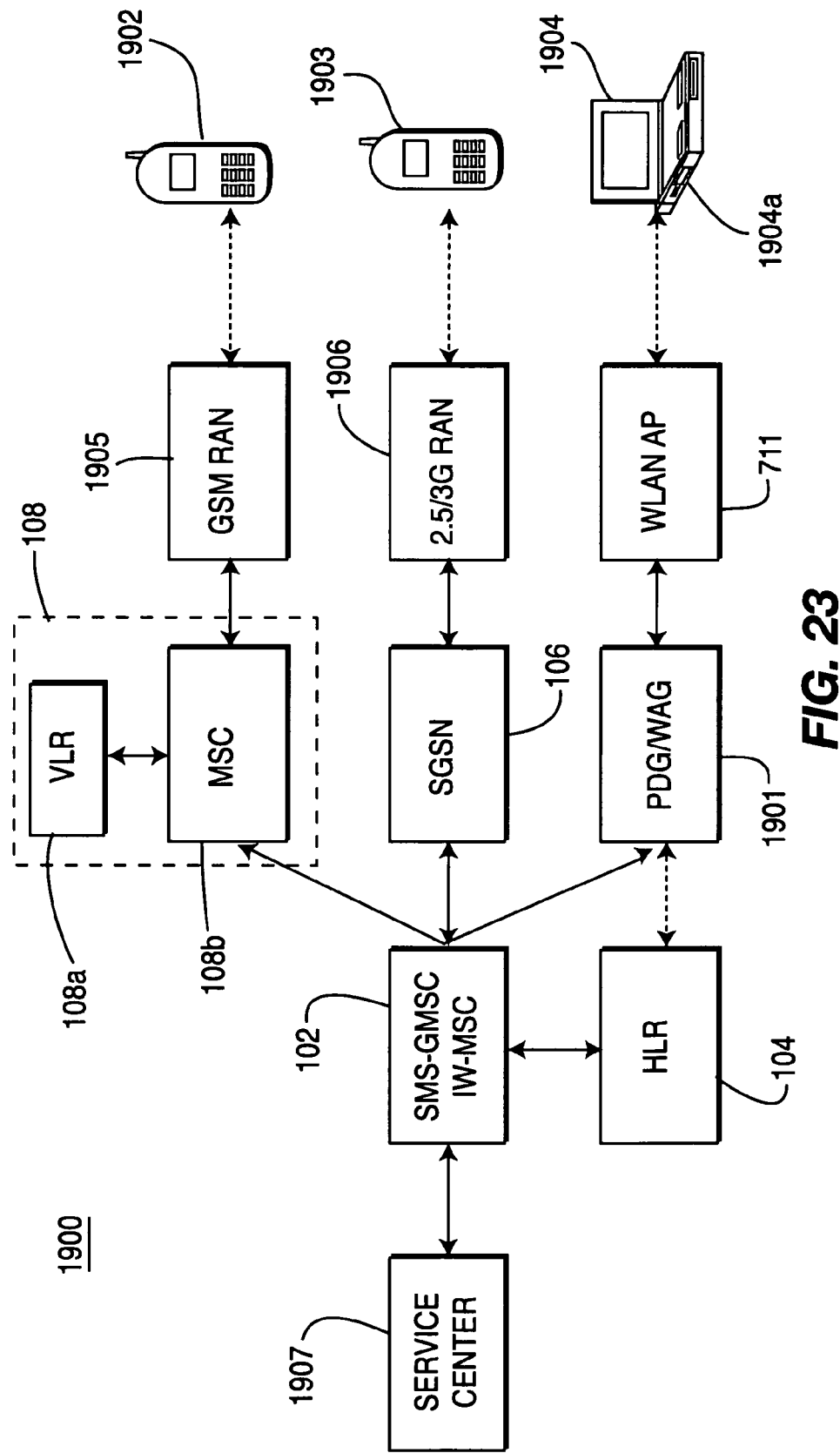
FIG. 23 illustrates a simple model of a network for supporting SMS over WLAN.

FIG. 23 generally shows a network 1900 having the components necessary to support SMS over WLAN wherein like elements to prior figures are designated by like numerals. Note, for example, FIGS. 9 and 15 more specifically, the new components required for achieving the objectives of the present invention are WAG/PDG 1901. Mobile terminals such at cell phones 1902, 1903 respectively support communications with a GSM RAN and a 2.5/3G RAN 1906. Laptop 1904, equipped with a communications card 1904*a* communicates with an AP of WLAN 711 GSM RAN 1905 and 2.5/3G RAN 1906 interface with MSC 108*b* of VLR/MSC 108 in a known manner. WLAN 711 interfaces with PDG/WAG in a manner to be more fully described below. Service Center (SC) 1907 conveys SMS to PDG/WAG 711 by way of SMS-GMSC IW-MSC.

Figure 24:
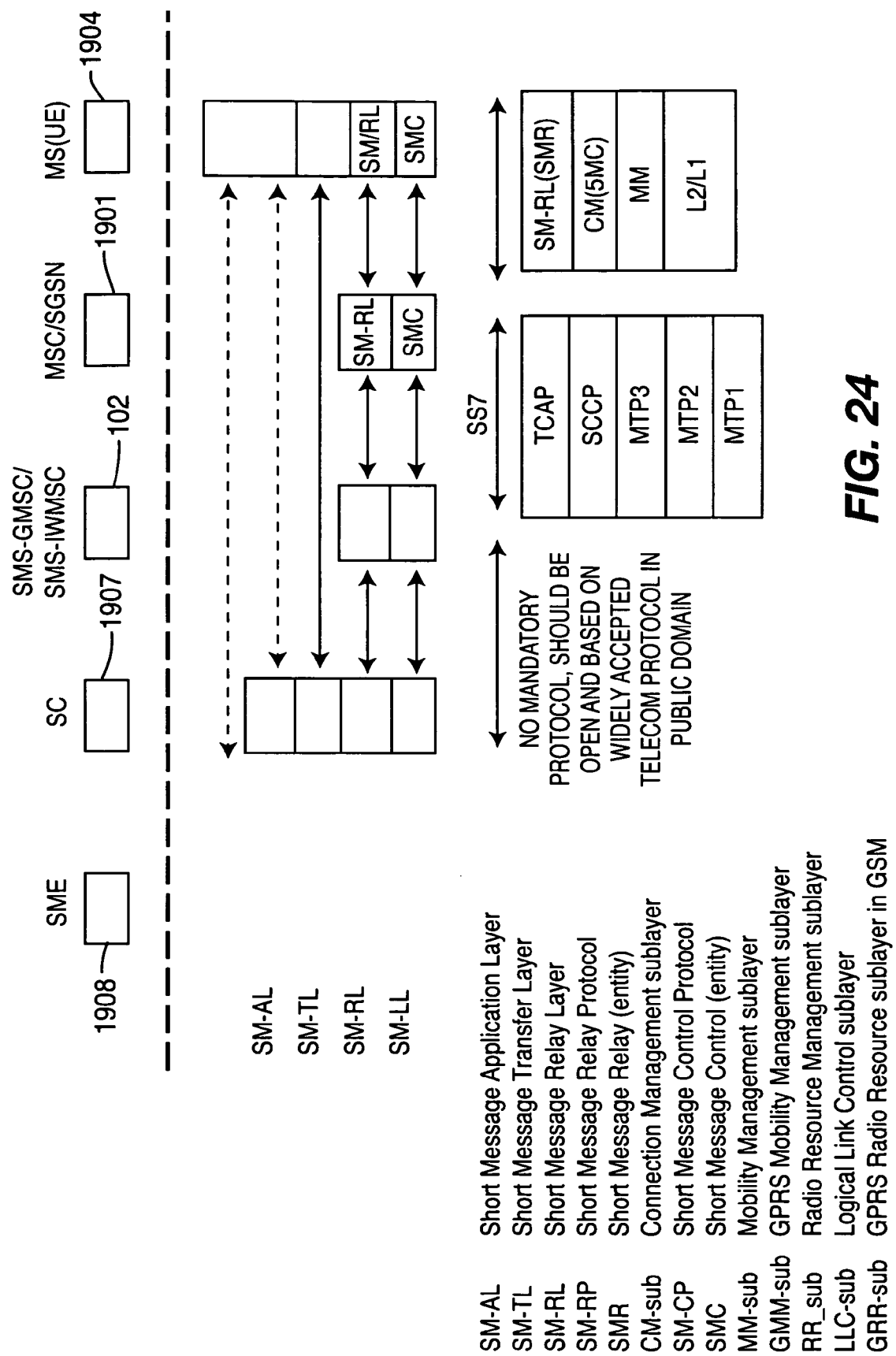
FIG. 24 illustrates the SMS protocol architecture for GSM/GPRS.

FIG. 24, generally shows the protocol used by the 2/2.5G networks to support SMS. The entities used on NAS to support SMS include SM-AL, TL, RL, and LL, as illustrated.

Figure 25:
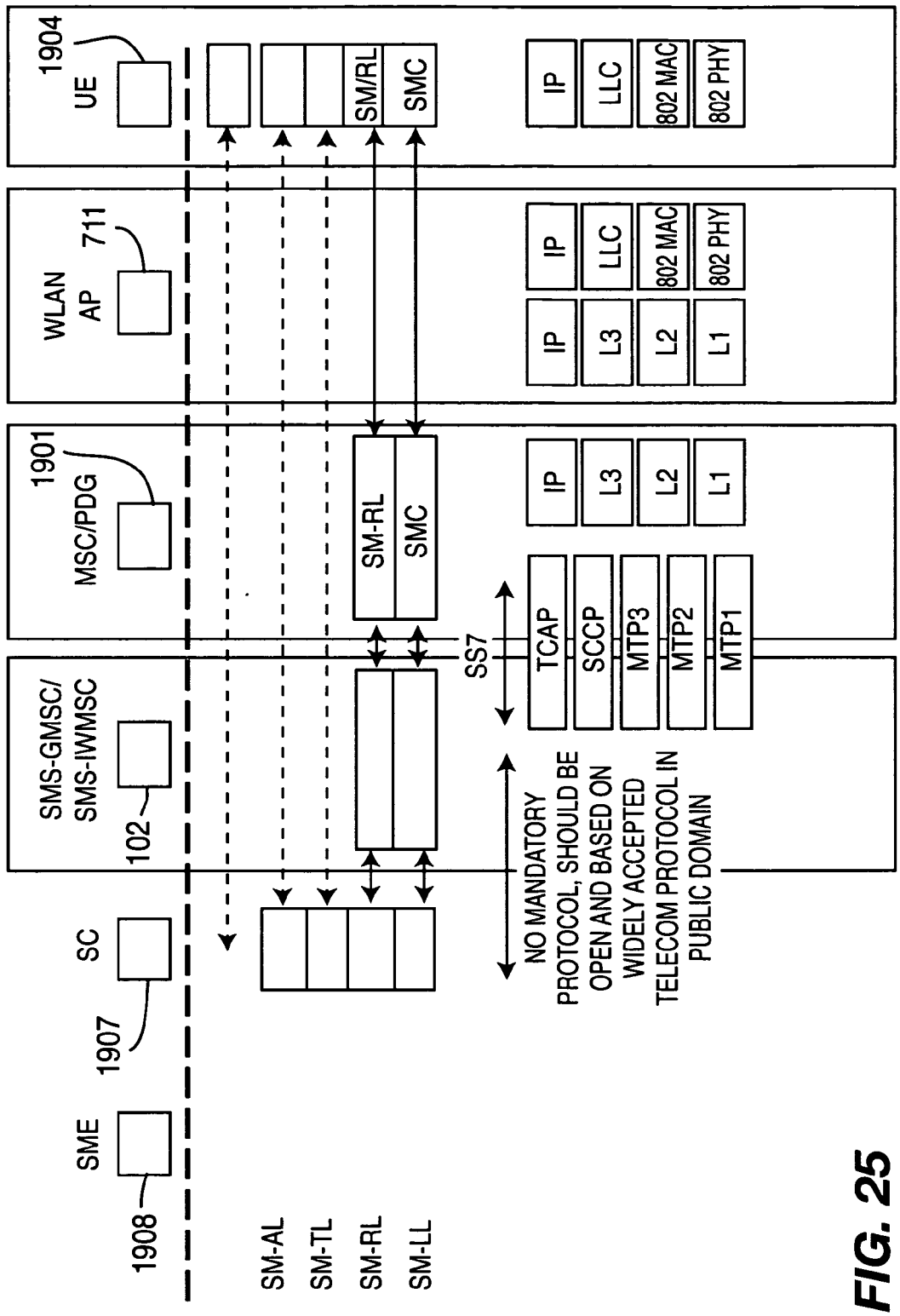
FIG. 25 illustrates the first embodiment, SMS tunneling, showing the protocol architecture for SMS tunneling in the context of the invention.

Making reference to FIG. 25, the following is to be noted. FIG. 25 illustrates the eleventh embodiment which is the preferred method and relates to protocol showing IP tunnelling from the UE to the WAG/PDG.

The same protocol SM-RL and short message center (SMC) will be used on top of IP. The SM protocol information is exchanged over the IP connection.

The SC 1907 and UE 1904 see the same protocol, only transported differently.

WAG/PDG 1901 has an SS7 interface on one side and IP interface on the other.

Figure 26:
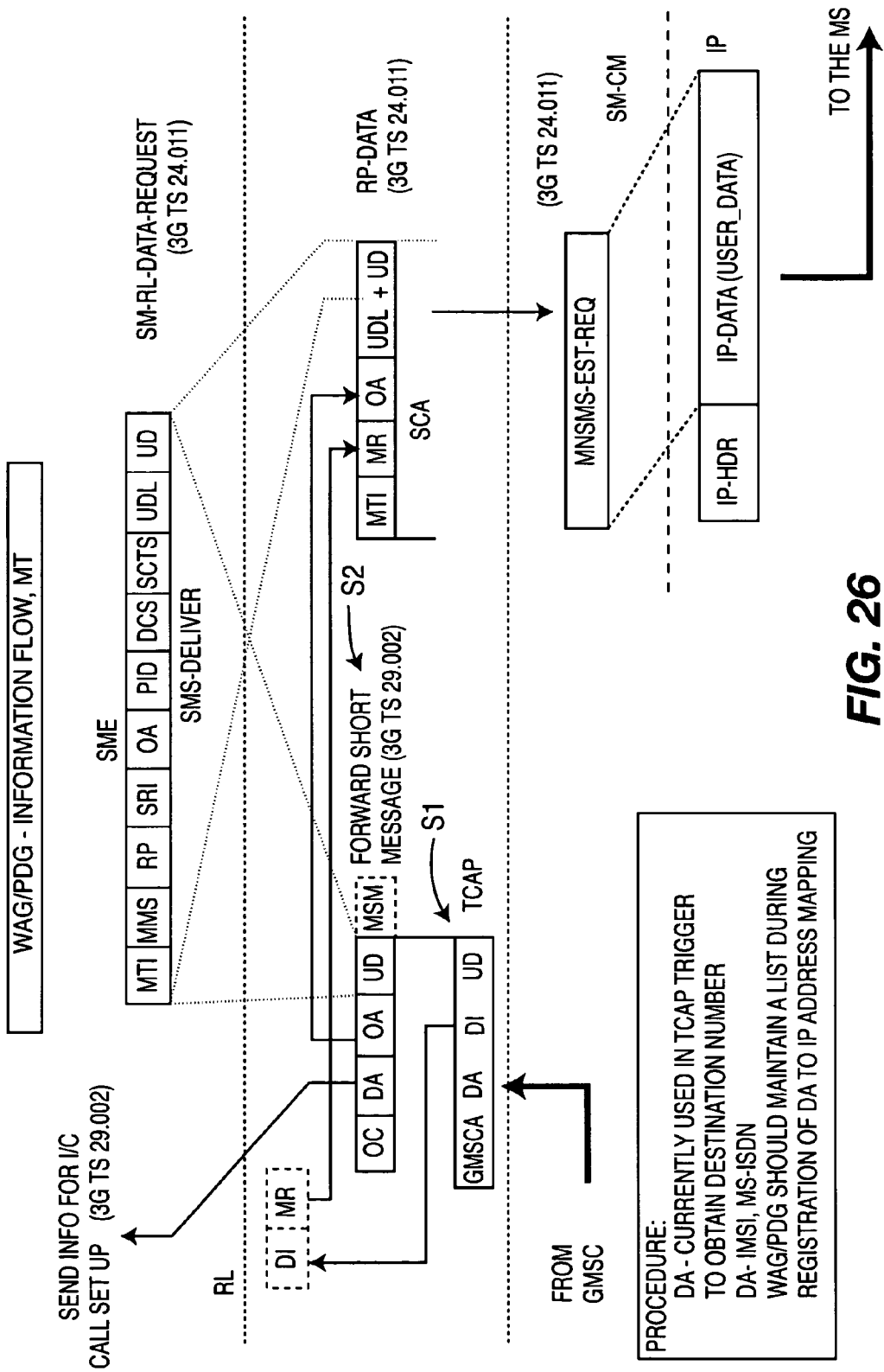
FIG. 26 illustrates SMS tunneling showing IE (information element) flow in WAG/PDG (wireless access gateway/packet data gateway), for mobile terminated (MT).

FIG. 26, illustrates the details of processing of Information Elements in WAG. SMS data arrives from the GMSC as a transaction capabilities transaction part (TCAP) message (S1). Data and the header information are extracted, and, the destination is determined from the header, which is the destination IP address. The SMS data is encapsulated in an IP datagram and routed to the destination node.

Figure 27:
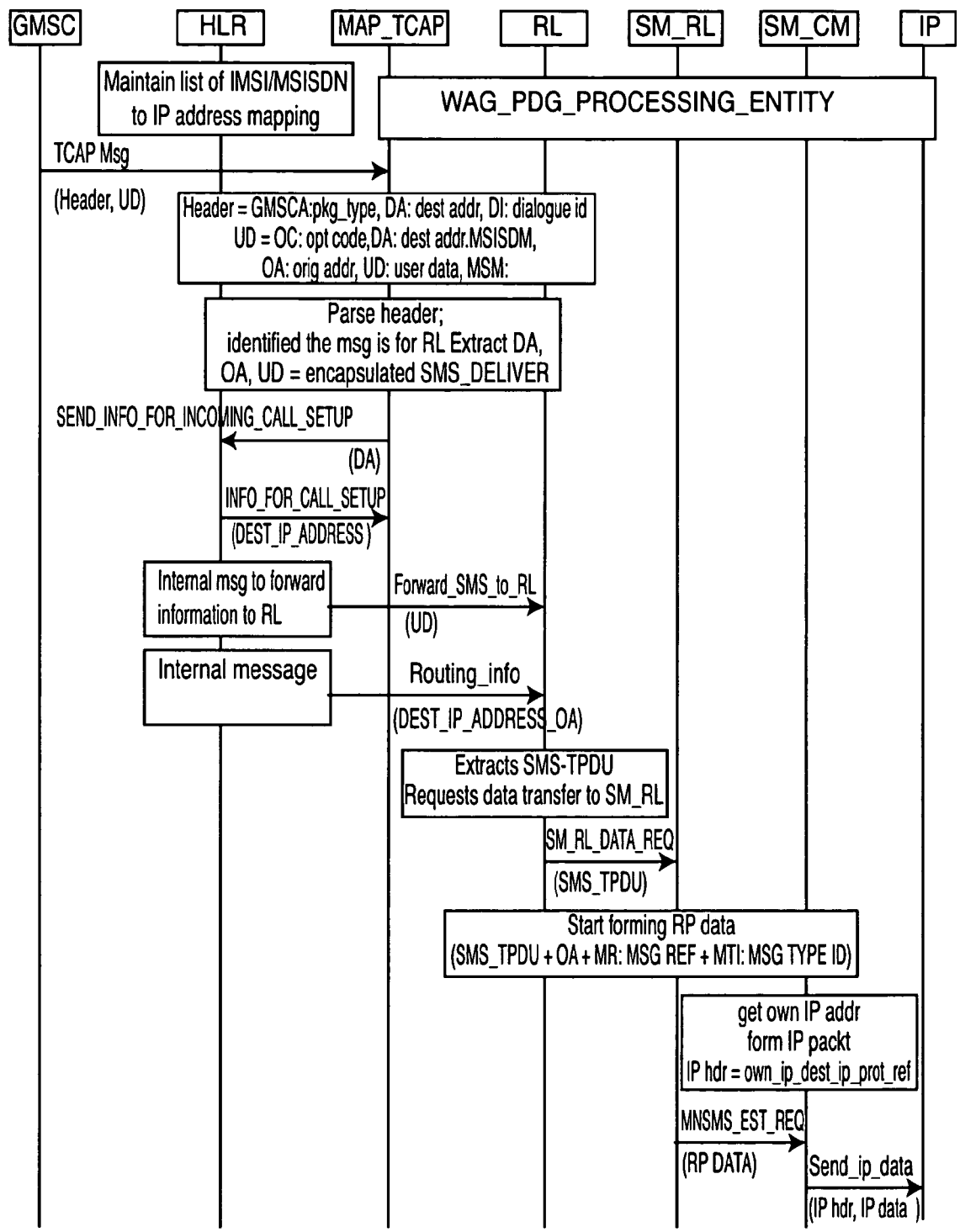
FIG. 27 illustrates the message flow sequence for the mobile terminated (MT) case.

As illustrated in FIG. 27, the mobile services switching center (MSC) reinforces the previous information processing shown in FIG. 26. FIG. 27 also shows that the protocol entity: receives the message; extracts the information; finds routing information; and then encapsulates the message in an IP PDU to transport over the IP tunnel.

Figure 28:
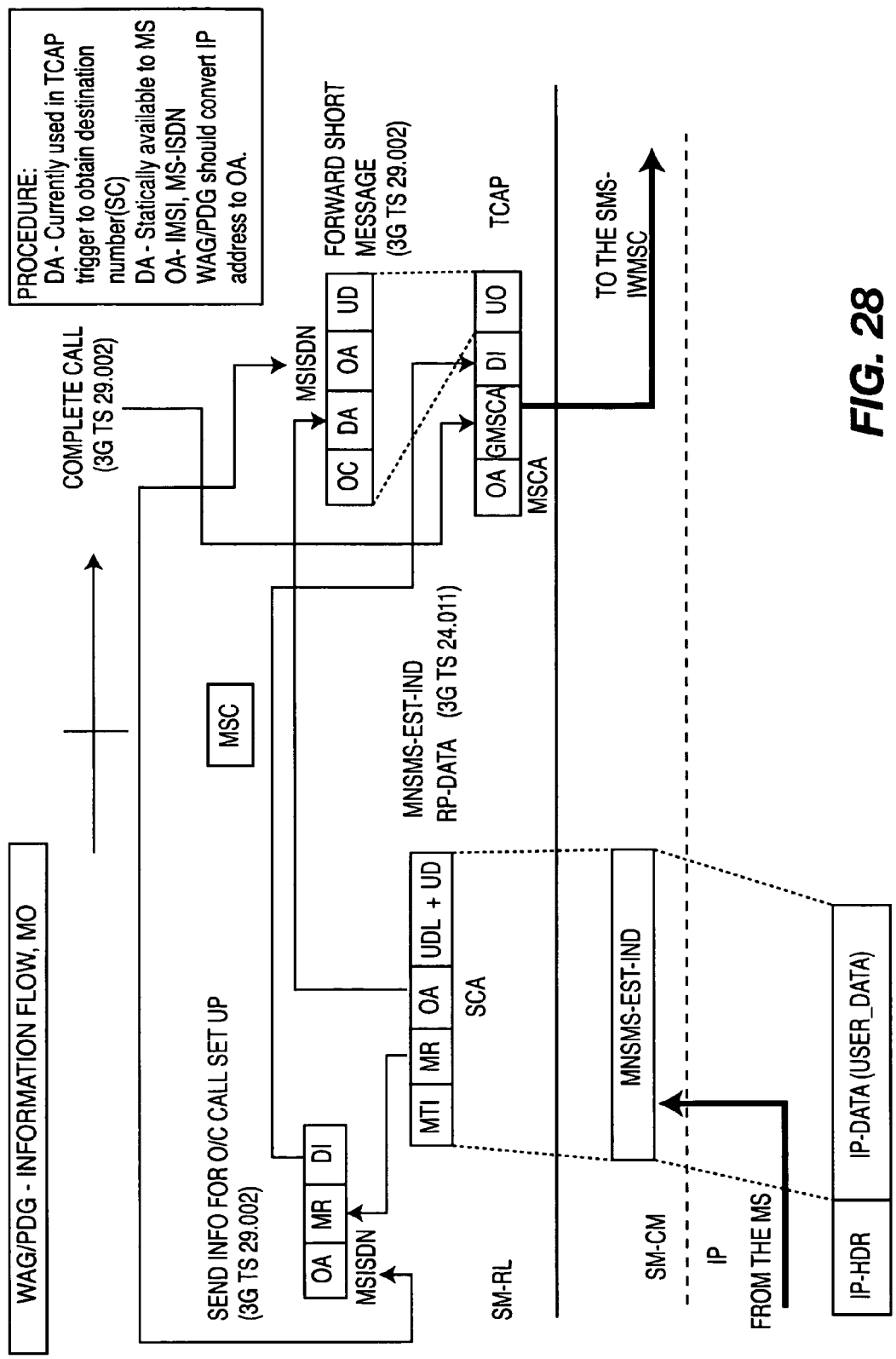
FIG. 28 illustrates SMS tunneling, showing IE flow in WAG/PDG, for the mobile originated (MO) case.

FIG. 28 shows the details of processing of Information Elements in WAG (MO-mobile originated-case). SMS data arrives as IP data. Data and header information are extracted. The destination address (DA) is determined from the header. The TCAP message is formed and data is sent over SS7 stack to SMS-IWMSC.

Figure 29:
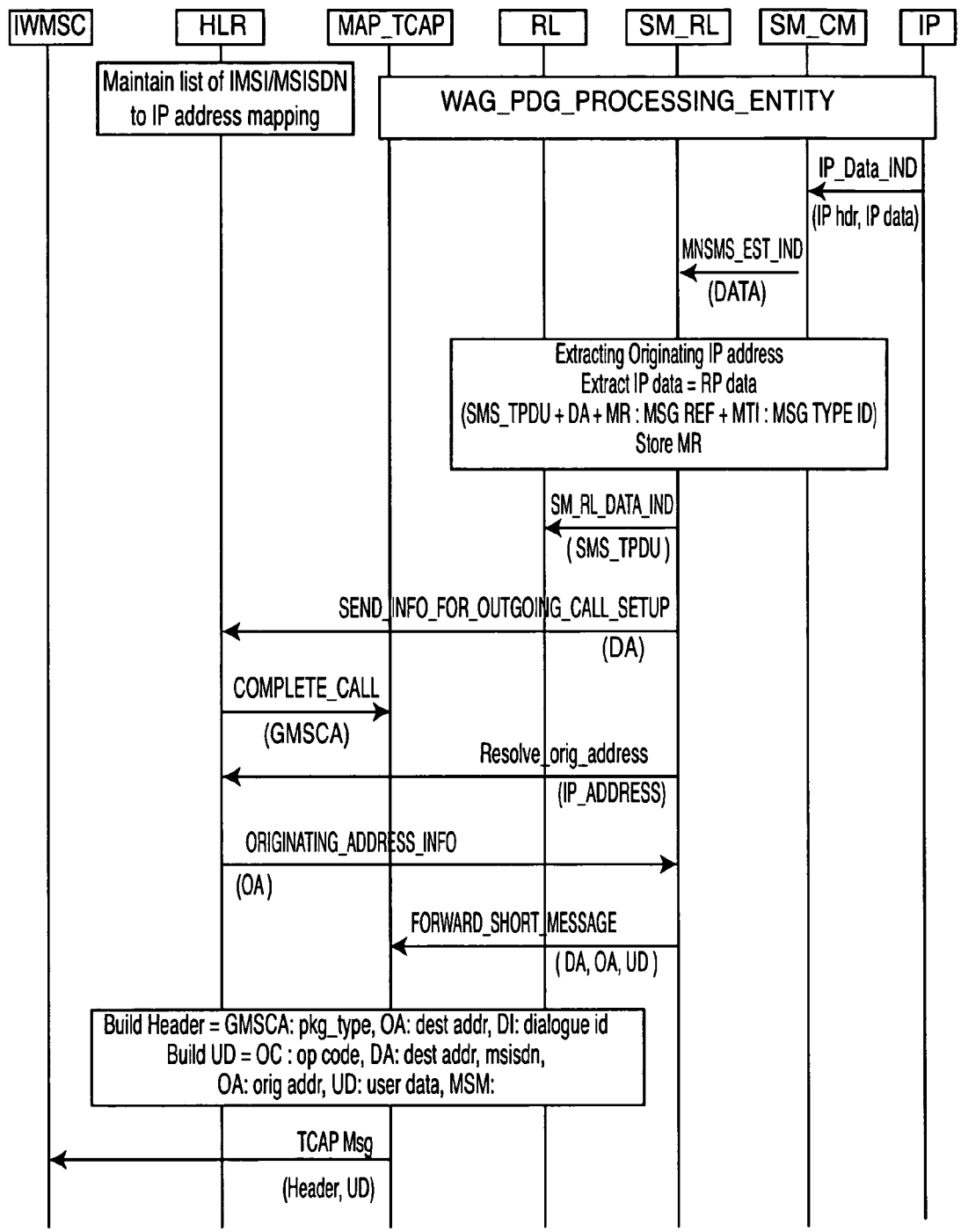
FIG. 29 illustrates message flow sequence for the MO case.

As illustrated in FIG. 29, the MSC reinforces the information processing in FIG. 28. FIG. 29 shows that the protocol entity receives the message, extracts the information, finds routing information and then encapsulates it in a TCAP message to be transported over the SS7 network.

Figure 30:
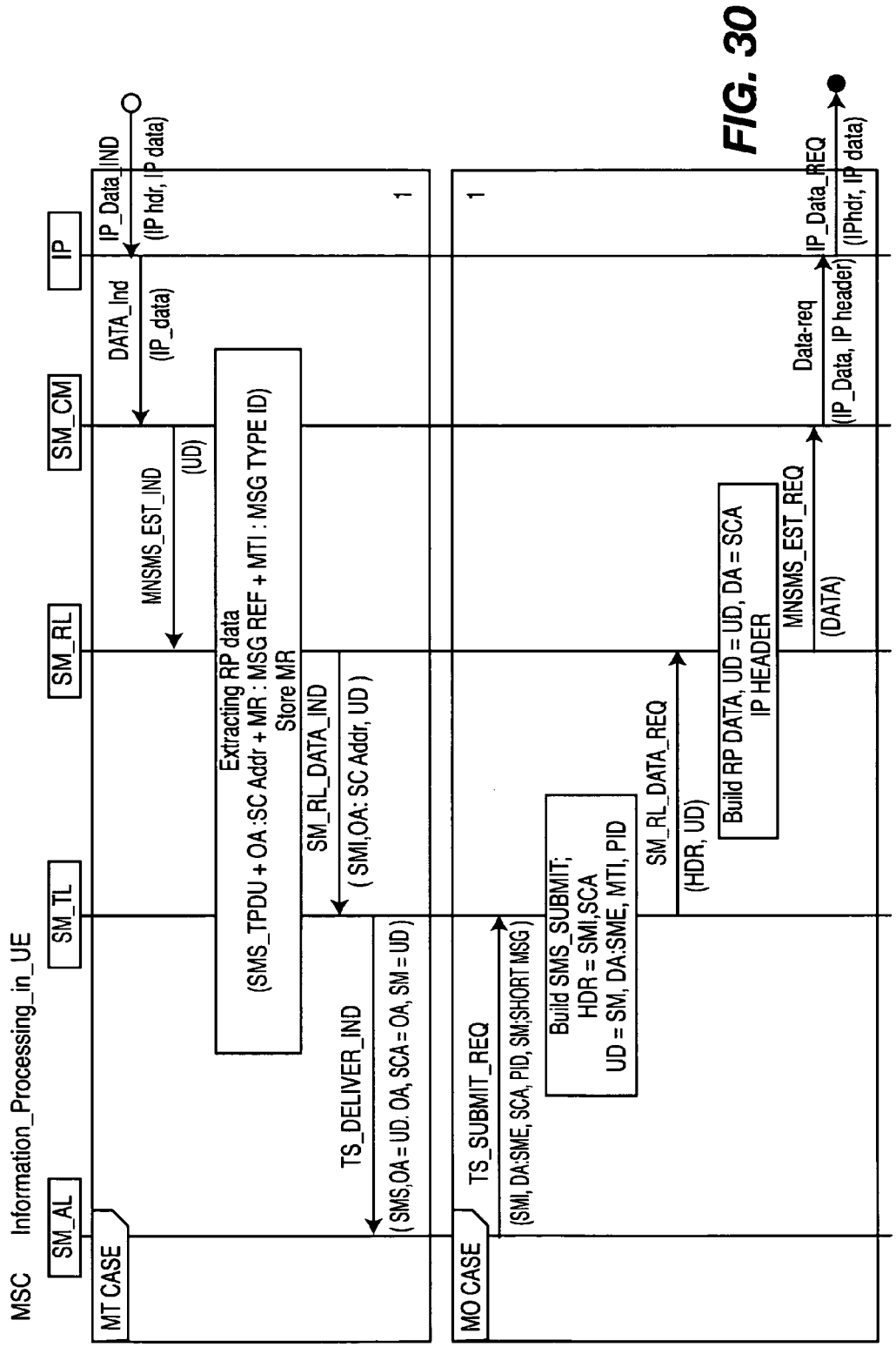
FIG. 30 illustrates information processing in a user equipment (UE).

FIG. 30 provides details about the processing inside the UE for both SMS origination and termination. In case of terminating SMS, SMS data is received as IP data. It goes up the protocol stack and is delivered to SM-AL. It presents the SMS to the user.

For the SMS message originating (MO) case, SM-AL encapsulates SMS data in PDU. It goes down the protocol stack and is finally encapsulated in the IP packet and sent to the network.

Figure 31:
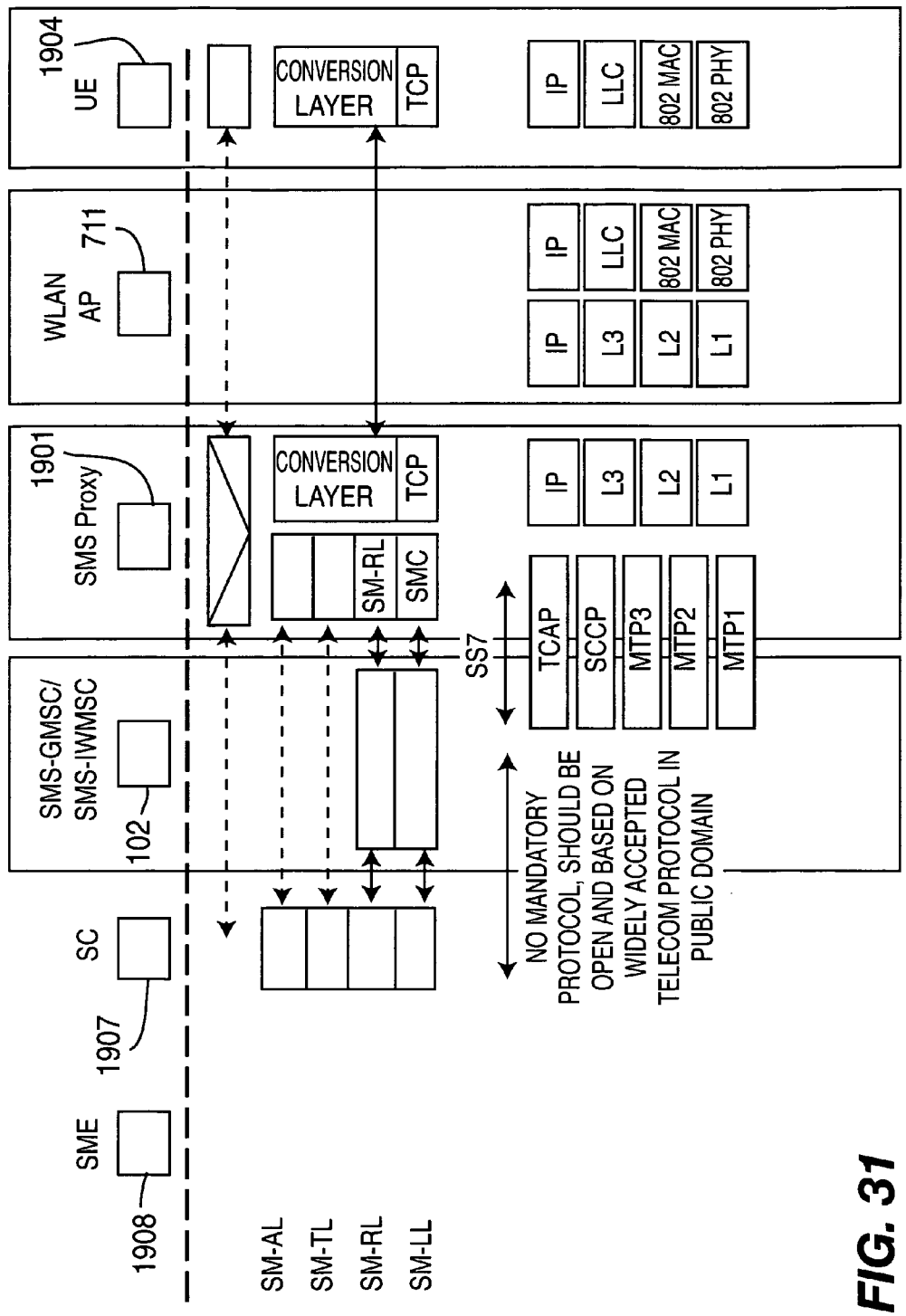
FIG. 31 illustrates SMS protocol architecture for SMS proxy as a second embodiment of the invention.

FIG. 31 illustrates eleventh embodiment which is the second preferred (i.e., "proxy") method to support SMS. Here the SMS protocol is terminated in the WAG/PDG and not extended till the UE. WAG/PDG extracts the SMS data from SM-AL. The conversion layer encapsulates the SMS data in an IP packet and transports it to the UE. The same layer in UE is responsible for extracting the data from the IP packet and then displaying the extracted data to the user.

Figure 32A:
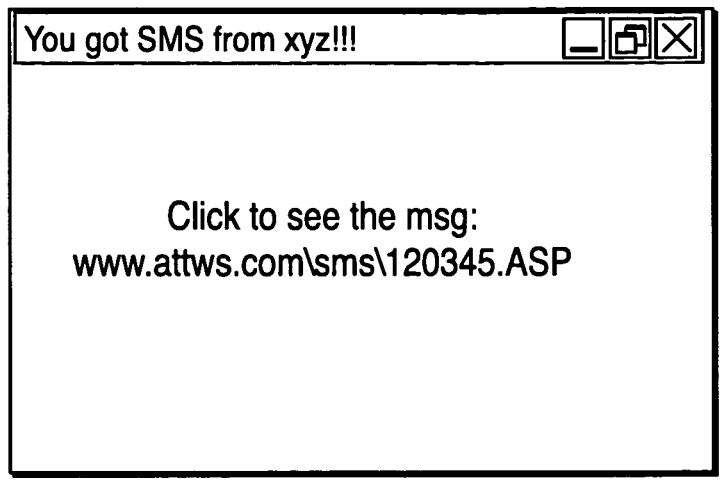
FIGS. 32a-32b illustrate details of the SMS proxy of FIG. 9.
Figure 32B:
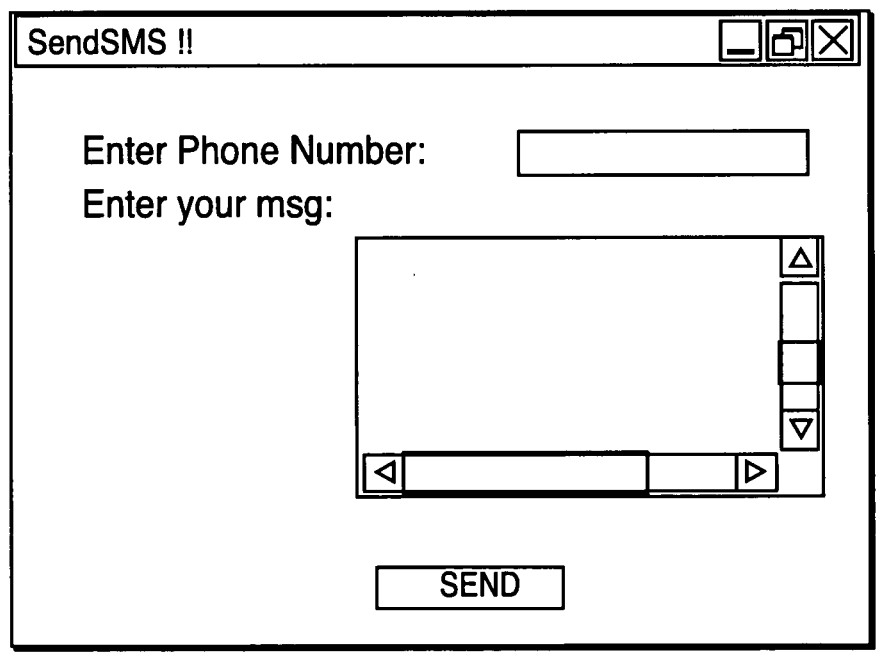

FIG. 32 illustrates SMS protocol architecture for SMS proxy, showing sample user interface for delivery FIG. 32a and origination FIG. 32b, of SMS.

Figure 33:
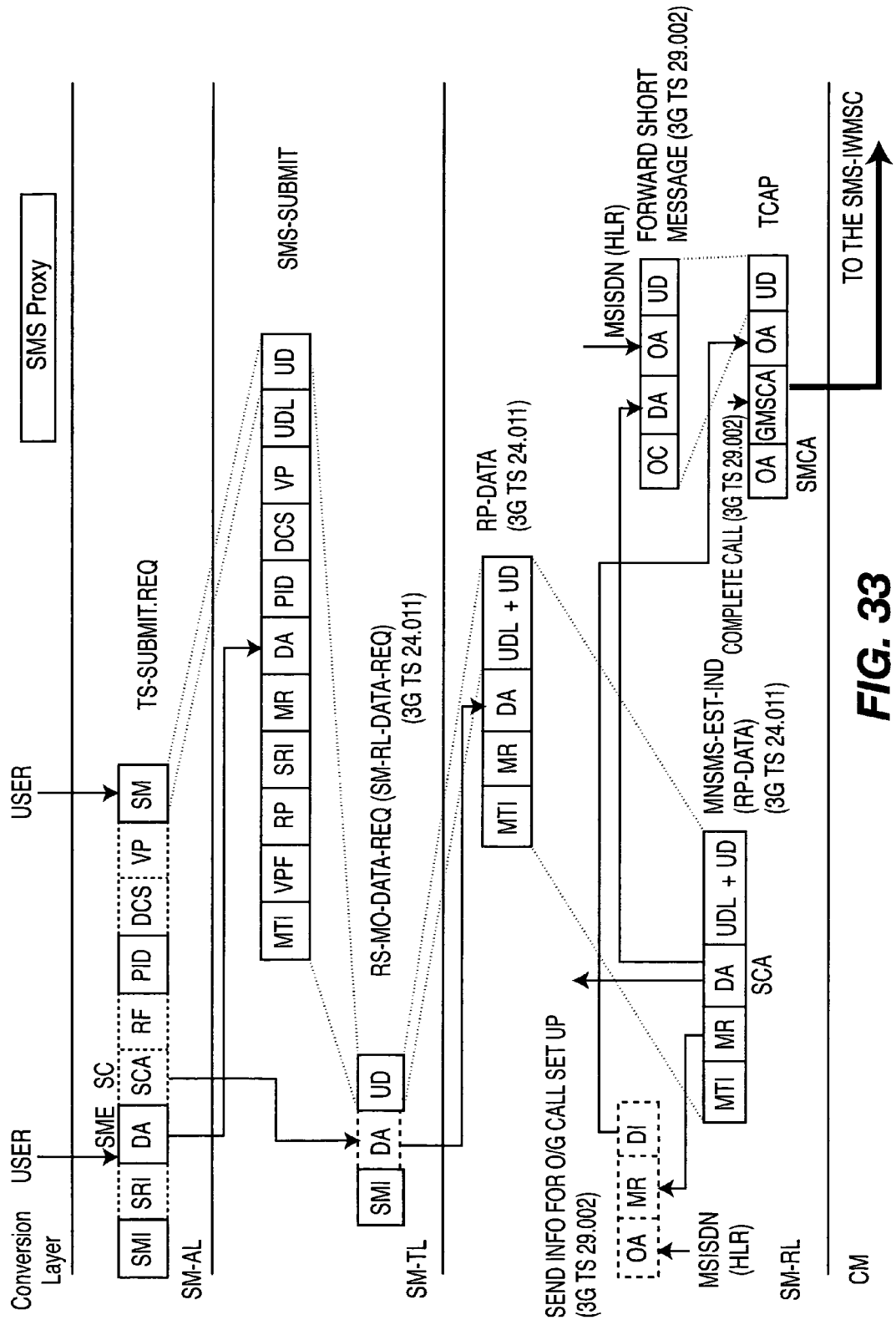
FIG. 33 illustrates MO IE processing in the WAG/PDG proxy.

With reference to FIG. 33, in the case of "SMS PROXY", details about information processing in WAG/PDG for the mobile originated SMS are shown. The data is supplied by a conversion layer to SM-AL. The user provides the DA (destination address) and the SM data. The information flows down AL, TL, and RL. SM-RL generates the originating MSISDN and uses the TCAP service to send the data to SMS-IWMSC.

Figure 34:
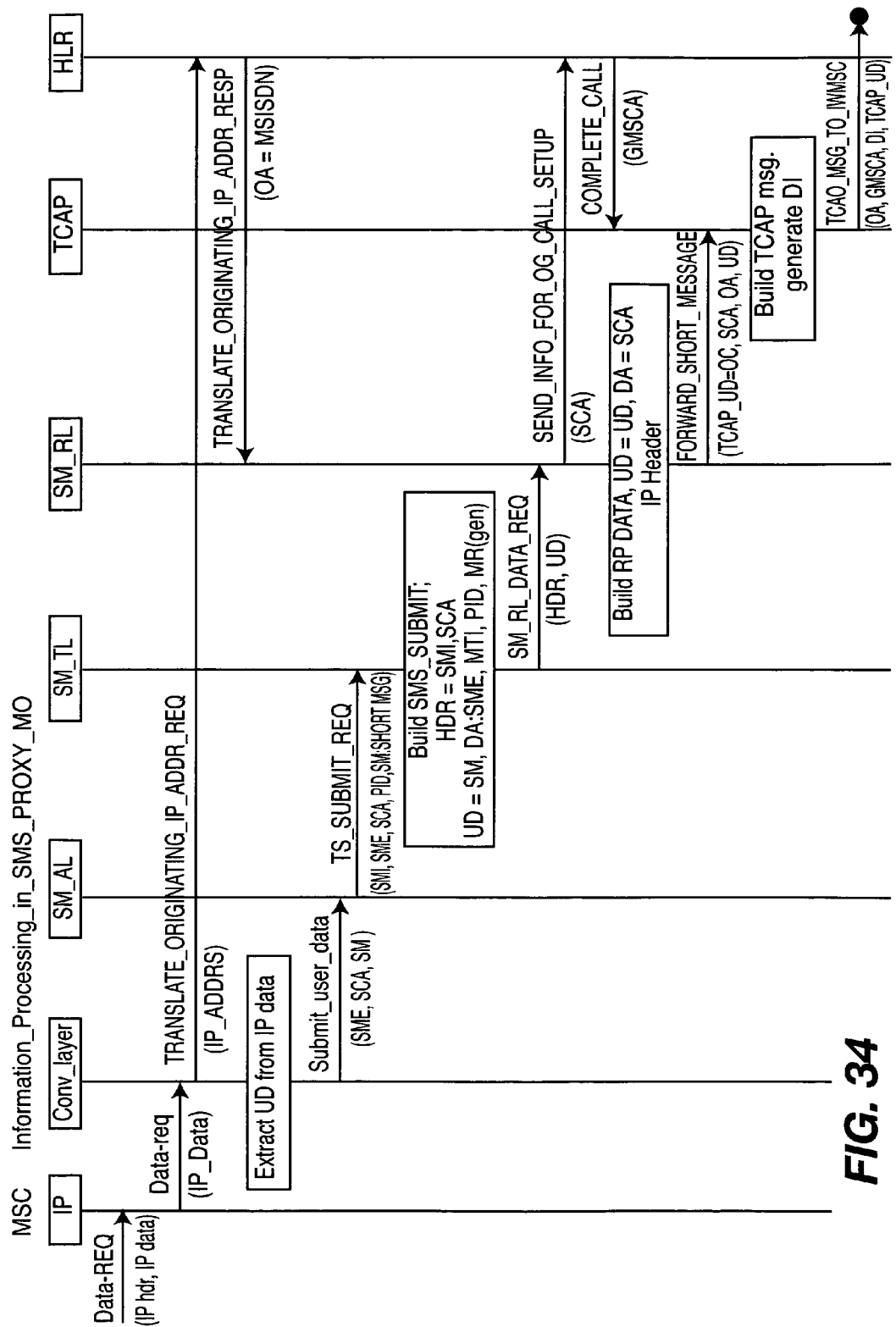
FIG. 34 shows the message flow in WAG/PDG SMS proxy for the mobile originated case.

FIG. 34 illustrates the message flow WAG/PDG, SMS proxy (MO). With specific reference to FIG. 35, in the case of "SMS PROXY", details about information processing in WAG/PDG for the mobile terminated SMS are shown. SMS data encapsulated in a TCAP message is received by WAG/PDG. The CM extracts the relay protocol data (RP-DATA) and resolves the destination address. The RL extracts the originating address and SM-RL data and delivers to TL. SMS data reaches AL, and then the conversion layer. Conversion layer extracts the origination address and the SMS data and encapsulates in an IP packet and sends it to the UE over TCP/IP. The conversion layer in UE receives the message and extracts the information and displays it to the user.

Figure 35:
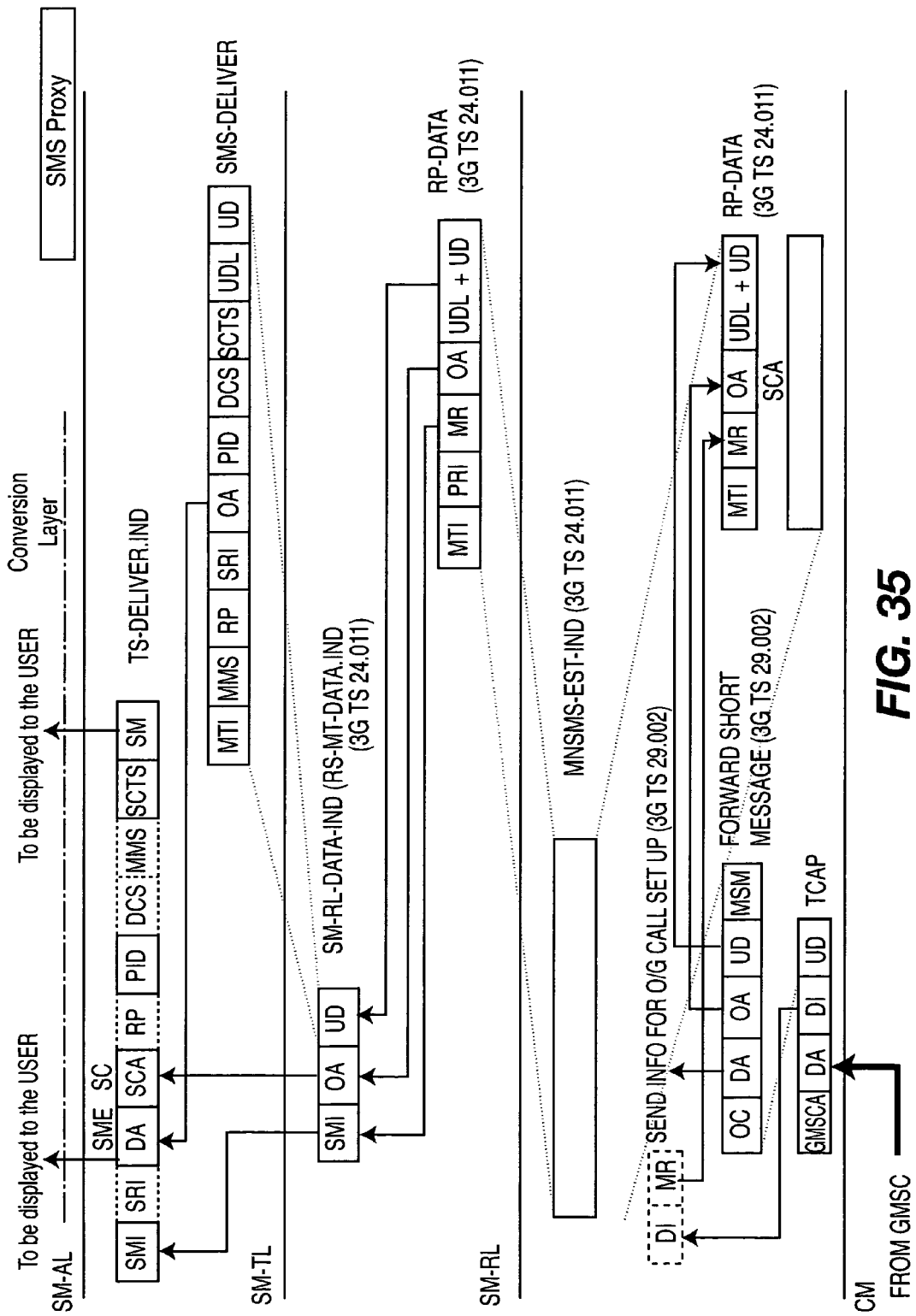
FIG. 35 illustrates MT IE processing in the WAG/PDG proxy.
Figure 36:
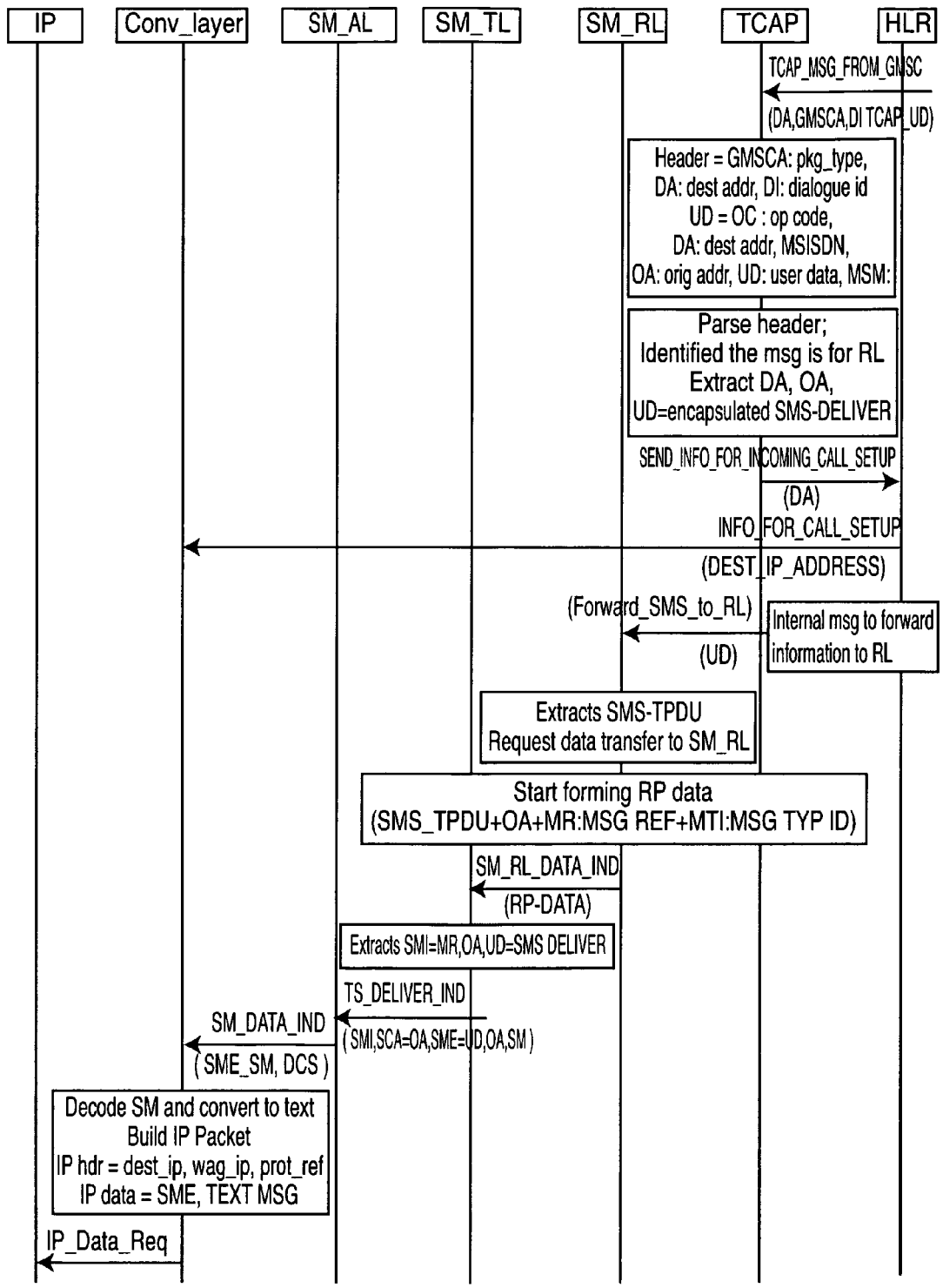
FIG. 36 illustrates message flow for WAG/PDGSMS proxy for the MT case.

FIG. 36 generally illustrates the message flow WAG/PDG, SMS proxy (MT), similar to the illustration in FIG. 35.

As was described briefly hereinabove, the objective of the thirteenth embodiment is to provide a short range, personal messaging network using existing hardware such as, for example Bluetooth (BT) radio and a UMTS platform which, may for example, utilize the Ericsson U100 platform. The thirteenth embodiment provides a software entity at the application level which is simple, inexpensive, takes maximum advantage of existing capabilities and entities and further avoids either using or adding functionality at the network side and, furthermore, avoids dependency on network support.

The thirteenth embodiment enables a group of mobile terminals, limited in number and functioning within a small geographical area to be capable of exchanging text messages or voice messages such as push to talk (PTT).

FIGS. 37a and 37b show adhoc pico networks respectively operating in peer-to-peer and hierarchical modes. A peer-to-peer mode shown in FIG. 37a, and embodying the principles of the present invention, enables mobile terminals to exchange messages, one-to-one. For example, mobile terminal 3501 may communicate with mobile terminal 3502 or 3503 and similarly mobile terminal 3503 may communicate directly with mobile terminal 3501 or 3502 and mobile terminal 3502 may communicate with terminals 3501 or 3503 in a like manner.

In the arrangement shown in FIG. 37b, the hierarchical mode shows mobile terminal 3603 communicating with mobile terminals 3601 and 3602, no further communications being provided in this mode, although it should be understood that either one of the mobile terminals 3601 or 3602 may operate in a manner similar to mobile terminal 3603. Typically, a piconet provides support for upwards of eight (8) mobile terminals. It is also possible to use the present embodiment in a scatternet which comprises a small network of two or more piconets.

FIG. 38 shows a detailed view of a typical mobile terminal such as a cellular phone 3801 having a capability of providing both text and voice messaging such as PTT. In the example given, once the user chooses between text or voice messaging, the user then displays the menu and selects the contact list therefrom shown in the display 3801a. The contact list is predetermined by the mobile terminal holder and may, for example consist of all terminals in the piconet as shown at 3802a, a specific work group 3802b, individual mobile terminal users identified by their names as shown at 3802c through 3802h, family members 3802i, and so forth. In the example given, the user has highlighted terminal 3802b and either pushes the button for PTT 3803 or for text message 3804.

The embodiment of the present invention follows the basic philosophy of an adhoc network which is similar to instant messenger and PTT technology but operates in a very small area having a maximum radius of 100 meters, for example, and which avoids any dependency on a base station or network server, i.e. is a non-peer-network-entity. The thirteenth embodiment enables point-to-multipoint communication within a small closed user group, eliminates central control by way of a base station and, to the contrary is managed locally, enabling users to join or leave dynamically, i.e., an initiator terminal can selectively invite terminals to the group or a terminal can be selectively denied access to the group.

In one preferred form of the thirteenth embodiment, a technology of choice is Bluetooth (BT) radio supported by a UMTS platform such as the Ericsson U-100 platform and has a maximum range of 100 meters, which range is dependent upon the power class of the mobile terminals. The thirteenth embodiment, in addition to supporting point-to-multipoint communications, is capable of operating in a master/slave and a client/server mode, the master/slave(s) mode being an operation where all the communications are synchronous between master and slave(s) and wherein the client/server mode is asynchronous wherein the server may offer the service which the client may asynchronously accept or alternatively wherein the client asynchronously seeks a service which the server may provide. The thirteenth embodiment further has the facility to provide connectable and discoverable services wherein connectable devices listen and respond to pages and wherein discoverable devices listen and respond to service inquiries.

An overview of the protocol employed in this embodiment will now be described in connection with FIGS. 39a through 39d. Making reference to FIG. 39a the example herein is one in which mobile terminals 3900A through 3900D are provided, for example, within a piconet, and are maintained on and in a listening mode as shown at 39A. It is assumed that mobile terminal 3900A desires to start a conversation or a push to talk (PTT). Discoverable devices listen to and respond to service inquiries.

Assuming that mobile terminal 3900A elects to initiate the conversation for push to talk, this mobile terminal scans for any service provider. 3900A then becomes the master and takes control.

FIG. 40a shows the method steps performed by mobile terminal 3900A wherein, at step S1, the mobile terminal scans for a service provider (SP). At step S2, when the mobile terminal detects a service from a service provider SP1 the mobile terminal 3900A which has its token register (which may also be referred to as a status or master/slave mode register) initially set to all zeroes, sets the token register to all binary ones. Mobile terminal 3900A then sets up links with mobile terminals in the small closed user group which may include all members of the group or a specified smaller number of members of the group which has been set up in the contact list of mobile terminal 3900A, these links having been set up by the user. At step S3 mobile terminal 3900A multicasts the data. At this time, mobile terminal 3900A has the "token" and remains the master. The data multicasted to mobile terminals 3900B through 3900D are performed in the manner shown in FIG. 37b wherein all but mobile terminal 3900A function as slaves and communication occurs in a synchronous manner.

Assuming that mobile terminal 3900B desires to send data, the steps performed by mobile terminal 3900B are shown in FIG. 40b wherein the mobile terminal, at step S4, scans the mobile terminals in its prestored group, receives responses from the mobile terminals at step S5 and, at step S6, determines which mobile terminal has the token, i.e., determines which terminal has its all bits of its token register set to binary one and, at step S7 requests the token from terminal 3900A. Terminal 3900A, shown in FIG. 40a, at step S8, receives the request for the token, and, at step S9, relinquishes the token by resetting its token register to all zeroes, breaks all links with the members of its group, at step S10 and, at step S11, assumes the client mode. Mobile terminal 3900B, at step S12, receives the reply from mobile terminal 3900A that the token is relinquished, sets its token register to all ones, at step S13, sets up links with terminals in its group, at step S14, and at step S15, multicasts data to mobile terminals 3900A, 3900C and 3900D, as shown in FIG. 39c. It should be noted that the mobile terminals that 3900B desires to communicate with need not be the same as the group selected by terminal 3900A, the example herein being chosen for the sake of simplicity.

Assuming that mobile terminal 3900C is desirous of sending either a text message or a PTT, this mobile terminal requests a token in the manner similar to that described above with regard to terminal 3900B and assuming that terminal 3900B relinquishes control, terminal 3900C sets its token register to all ones, becomes the master and takes control in a similar manner to the example given for mobile terminals 3900A and 3900B.

Recapulating, the protocol for sending is token based, requiring that a mobile terminal have a valid token before transmitting, the token being passed from terminal to terminal. The master terminal multicasts to slaves in a time synchronized fashion while a server multicasts to a client in an asynchronous fashion. Acquisition of a token switches the role of the terminal from slave to master. All terminals can function as clients and they can be paged, i.e. they are connectable but not discoverable.

The protocols for the thirteenth embodiment are provided at the application level and are adapted for managing a user group, managing links, managing the token, switching from server to client and vice versa.

FIG. 41 shows a software architecture which may, for example, be based upon the Ericsson U-100 platform, which is capable of supporting UMTS.

As shown in FIG. 41, the software entity 5100, which is a personal messaging network (PMN) client is an enterprise content management (ECM) component which is interfaced through an Ericsson interface description language (EIDL).

FIG. 41 is a simplified block diagram showing how the functional capabilities of the embodiment shown in FIGS. 39 and 40, for example, may be integrated into an existing platform. In the embodiment of FIG. 41, the aforesaid capabilities are shown as being integrated into an Ericsson U-100 platform capable of supporting UMTS. However, it should be understood that the capabilities of the present invention may be incorporated into any other platforms of like functionality and capability.

The platform 4100 incorporates hardware (HW) for network access services, data communication services, multimedia interface services, application platform services and operation and related services respectively shown at 4200A through 4600A, the software supporting these services being shown respectively at 4200B through 4600B. The middleware services 4900 include the platform application programming interface (ATI) as well as the open archives, open application framework (OAF) which is integrated into the middleware services and functions to manage all interfaces of the platform with the underlying services. For example, the user interface (UI) 5000, which is shown as being JAVA-based, and which enables a user to operate the mobile terminal to turn on, turn off, input data, select from among stored menus, etc. may, when the platform takes the form of a cell phone, have a conventional telephone keypad together with other operating buttons to provide on/off, scan, mode selection and other typical functions. Alternatively, the manual interface may be a keyboard type input shown for example at 3501 in FIG. 37 or the manual input may be a touch screen type or the like. The user interface is managed by the OAF 4900a. The user interface (UI) need not be Java-based and may employ any other suitable programming language.

The personal messaging network (PMN) capability is preferably embodied in three software modules which define the PMN client capability 5100, the individual modules respectively being a link manager, a device manager and a profile manager module 5100a, 5100b and 5100c, respectively. The divisions of the functions provided preferably dictate independent modules which, however, are associated with one another. More specifically, the link manager module 5100a sets up all the connections which include location of and communication with the service provider (such as a BT service provider) and establishing connections with those mobile terminals within the "link" which has been previously identified and stored within the contact list of the mobile terminal seeking to set up communications with one or more mobile terminals within the "link". The module 5100a then calls module 5100b.

The device manager module 5100b manages the handling of the token, previously described in connection with FIGS. 39a through 40b and controls all other interactions between the device and the selected mobile terminals within the link.

The profile manager module 5100c contains a profile of the device which includes any advertising or other capabilities of the individual platform of the mobile terminal 4100. The modules 5100a through 5100c interface with the OAF 4900a through a functional interface 4900b via the Ericsson interface description language (EIDL) stubs of the open platform ATI (OPA) which standardizes the modules 5100a through 5100c to the OPA and vice versa.

As shown in FIG. 41, Bluetooth (BT) services are interfaced with the OAF 4900a protocols in modules 5100 through 4300a, 4300b and OAF 4900. Graphics user interface (GUI) services are linked with the protocol modules provided at 5100 through 4400a, 4400b and OAF 4900a.

Recapitulating, the software entity, i.e., the PMN client, is provided as an extended component management services (ECM) component which is interfaced through the EIDL stubs and is similar to the common object request broker architecture (CORBA) in order to provide interoperability between objects built in different programming languages, running on different physical machines and perhaps on different networks, CORBA specifying in interface definition language an API that allows client/server interaction with the object request broker (ORB).

The PMN client registers for events and can be either a supplier or consumer, can be dynamically linked and the components thereof can dynamically register for services. The advantage of the embodiment shown, for example in FIG. 41, is the capability of linking a small group of mobile terminals within a small geographic area without any network support.

The foregoing is an explanation of the inventive methods and architectures for the delivery of voice and/or data-based services over 3GPP interworked LANs, with specific reference to the PGDW and the optionally and functionally connected situations of WAGs in each of various illustrated scenarios. The invention is applicable to UMTS and CDMA 2000 environments, but it is not limited to these environments, and is envisaged to be applicable to other scenarios as well. While this invention has been particularly shown and described with reference to preferred embodiments, it will be understood by those skilled in the art that various changes in form and details may be made therein without departing from the spirit and scope of the invention as described heretofore.

What is claimed is:

1. A method for use in a gateway node, the method comprising:
   the gateway node receiving a signaling system #7 (SS7) message, wherein the SS7 message includes Short Message Service (SMS) data intended for a first destination user equipment;
   the gateway node receiving information from a Home Location Register (HLR), the information related to a mapping of an International Mobile Subscriber Identity (IMSI) of the first destination user equipment to an Internet Protocol (IP)-based identifier of the first destination user equipment;
   the gateway node generating a first IP message based on the SS7 message and the information received from the HLR, wherein the first IP message includes the SMS data intended for the first destination user equipment, the IP-based identifier of the first destination user equipment, and an IP-based identifier of the gateway node;
   the gateway node transmitting the first IP message to the first destination user equipment;
   the gateway node receiving a second IP message, wherein the second IP message includes an RP-DATA message, wherein the RP-DATA message includes a destination address field, a message reference field, a message type field, and a user data field that includes SMS data intended for a second destination user equipment; and
   the gateway node transmitting the SMS data intended for the second destination user equipment to the second destination user equipment via a SMS Interworking Mobile Switching Center (SMS-IWMSC) using SS7.

2. The method of claim 1, wherein the gateway node is an IP short message gateway (IP SM GW).

3. The method of claim 1, wherein the first IP message is a session initiation protocol (SIP) message.

4. The method of claim 1, wherein the first IP message is transmitted to the first destination user equipment using user datagram protocol (UDP).

5. The method of claim 1, wherein the first IP message is transmitted to the first destination user equipment using transmission control protocol (TCP).

6. The method of claim 1, wherein the first IP message is transmitted to the first destination user equipment via a network based on Institute for Electrical and Electronics Engineers (IEEE) 802.11 technology.

7. The method of claim 1, wherein the first IP message is transmitted to the first destination user equipment via a wireless local area network (WLAN).

8. The method of claim 1, wherein the first IP message is transmitted to the first destination user equipment via a third generation partnership project (3GPP) network.

9. The method of claim 1, wherein the SS7 message is received from a SMS gateway mobile switching center (SMS-GMSC).

10. The method of claim 1, wherein the SS7 message is received from the SMS.

11. The method of claim 1, wherein the first IP message is transmitted to the first destination user equipment via an IP multimedia subsystem (IMS).

12. A gateway node comprising:
   a receiver configured:
   to receive a signaling system #7 (SS7) message, wherein the SS7 message includes Short Message Service (SMS) data intended for a first destination user equipment; and
   to receive information from a Home Location Register (HLR), the information related to a mapping of an International Mobile Subscriber Identity (IMSI) of the first destination user equipment to an Internet Protocol (IP)-based identifier of the first destination user equipment;

a processor configured to generate a first IP message based on the SS7 message and the information received from the HLR, wherein the first IP message includes the SMS data intended for the first destination user equipment, the IP-based identifier of the first destination user equipment, and an IP-based identifier of the gateway node; and a transmitter configured to transmit the first IP message to the first destination user equipment;

wherein the receiver is configured to receive a second IP message, wherein the second IP message includes an RP-DATA message, wherein the RP-DATA message includes a destination address field, a message reference field, a message type field, and a user data field that includes SMS data intended for a second destination user equipment; and wherein the transmitter is further configured to transmit the SMS data intended for the second destination user equipment to the second destination user equipment via a SMS Interworking Mobile Switching Center (SMS-IWMSC) using SS7.

13. The gateway node of claim 12, wherein the gateway node is included in an IP short message gateway (IP SM GW).

14. The gateway node of claim 12, wherein the first IP message is a session initiation protocol (SIP) message.

15. The gateway node of claim 12, wherein the transmitter is configured to transmit the first IP message to the first destination user equipment using user datagram protocol (UDP).

16. The gateway node of claim 12, wherein the transmitter is configured to transmit the first IP message to the first destination user equipment using transmission control protocol (TCP).

17. The gateway node of claim 12, wherein the transmitter is configured to transmit the first IP message to the first destination user equipment via a network based on Institute for Electrical and Electronics Engineers (IEEE) 802.11 technology.

18. The gateway node of claim 12, wherein the transmitter is configured to transmit the first IP message to the first destination user equipment via a wireless local area network (WLAN).

19. The gateway node of claim 12, wherein the transmitter is configured to transmit the first IP message to the first destination user equipment via a third generation partnership project (3GPP) network.

20. The gateway node of claim 12, wherein the receiver is configured to receive the SS7 message from a SMS gateway mobile switching center (SMS-GMSC).

21. The gateway node of claim 12, wherein the receiver is configured to receive the SS7 message from the SMS-IWMSC.

22. The gateway node of claim 12, wherein the transmitter is configured to transmit the first IP message to the first destination user equipment via an IP multimedia subsystem (IMS).

23. A method for use in a gateway node, the method comprising:

the gateway node receiving a signaling system #7 (SS7) message, wherein the SS7 message includes Short Message Service (SMS) data intended for a first destination user equipment;

the gateway node communicating with a Home Location Register (HLR) to obtain information related to a mapping of an International Mobile Subscriber Identity (IMSI) of the first destination user equipment to an Internet Protocol (IP)-based identifier of the first destination user equipment;

the gateway node generating a first IP message based on the SS7 message and the information received from the HLR, wherein the first IP message includes the SMS data intended for the first destination user equipment, the IP-based identifier of the first destination user equipment, and an IP-based identifier of the gateway node;

the gateway node transmitting the first IP message to the first destination user equipment;

the gateway node receiving a second IP message, wherein the second IP message includes an RP-DATA message, wherein the RP-DATA message includes a destination address field, a message reference field, a message type field, and a user data field that includes SMS data intended for a second destination user equipment; and the gateway node transmitting the SMS data intended for the second destination user equipment to the second destination user equipment via a SMS Interworking Mobile Switching Center (SMS-IWMSC) using SS7.

24. The method of claim 23, wherein the gateway node is an IP short message gateway (IP SM GW).

25. The method of claim 23, wherein the first IP message is a session initiation protocol (SIP) message.

26. The method of claim 23, wherein the first IP message is transmitted to the first destination user equipment using user datagram protocol (UDP).

27. The method of claim 23, wherein the first IP message is transmitted to the first destination user equipment using transmission control protocol (TCP).

28. The method of claim 23, wherein the first IP message is transmitted to the first destination user equipment via a network based on Institute for Electrical and Electronics Engineers (IEEE) 802.11 technology.

29. The method of claim 23, wherein the first IP message is transmitted to the first destination user equipment via a wireless local area network (WLAN).

30. The method of claim 23, wherein the first IP message is transmitted to the first destination user equipment via a third generation partnership project (3GPP) network.

31. The method of claim 23, wherein the SS7 message is received from a SMS gateway mobile switching center (SMS-GMSC).

32. The method of claim 23, wherein the SS7 message is received from the SMS.

33. The method of claim 23, wherein the first IP message is transmitted to the first destination user equipment via an IP multimedia subsystem (IMS).

* * * * *